United States Patent
Fiske

(10) Patent No.: US 11,128,453 B2
(45) Date of Patent: Sep. 21, 2021

(54) VISUAL IMAGE AUTHENTICATION

(71) Applicant: Michael Stephen Fiske, San Francisco, CA (US)

(72) Inventor: Michael Stephen Fiske, San Francisco, CA (US)

(73) Assignee: Fiske Software, San Francisco, CA (US)

( * ) Notice: Subject to any disclaimer, the term of this patent is extended or adjusted under 35 U.S.C. 154(b) by 0 days.

(21) Appl. No.: 16/819,094

(22) Filed: Mar. 15, 2020

(65) Prior Publication Data

US 2020/0220715 A1    Jul. 9, 2020

Related U.S. Application Data

(63) Continuation-in-part of application No. 16/153,639, filed on Oct. 5, 2018, now abandoned, and a
(Continued)

(51) Int. Cl.
*H04L 9/08* (2006.01)
*H04L 9/00* (2006.01)
(Continued)

(52) U.S. Cl.
CPC ............. *H04L 9/085* (2013.01); *G06N 10/00* (2019.01); *H04L 9/006* (2013.01); *H04L 9/0819* (2013.01);
(Continued)

(58) Field of Classification Search
CPC ....... G06N 10/00; H04L 9/006; H04L 9/0819; H04L 9/085; H04L 9/0852; H04L 9/14; H04L 9/3242
See application file for complete search history.

(56) References Cited

U.S. PATENT DOCUMENTS

2011/0142234 A1* 6/2011 Rogers ............... G06Q 20/40
380/247
2011/0179274 A1* 7/2011 Veugen ............. H04L 9/3271
713/169

OTHER PUBLICATIONS

Biswas, "Diffie-Hellman technique: extended to multiple two-party keys and one multi-party key", IET Information Security, published: Jul. 17, 2007 (Year: 2007).*

* cited by examiner

*Primary Examiner* — Seth A Silverman

(57) ABSTRACT

A common vulnerability during a Diffie-Hellman key exchange is a man-in-the-middle attack, where Eve is able to pretend she is Bob to Alice and also pretend that she is Alice to Bob. In an embodiment, after a key exchange is completed, visual image authentication between Alice and Bob can notify Alice and Bob that Eve has launched a man-in-the-middle attack. When Alice's sequence of visual images derived from her shared secret do not match Bob's sequence of visual images, Alice and Bob know that their key exchange has been compromised by Eve. In this case, Alice and Bob should perform their key exchange again.

Our invention provides a malware resistant alternative to not using a root certificate during a key exchange. It is well-known that a root certificate can be compromised by an dishonest or corrupt insider. Since the institution has access to the root certificate, there is no guarantee that a rogue network administrator will not use it to personally profit, or breach the security of the system. There is also no guarantee that the institution cannot keep its root certificate from being breached by hackers.

In at least one embodiment, quantum randomness helps unpredictably vary the image location, generate noise in the image, or change the shape or texture of the images that help protect Alice and Bob's key exchange.

16 Claims, 35 Drawing Sheets

Related U.S. Application Data continuation-in-part of application No. 14/857,796, filed on Sep. 17, 2015, now Pat. No. 10,592,651, which is a continuation-in-part of application No. 14/017,735, filed on Sep. 4, 2013, now abandoned.

(51) Int. Cl.
*H04L 9/32* (2006.01)
*G06N 10/00* (2019.01)
*H04L 9/14* (2006.01)

(52) U.S. Cl.
CPC ............ *H04L 9/0852* (2013.01); *H04L 9/14* (2013.01); *H04L 9/3242* (2013.01)

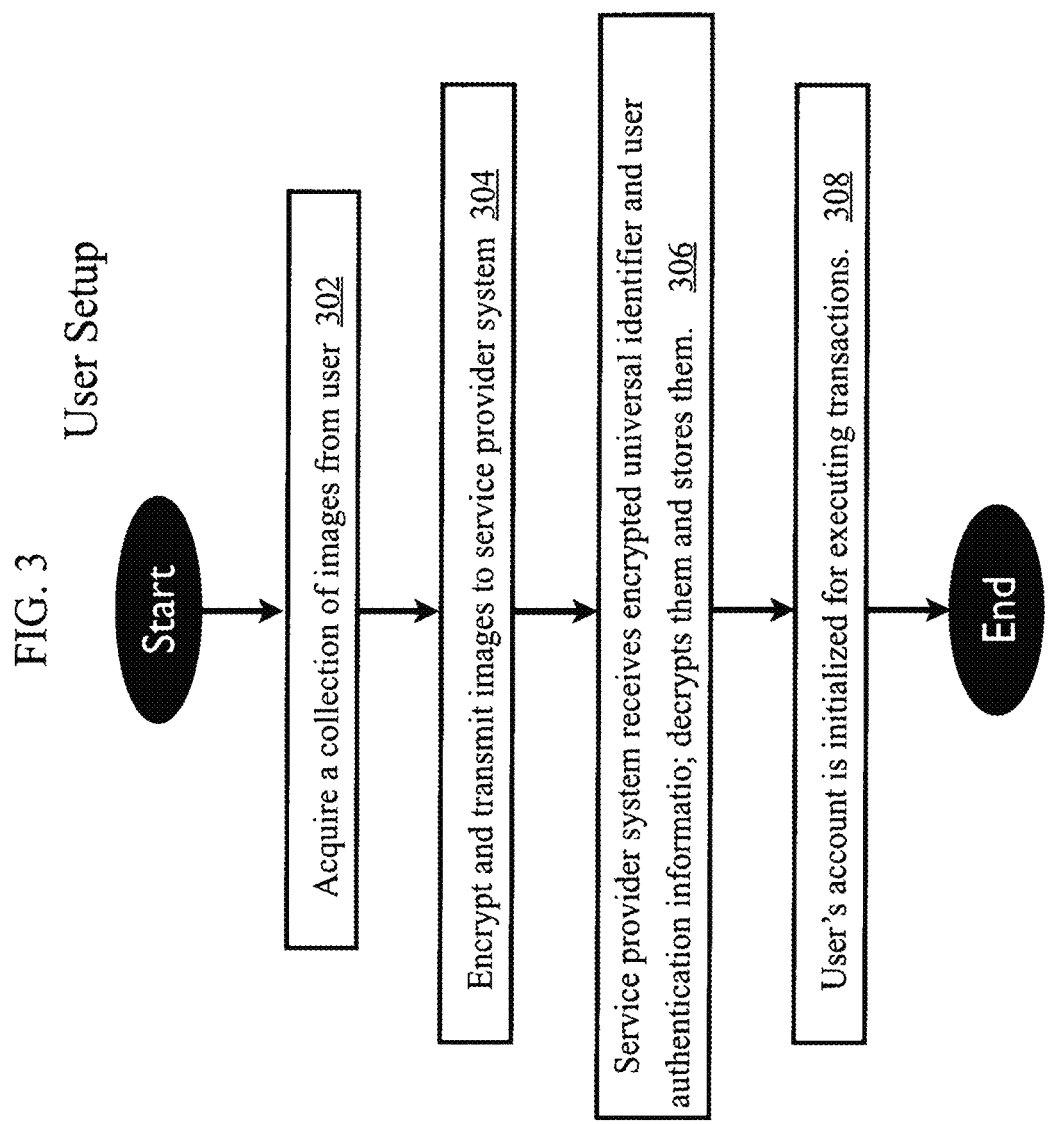

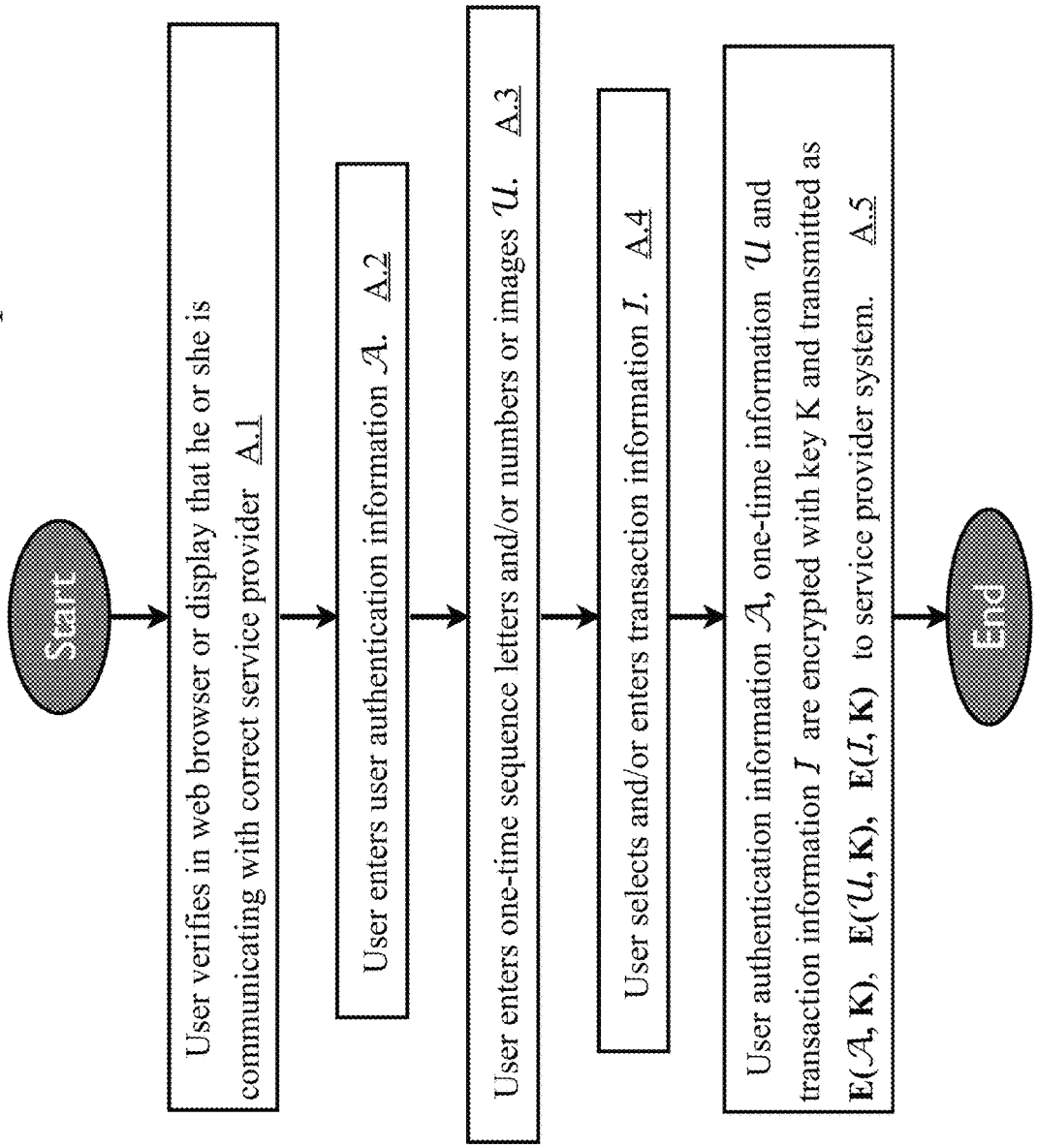

Sender Name

Recipient Bank Name

Complete Transaction

Recipient Account Number

Universal Identifier Images

Key Exchange

Man-in-the-Middle attack on the Key Exchange

Visual Images and Image Numbers

Visual Image Authentication

Display Screen

Logo Image

Ship and Part of Logo

Advertising and Authentication

VISUAL IMAGE AUTHENTICATION

1 RELATED APPLICATIONS

This application claims priority benefit of U.S. Provisional Patent Application Ser. No. 61/698,675, entitled "No More Passwords", filed Sep. 9, 2012, which is incorporated herein by reference; this application is a continuation-in-part of U.S. Non-provisional patent application Ser. No. 14/017,735, entitled "VISUAL IMAGE AUTHENTICATION AND TRANSACTION AUTHORIZATION USING NON-DETERMINISM", filed Sep. 4, 2013, which is incorporated herein by reference. This application is a continuation-in-part of U.S. Non-provisional patent application Ser. No. 14/857,796, entitled "VISUAL IMAGE AUTHENTICATION", filed Sep. 17, 2015, which is incorporated herein by reference. This application is a continuation-in-part of U.S. Non-provisional patent application Ser. No. 16/153,639, entitled "LOGO IMAGE AND ADVERTISING AUTHENTICATION", filed Oct. 5, 2018, which is incorporated herein by reference.

2 FIELD OF INVENTION

This specification relates to security in computers, mobile phones and other devices.

3 BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

4 LIMITATIONS AND WEAKNESSES OF PRIOR ART

A shortcoming in the prior art, recognized by this specification, is that there is a lack of a secure integration of the identity of the user to the protection of the users data and the control of the users computer. A critical part of the computer instructions for an action or a transaction are usually executed on the host domain machine (e.g., the users computer). Some examples of the users computer are a Mac Book Pro, a Dell desktop computer, an IPhone, a Blackberry or an Android phone. Currently cryptography keys are stored on the users computer or a chip executing the operating system, which is not secure. For example, when Bobs computer communicates with Marys computer, even when using well-implemented Public Key Infrastructure (PKI), Bobs computer can only be sure that it is communicating with Marys computer. Bob can not be sure that he is communicating with Mary and vice versa. Similarly, even Bob cannot be certain that the communications he sends Mary are the same as the communications that Mary receives as coming from him.

Sending a secure communication using Public Key Infrastructure (PKI) from one user machine to another user machine ensures communication between the user machines, but may not ensure secure communication between the users of the machines. Continuing, with the above example, as a result of the use of a Public Key Infrastructure, although Mary may be reasonably sure that Marys machine is communicating with Bobs machine, Boris may be operating one or more computers in Russia and may have remotely broken into Bobs computer and may be using Bobs machine and pretending to be Bob.

In the prior art, each computer cannot be assured of who controls the other computer. For example, even when a user is present, an intruder (e.g., a hacker) may be physically located thousands of miles away, but is remotely logged onto the users machine and hijacking the users intended action(s). Even the Trusted Platform Module (TPM) has the fundamental cyber security weakness of not knowing who controls the other computer with which a user may be in communication with or who controls the computer which contains the Trusted Platform Module. Not knowing the other computer with which a current computer is in communication with may be a weakness that is significant when the operating system can directly access the TPM. If the users computer is compromised, then the attacker can access the TPM. Another limitation and weakness of the TPM is that there is no mechanism for binding the identity of the user to the users cryptography keys and other confidential information that should be bound to the users true identity.

Another shortcoming of cyber security is that a secure link is missing between the authentication of a valid user, and the authorization of an action. The authorization of an action could be the execution of a financial transaction from a users bank account, a stock trade in a users brokerage account, the execution of an important functionality on the electrical grid, or access to important data on a private network such as SIPRnet (e.g. WikiLeaks). The authorization of an action typically occurs through the web browser since the web browser presents a convenient interface for a person. However, the web browser is where the important connection between authentication of a user and authorization of an action may be broken. Existing systems have the user authenticating the users computer, and then the same users computer also authorizes (and may also execute) the action. Since the users computer can be hacked, the lack of a secure and direct link between authenticating the users computer and authorizing the action may render the act of user verification irrelevant.

Part of the disconnect (vulnerability) between authenticating the user and authorizing the users action occurs, because authentication (e.g., biometric authentication) is typically and naively represented as an on/off switch. That is, after the user has been authenticated and the initial transaction approved, the remainder of the session is assumed to be secure and all actions after authentication are assumed to be legitimate, without performing any further checks. In the same way, if this on/off implementation occurs in an untrusted computing environment, then outstanding biometric algorithms and sensor(s) become irrelevant because the biometric authentication can be circumvented between the user authentication and the authorization or confidentiality part of the security system.

The use of biometrics can be advantageous for security, because biometrics offers a reliable method for verifying who (the person) is that is actually initiating a transaction. However, even with the use of biometrics, if the handling of the biometric information, the storage of the biometric data, or the control of actions based on a biometric verification is done on an unsecured users computer, the value of the biometrics may be greatly reduced or nullified.

An additional aspect of the weakness of current authentication and authorization processes (such as those using biometrics) is that the action can be hijacked by executing a Trojan attack on the users computer, for example. A Trojan attack is an attack in which the attacker pretends to be the user and/or the other system to which the user is communicating with. In other words, a valid, authorized user cannot verify that the action he or she is trying to execute is what is actually being executed, because a third party may be masquerading as the other system.

An example of this weakness is the untrusted browser attack used to divert money from a users bank account. Marys web browser may display to her that she is about to send 500 dollars to Bobs account, but in reality her untrusted browser is configured to send 50,000 dollars to a thiefs bank account.

Since the web browser is executed on the users computer, the browser cannot be trusted even when using PKI and one-time passcodes! A recent untrusted browser attack on the gold standard of security, RSA SecurID, demonstrates this surprising fact. The consequences of this particular cyberattack were that 447,000 dollars was stolen from a company bank account in a matter of minutes, even though the valid user was using one-time passcodes to make the transaction more secure. The details of this cyberattack are quoted below in a MIT Technology Review, entitled Real-Time Hackers Foil Two-Factor Security, Sep. 18, 2009, which states, In mid-July, an account manager at Ferma, a construction firm in Mountain View, Calif., logged into the company's bank account to pay bills, using a one-time password to make the transactions more secure. Yet the manager's computer had a hitchhiker. A forensic analysis performed later would reveal that an earlier visit to another website had allowed a malicious program to invade his computer. While the manager issued legitimate payments, the program initiated 27 transactions to various bank accounts, siphoning off 447,000 dollars in a matter of minutes. "They not only got into my system here, they were able to ascertain how much they could draw, so they drew the limit," says Roy Ferrari, Ferma's president. The theft happened despite Ferma's use of a one-time password, a six-digit code issued by a small electronic device every 30 or 60 seconds. Online thieves have adapted to this additional security by creating special programs—real-time Trojan horses—that can issue transactions to a bank while the account holder is online, turning the one-time password into a weak link in the financial security chain. "I think it's a broken model," Ferrari says. Security experts say that banks and consumers alike need to adapt—that banks should offer their account holders more security and consumers should take more steps to stay secure, especially protecting the computers they use for financial transactions. We have to fundamentally rethink how customers interact with their banks online, says Joe Stewart, director of malware (malicious software) research for security firm SecureWorks, in Atlanta, Ga. Putting all the issues with the technology aside, if [attackers] can run their code on your system, they can do anything you can do on your computer. They can become you.

There is now widespread understanding, both in popular and technical domains, of the theoretical and practical fragility of online transaction security. The RSA SecurID token is the industry-leading technology for authenticating and securing identity in online transactions. The recent attack and subsequent breach of the RSA SecurID token (announced March 2011) has highlighted the fundamental problems with current cybersecurity solutions. Malware played a significant role in causing this breach. Malicious software has many forms: virus, worm, Trojan horse, spyware etc. all of which have the singular purpose of undermining the security, confidentiality, integrity or availability of computer systems. Recent uber malware is invisible. It encrypts and camouflages itself using the same mathematical techniques used by traditional, white hat cryptography. Eric Filiol, Malicious Cryptology and Mathematics, Cryptography and Security in Computing (Intech, 2012), pp. 23-50. http://cdn.intechopen.com/pdfs/29700/InTechMalicious_cryptology_and_mathematics.pdf Malware is able to phish passwords or hijack financial transactions made via mobile devices or personal computers without the users knowledge. It is not necessary for malware to break the cryptography of a device to compromise its security. Contemporary computers and electronic devices are particularly susceptible to malware attacks due to their processor architecture.

Specifically, the processors have a von Neumann architecture, which only execute one computing instruction at a time. As a consequence, malware has to corrupt or transform only a single machine instruction to initiate execution of malignant code. This is a deep vulnerability arising from current processor architecture and it cannot be easily rectified. Only one legitimate jump or branch instruction needs to be changed in a digital computer program to start it executing malware. During machine execution, after the von Neumann machine program has been hijacked by malware, anti-virus software, that is supposed to check the program, might not get executed, may be disabled or in other cases may never detect the malware. The sequential execution of von Neumann machine instructions hinders a digital computer program from protecting itself.

A common malware technique is the so-called man-in-the-middle attack. This attack is an active form of eavesdropping in which the attacker makes independent connections with the counterparties in a given transaction; by using appropriate authentication the attacker controls the entire transaction. The counterparties are unaware of the presence of the attacker and assume they are transacting securely with each other. Internet communications and financial transactions can be intercepted and hijacked by malware (malicious software) performing a man-in-the-middle attack. These attacks are not easy to detect or prevent. In particular, the RSA SecurID breach demonstrated that pseudo-random number generators (i.e., deterministic algorithms), typically used in two-factor authentication solutions cannot prevent man-in-the-middle attacks launched by malware.

Malware, however, has a significant weakness: malware is poor at recognizing visual images since computer algorithms cannot match the visual pattern recognition ability of the human brain. Human beings have highly advanced visual pattern recognition skills. The embodiments described here exploit this fundamental weakness of malware.

A third fundamental shortcoming of current cybersecurity solutions is the fact that static authentication factors, such as passwords, PINs and biometrics, are entered directly into the users computer or stored on computers in a digital or binary format such as ASCII code. This weakness makes static authentication factors vulnerable to phishing attacks in the host domain or security breaches in the network domain.

5 BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 shows a flow diagram of a user setting up the system to enable secure transactions.

FIG. 3A shows a flow diagram of an embodiment of step A of executing a secure transaction.

Figure 5:
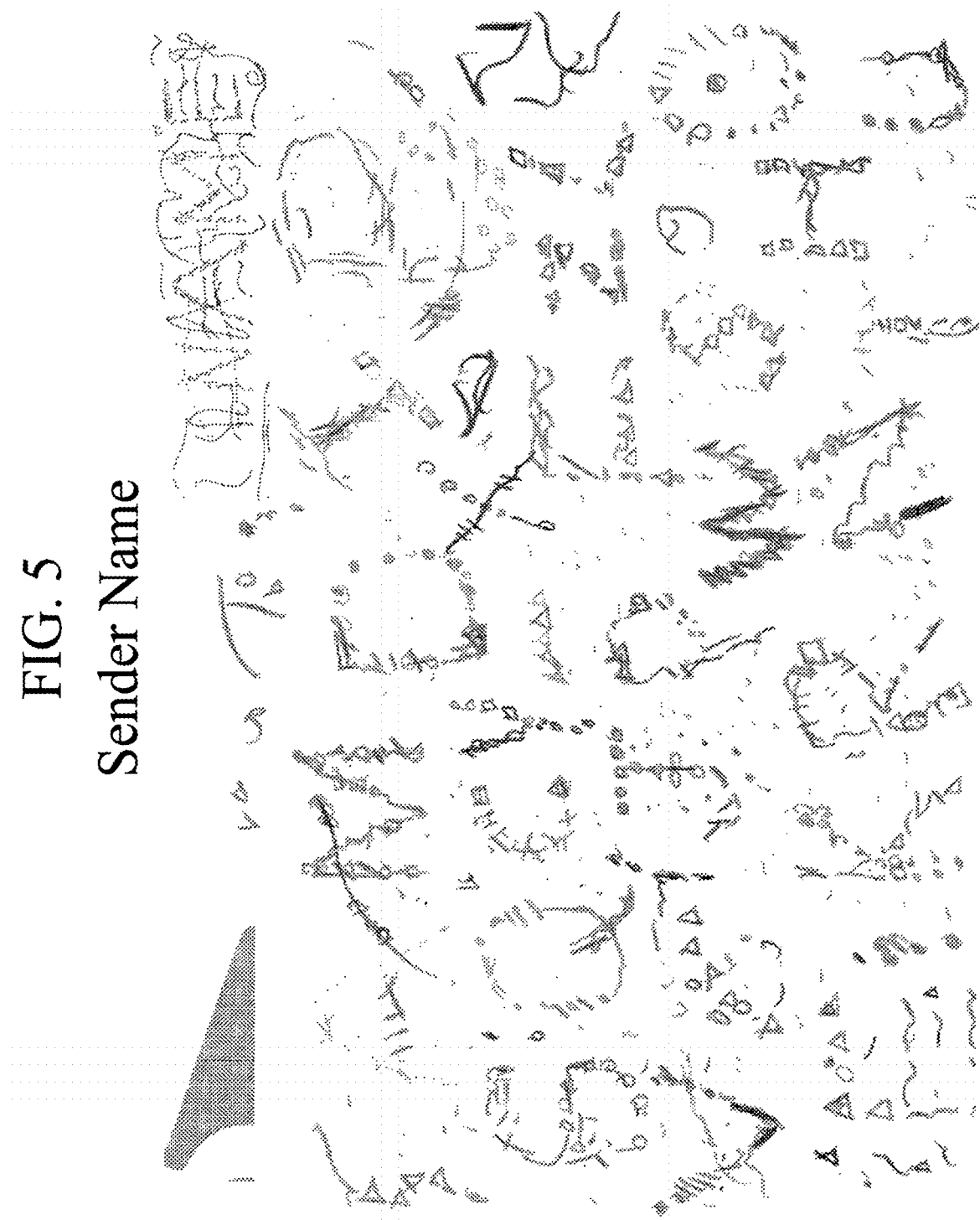

FIG. 5 shows a collection of images. One is part of a logo. There are 26 visual images of the alphabet letters ABCDEFGHIJKLMNOPQRSTUVWXYZ. The word NAME is made up of a collection of images with a doodle background texture.

Figure 6:
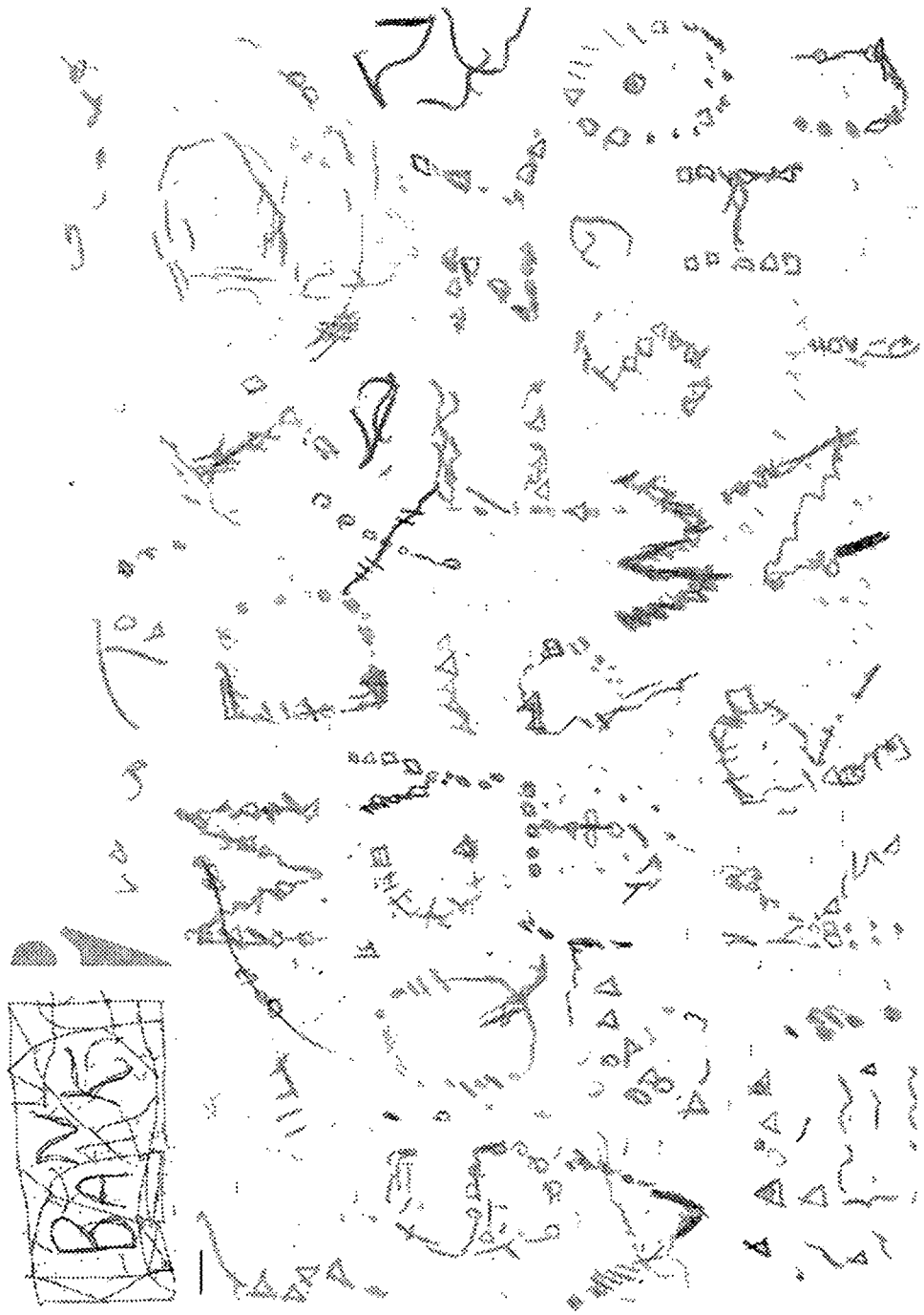

FIG. 6 shows a collection of images. One is part of a logo. Another is the word BANK with a simplicial and dotted texture background. There are 26 visual images of the alphabet letters ABCDEFGHIJKLMNOPQRSTUVWXYZ.

Figure 7:
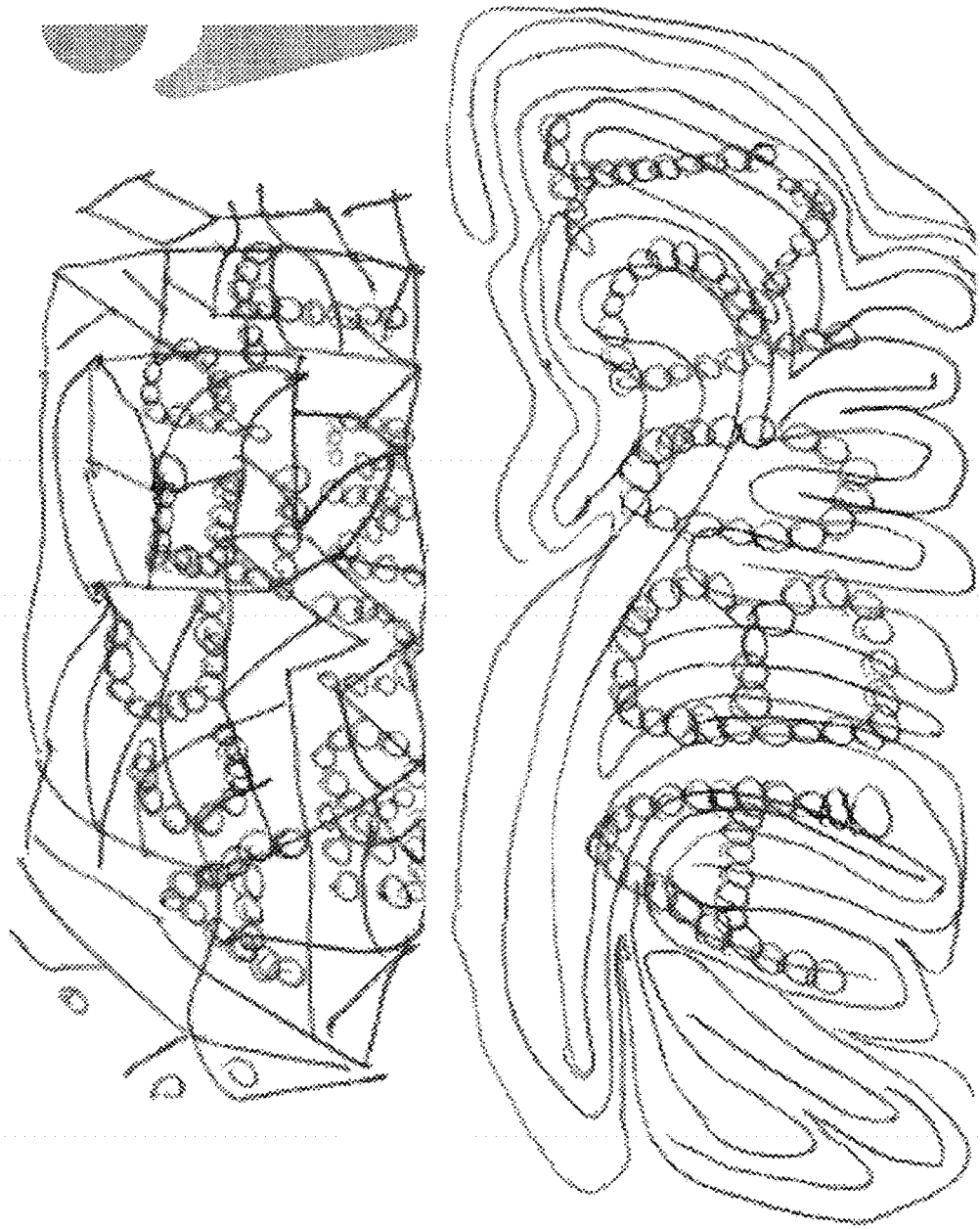

FIG. 7 shows a collection of images. One is part of a logo. Another is the word ACCEPT written with bubble texture on a simplicial background texture. And a third is the word ABORT written with bubble texture on a foliation background texture.

Figure 8:
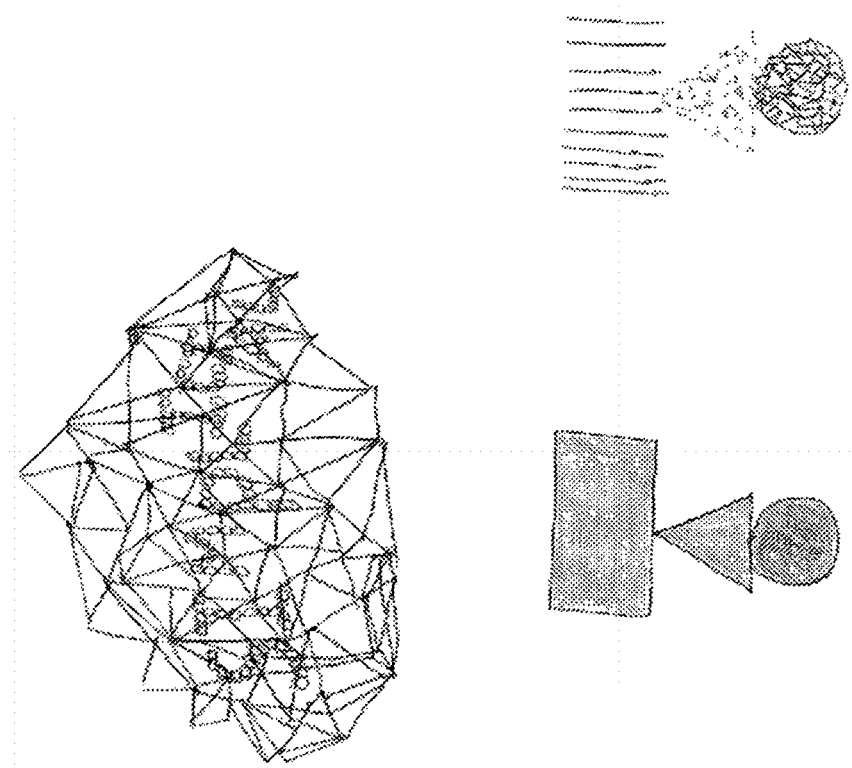

FIG. 8 shows a collection of images. One object is a geometric image of a blue rectangle on top of a blue triangle which is on top of a red blob. Just to the right is a rectangle with vertical texture on top of a triangle with dotted texture on top of a blob with simplicial texture.

Figure 9:
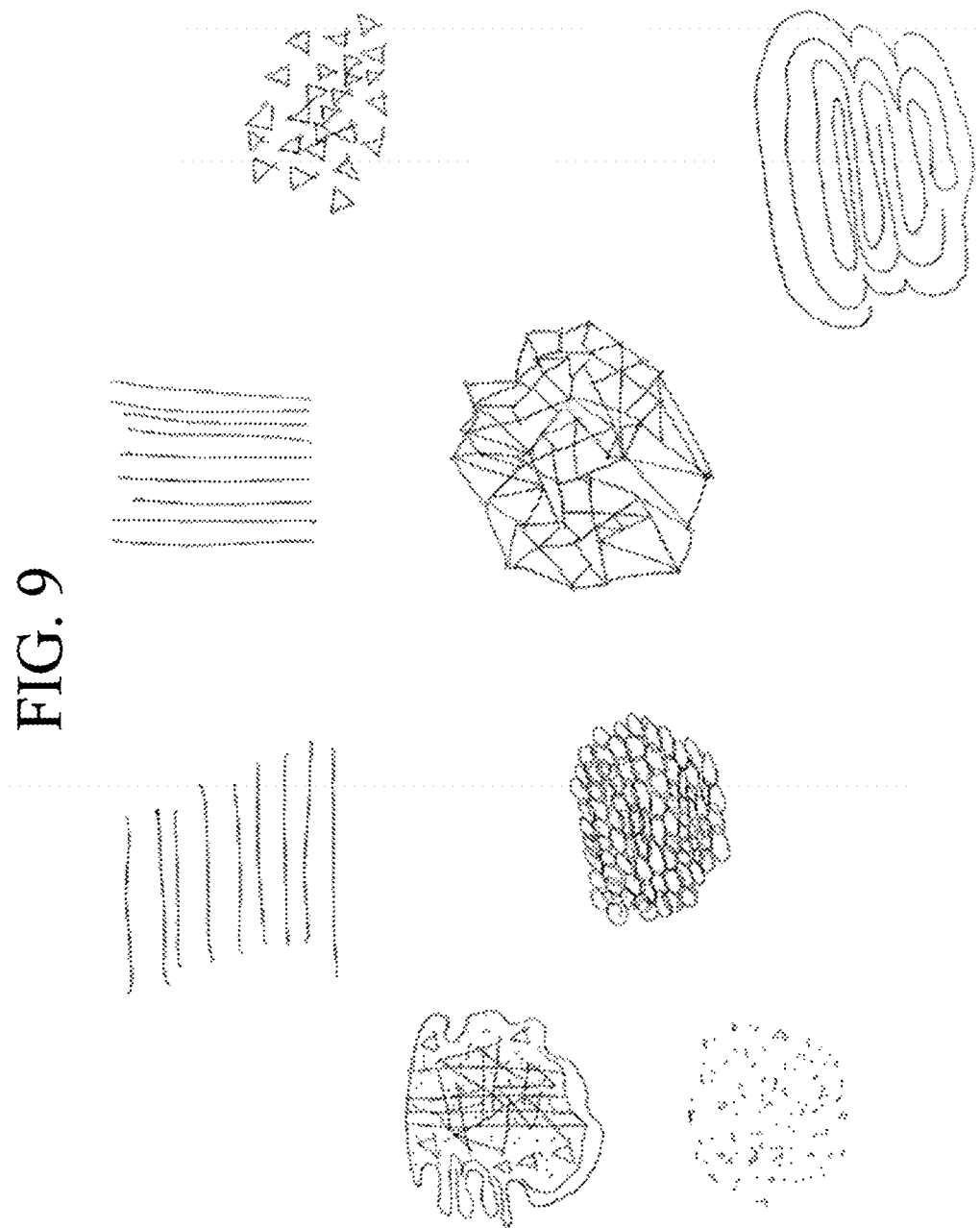

FIG. 9 shows a collection of images, illustrating some different textures. FIG. 9 shows nine different textures: vertical, horizontal, mixed, dotted, bubble, simplicial and foliation.

Figure 10:
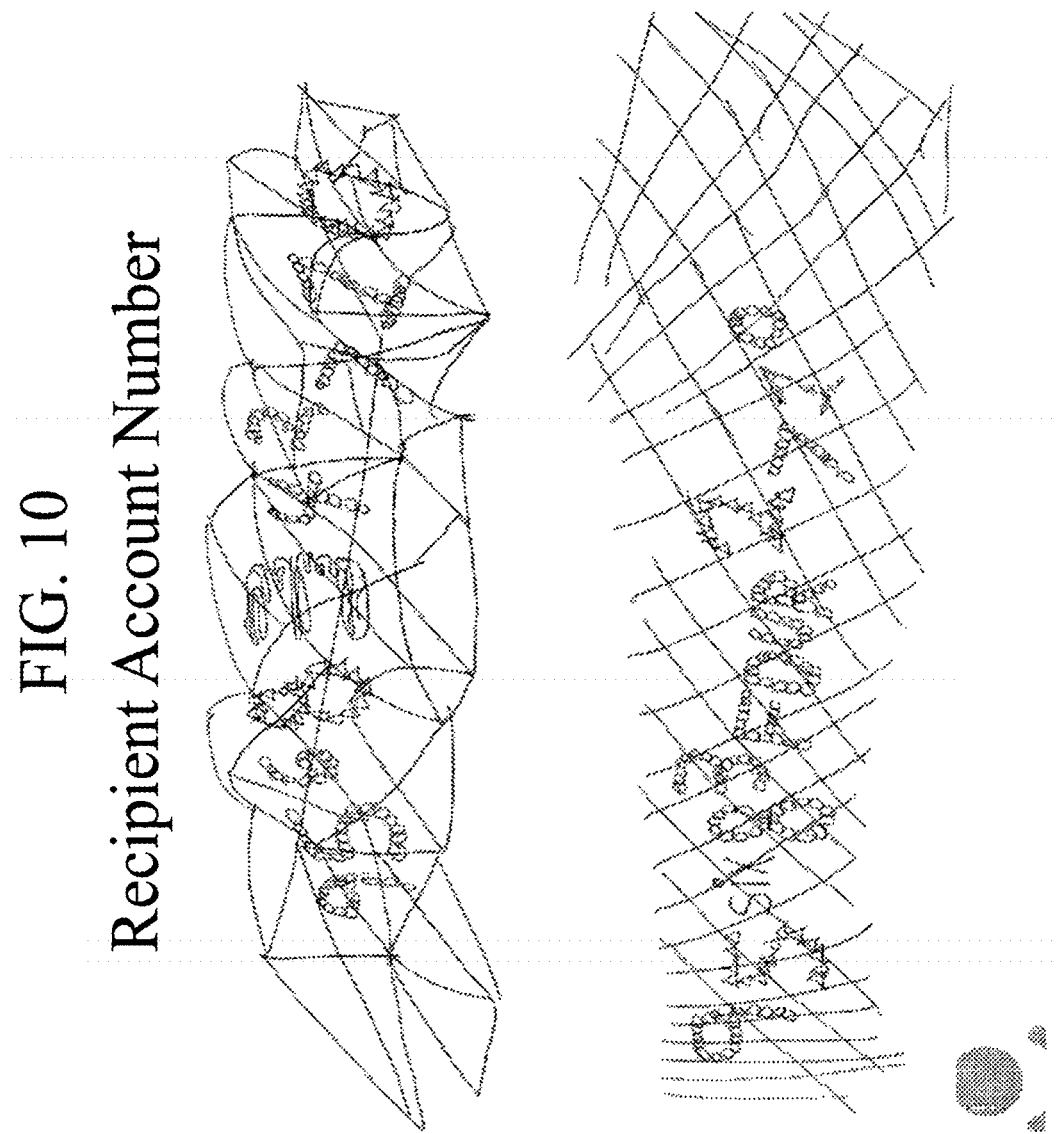

FIG. 10 shows recipient account number 9568342710 represented by two distinct collection of images. In the top representation, the number 3 is represented with a visual image using a triangular texture. In the bottom representation the number 4 is represented with the letters FOUR using bubble texture to write the letters. There is also part of a logo in the lower left corner of FIG. 10.

Figure 11:
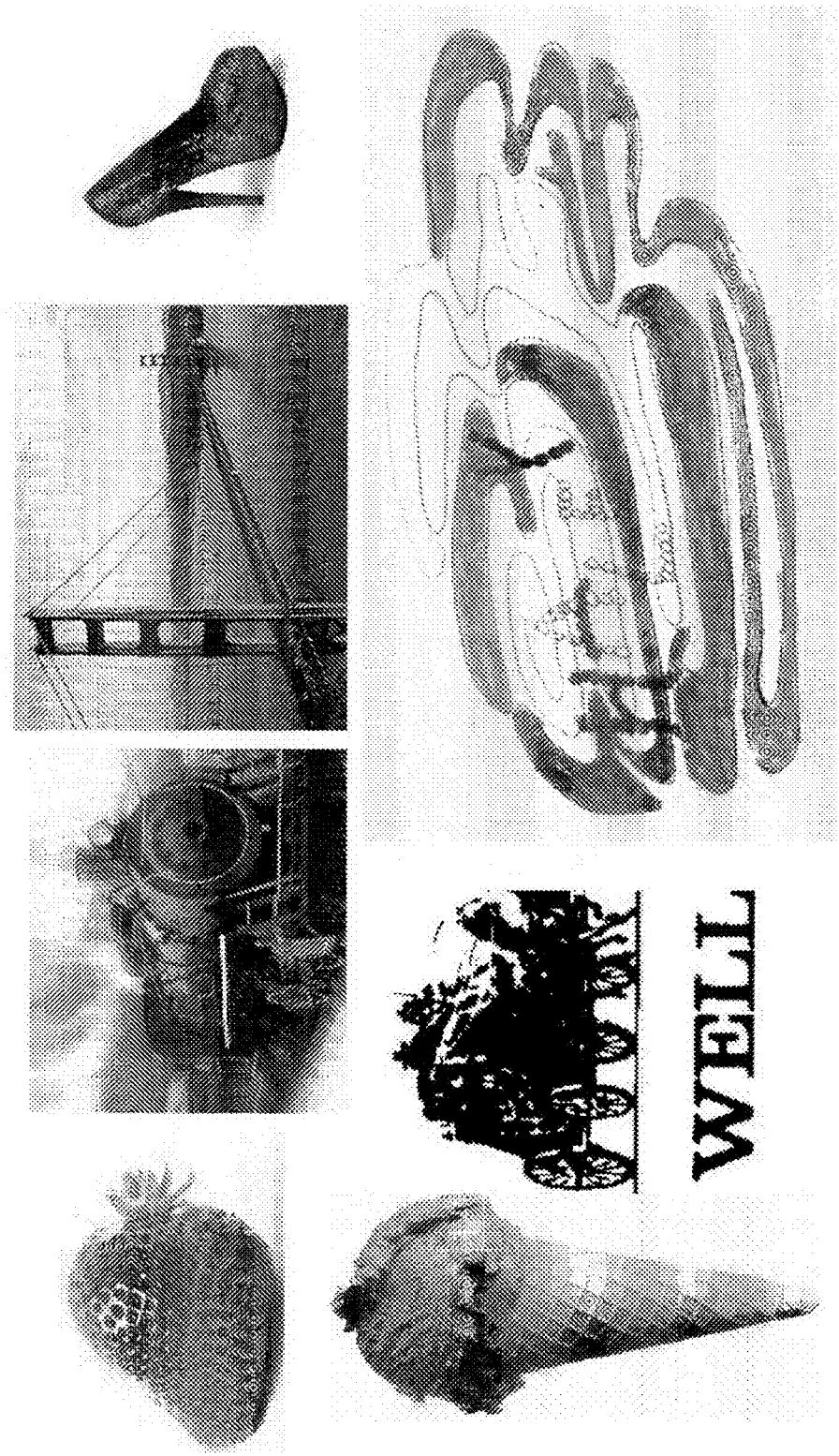

FIG. 11 shows a collection of images representing a universal identifer. A subset of these can be used for user authentication.

Figure 12A:
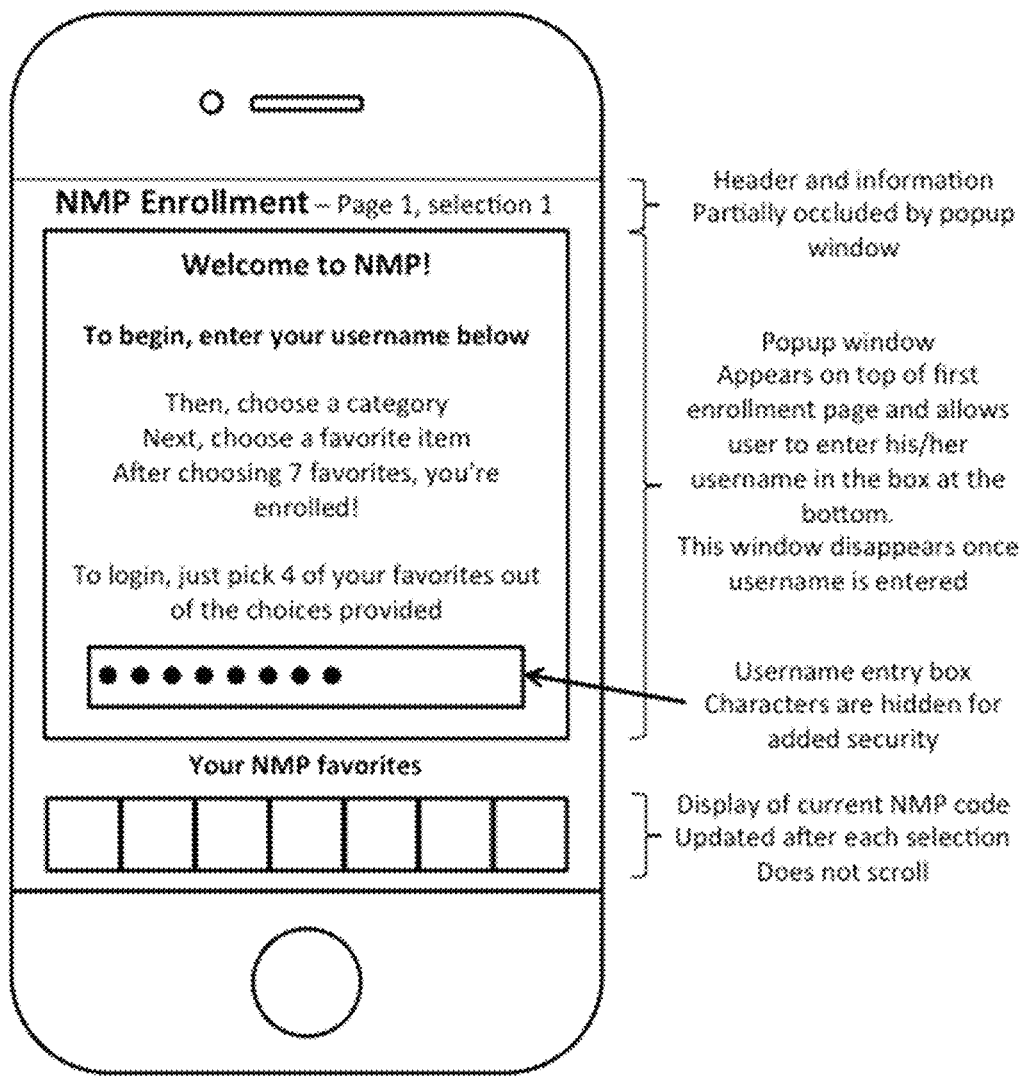

FIG. 12A shows a user interface page for enrollment.

Figure 12B:
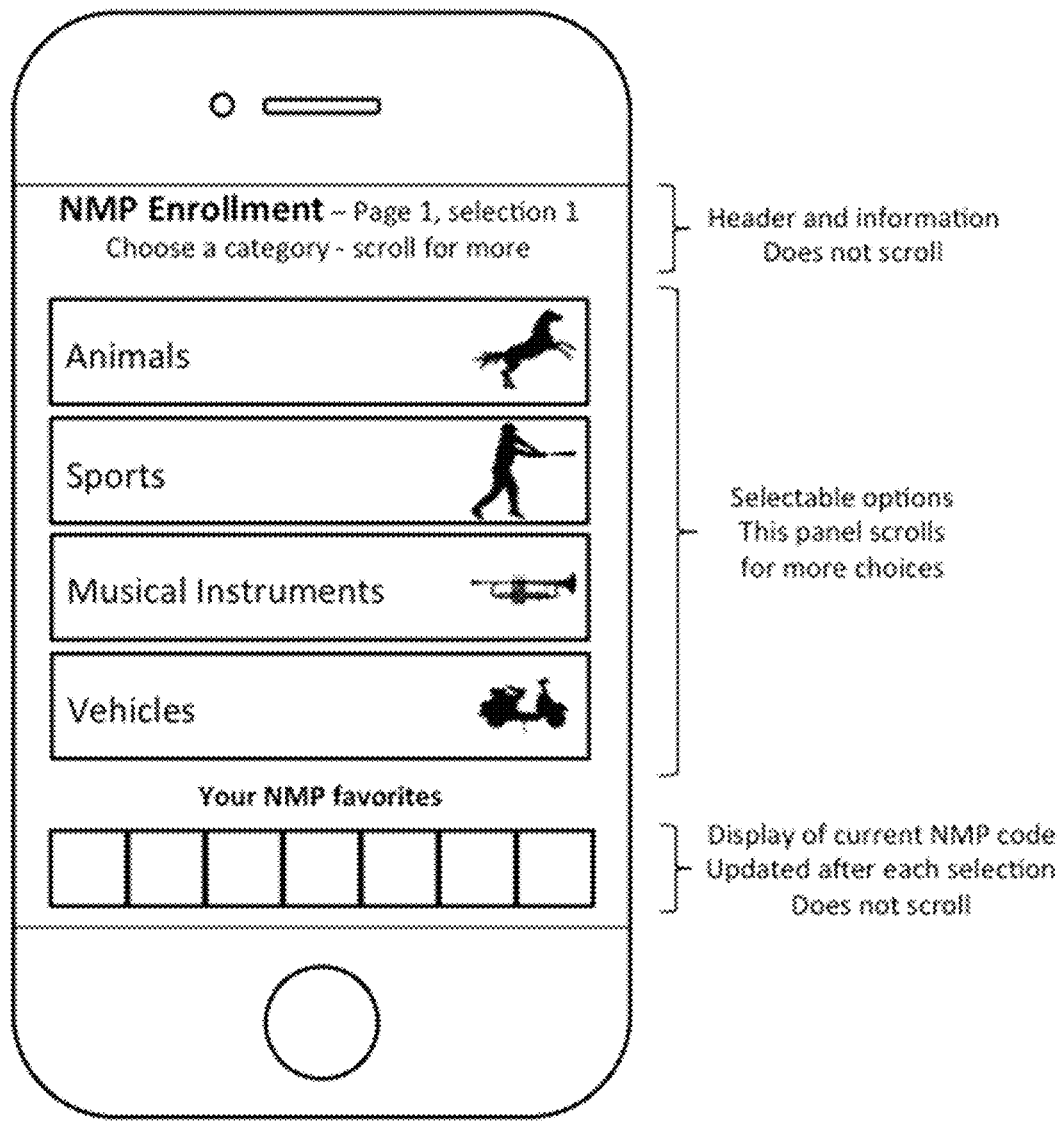

FIG. 12B shows a user interface page for enrollment that displays different visual image categories.

Figure 12C:
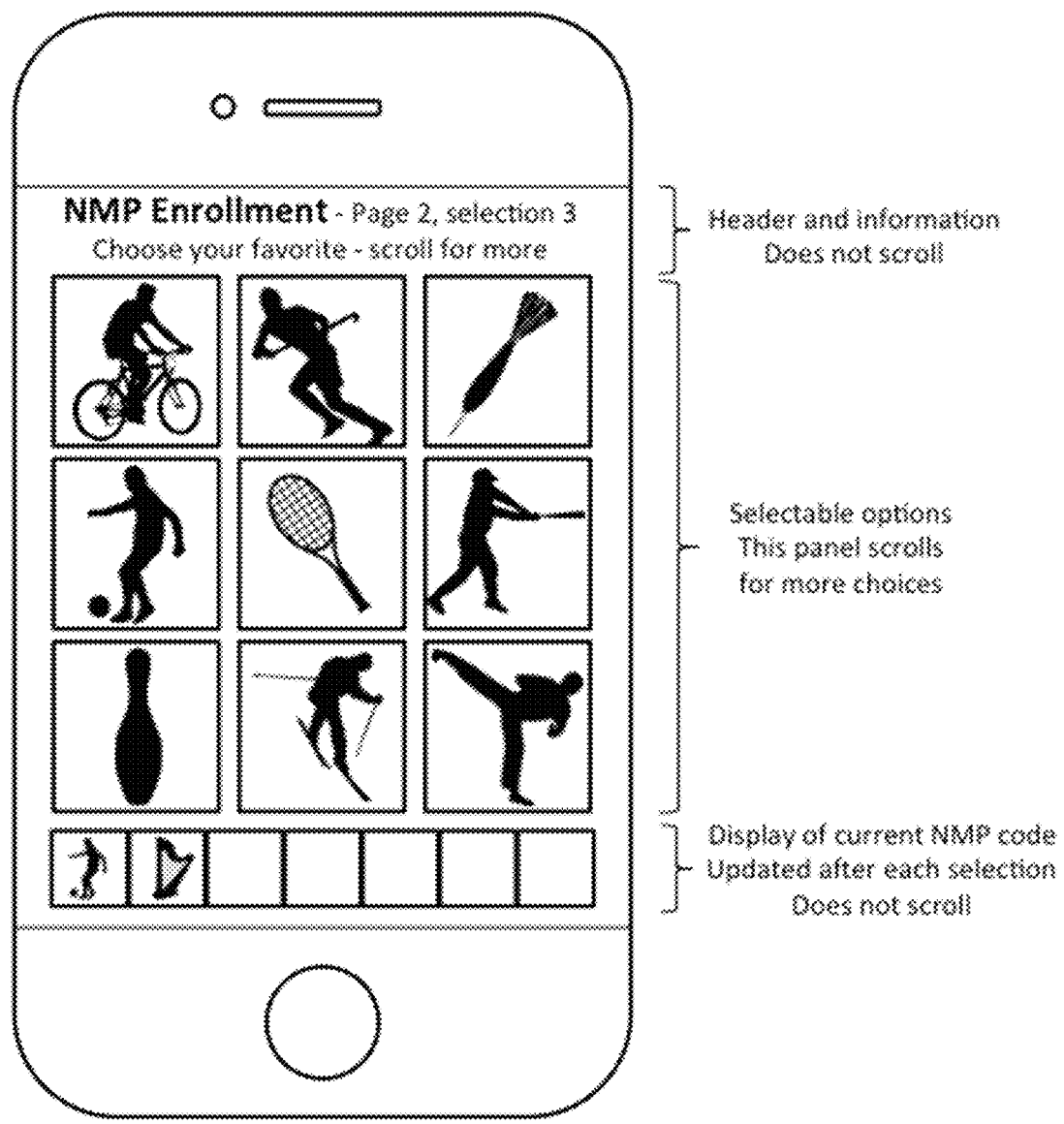

FIG. 12C shows a user interface page for enrollment that displays different images in the sports category. One image represents cycling. Another image represents tennis. Another image represents skiing.

Figure 13A:
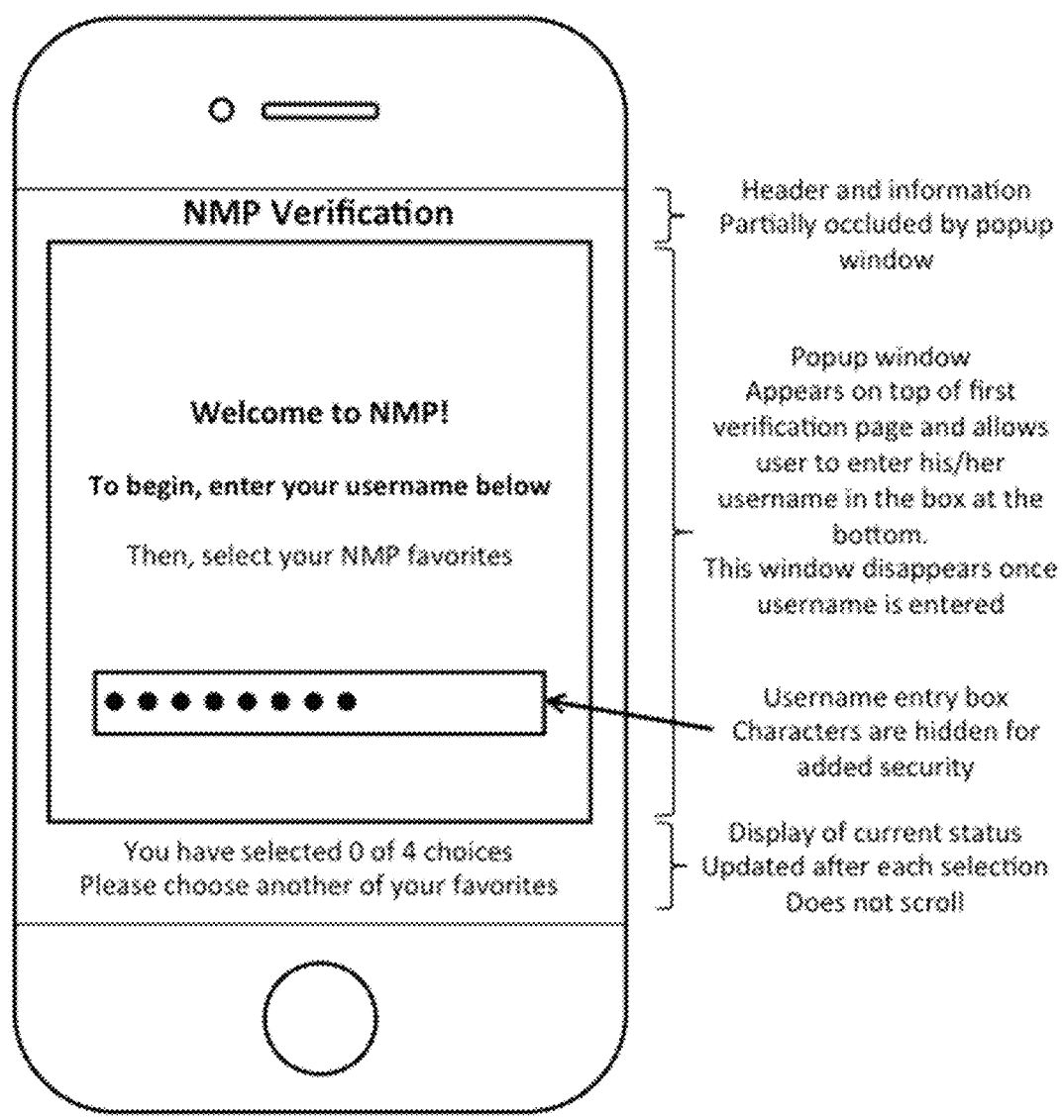

FIG. 13A shows a user interface page for user verification or user login using visual images.

Figure 13B:
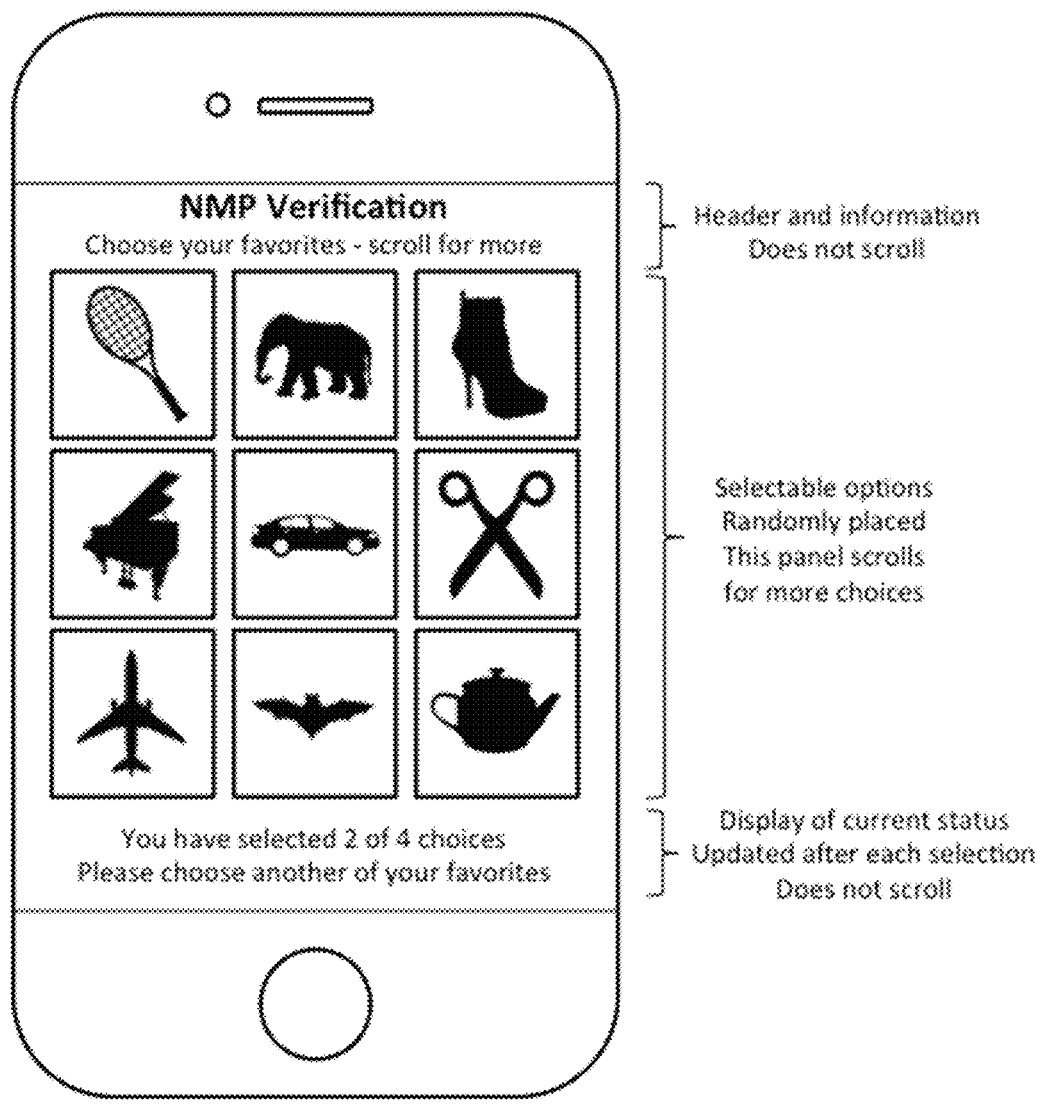

FIG. 13B shows a user interface page for user verification that displays different visual images. One image displays an elephant. Another image displays a car.

Figures 14A, 14B, 14C:
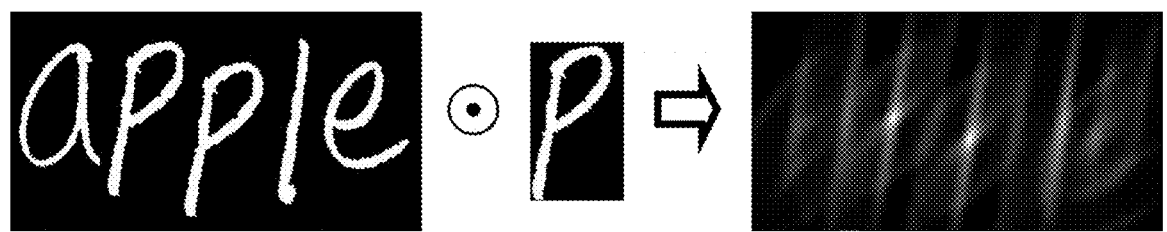

FIG. 14A, FIG. 14B and FIG. 14C show the use of correlation to detect and find the locations of features in an image. FIG. 14A shows an image of the word apple in a handwritten style font. FIG. 14B shows an image, representing the letter p in a handwritten style font. FIG. 14C shows a correlation function image, indicating the detection of the presence and exact locations of the letter p in the image in 14A, indicated by the bright peaks.

Figure 15A:
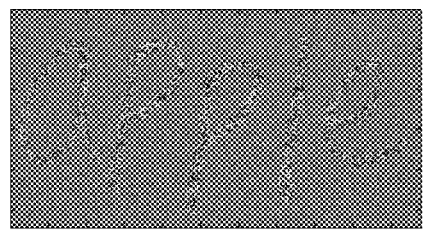
Figure 15B:
Figure 15C:
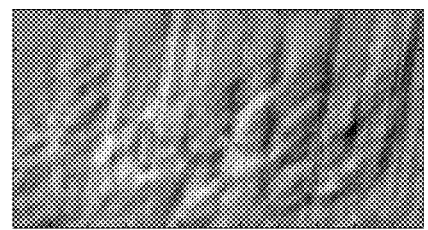

FIG. 15A, FIG. 15B and FIG. 15C show the use of special types of noise to hinder the use of the correlation operation to find features in an image.

FIG. 15A show an image, representing the word apple in the same handwritten style font as FIG. 14A, but with non-deterministic noise added. FIG. 15B shows a raw image, representing the letter p in a handwritten style font.

FIG. 15C shows an unintelligible correlation function image, indicating the inability to detect the locations of the p in the image in FIG. 15A.

Figure 16:
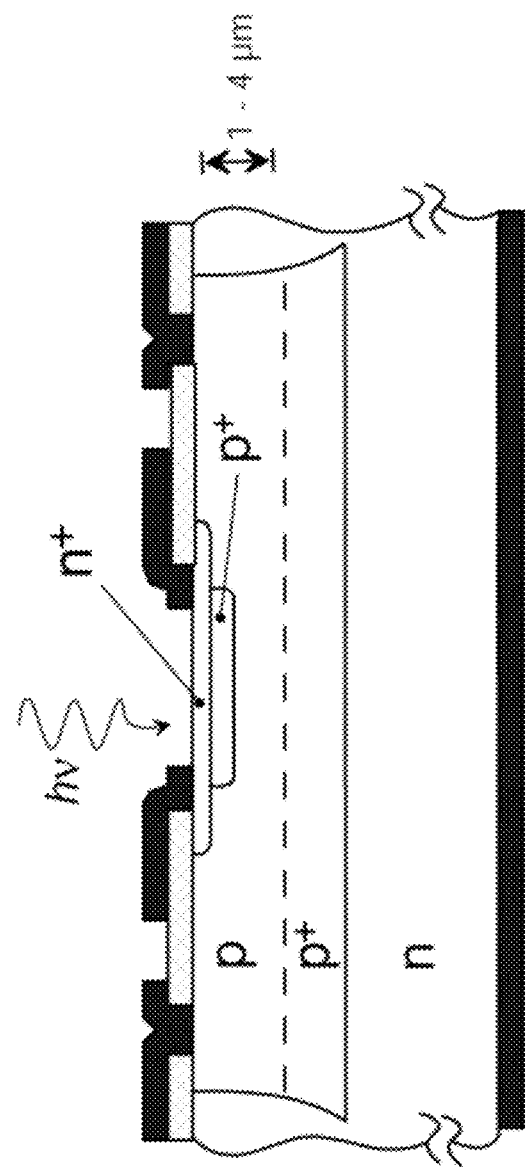

FIG. 16 shows a semiconductor device that is a photodetector. This hardware device can detect the arrival of single photons, which is an embodiment of quantum randomness.

Figure 17:
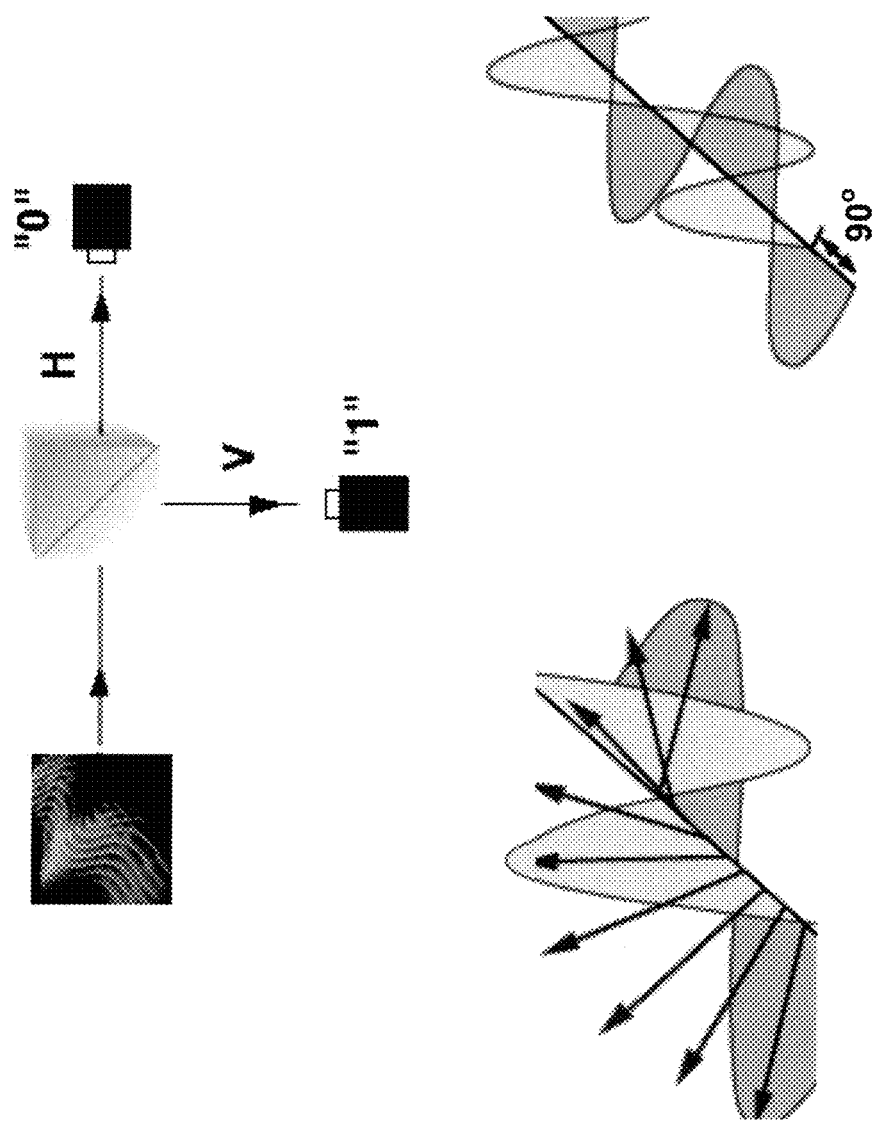

FIG. 17 shows a device that receives a polarized photon and splits it into a linear/horizontal vertical analyzer with 50 percent chance of detecting a 0 or 1. This hardware device can detect the polarization of single photons, which is an embodiment of quantum randomness. Under the device is a diagram representing a phton that is circularly polarized. Under the device, on the right, is a diagram representing a photon that is linearly polarized.

Figure 18:
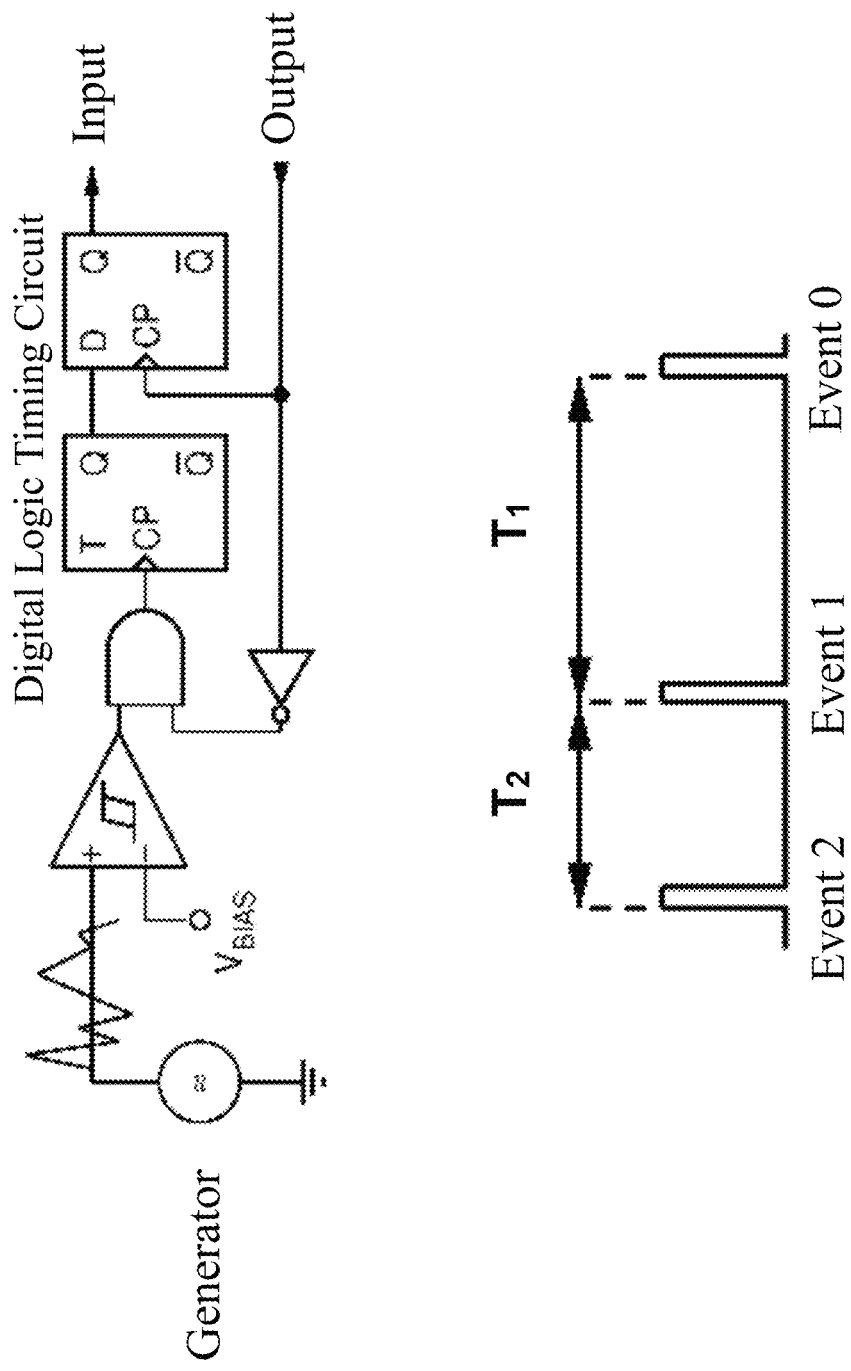

FIG. 18 shows a random noise generator and a digital logic circuit that captures and outputs this randomness. Below the generator are the time delays between separate events that are detected. In an embodiment, the random noise generator may be implemented with a photodetector as shown in FIG. 16. In this embodiment, the arrival times of photons enable quantum randomness.

Figure 19:
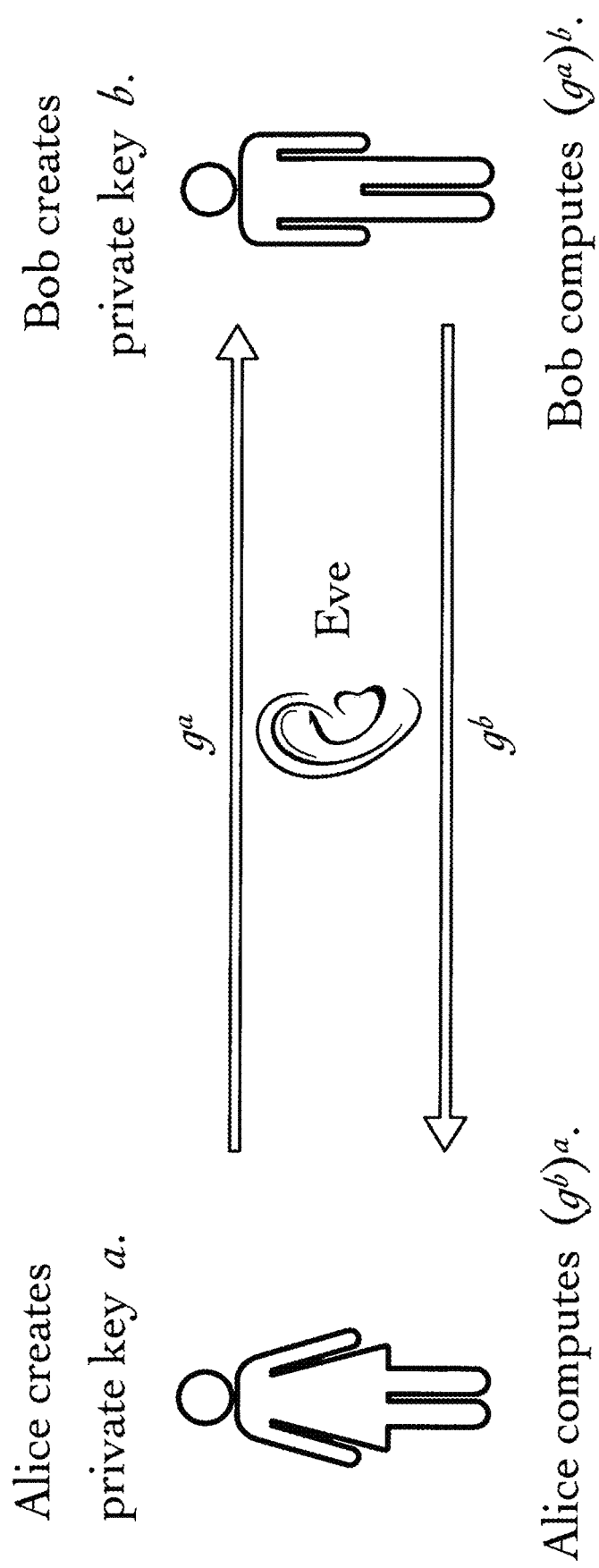

FIG. 19 shows a key exchange between Alice and Bob. a is Alice's private key and b is Bob's private key. a and b are large or huge natural numbers. g is an element of a commutative, finite, group G and the order of g is huge. $g^a$ is Alice's public key. $g^b$ is Bob's public key. Alice sends her public key $g^a$ to Bob. Bob sends his public key $g^b$ to Alice.

Figure 20:
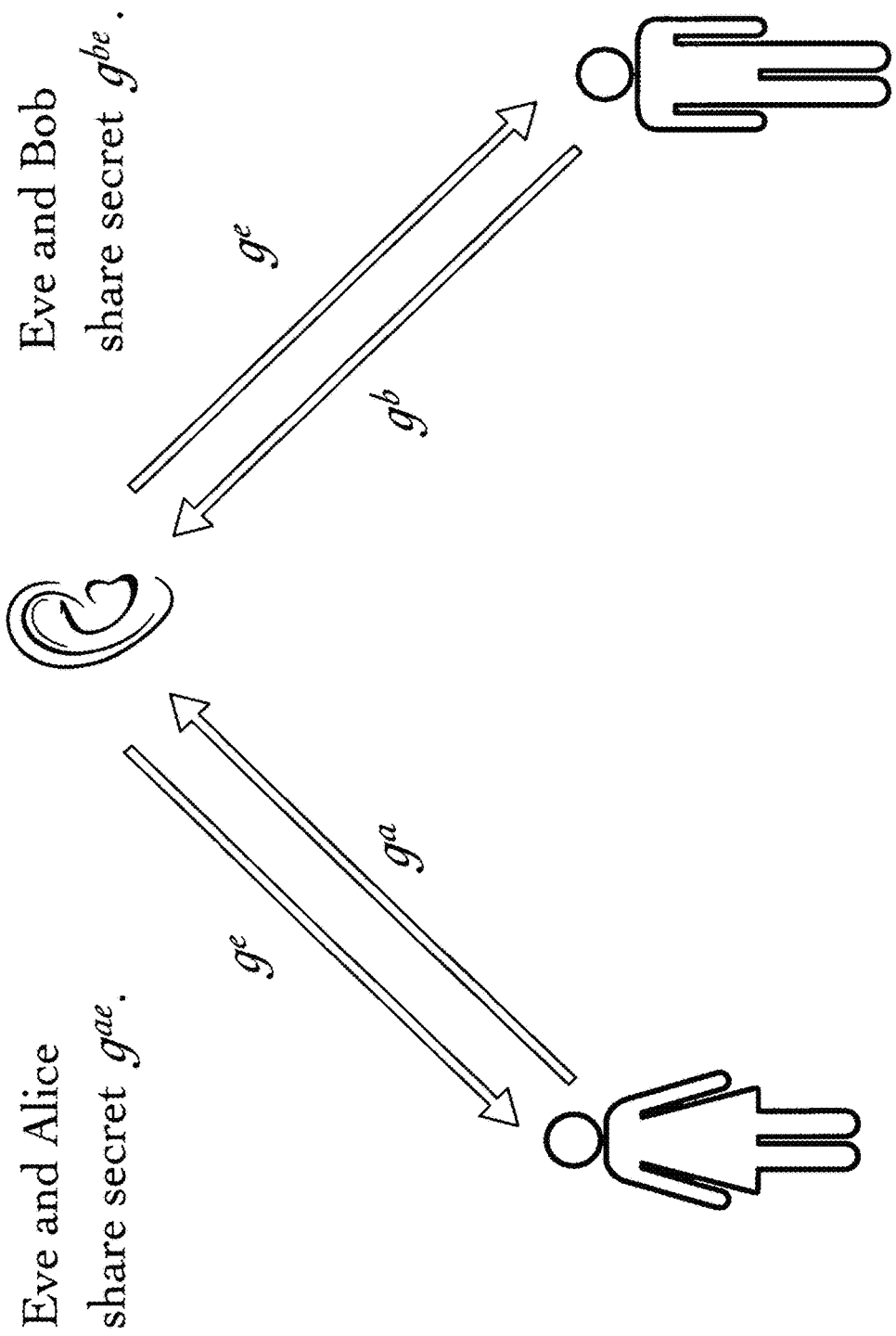

FIG. 20 shows a key exchange between Alice and Bob, where Eve has launched a man-in-the-middle attack on Alice and Bob. e is Eve's private key and $g^e$ is Eve's public key. Eve intercepts Bob's public key $g^b$ and sends Bob $g^e$. Eve intercepts Alice's public key $g^a$ and sends Alice $g^e$.

Figure 21:
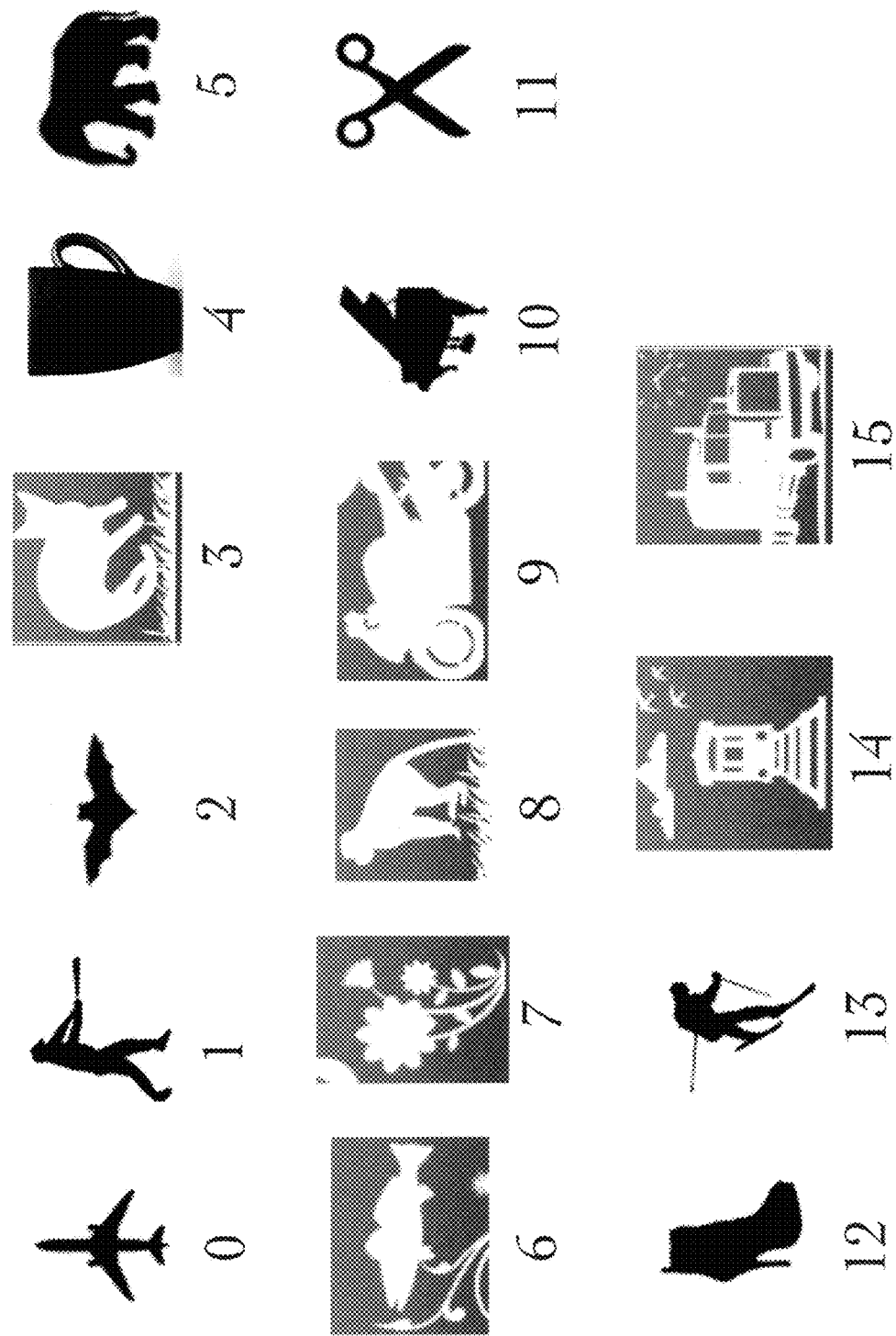

FIG. 21 shows 16 visual images and their corresponding image numbers below them. The image number of the airplane image is 0. The image number of the baseball image is 1. The image number of the bat image is 2. The image number of the cat image is 3. The image number of the cup image is 4. The image number of the elephant image is 5. The image number of the fish image is 6. The image number of the flower is 7. The image number of the monkey is 8. The image number of the motorcycle is 9. The image number of the piano is 10. The image number of the scissors is 11. The image number of the shoe is 12. The image number of the skier is 13. The image number of the train is 14. The image number of the truck is 15.

Figure 22:
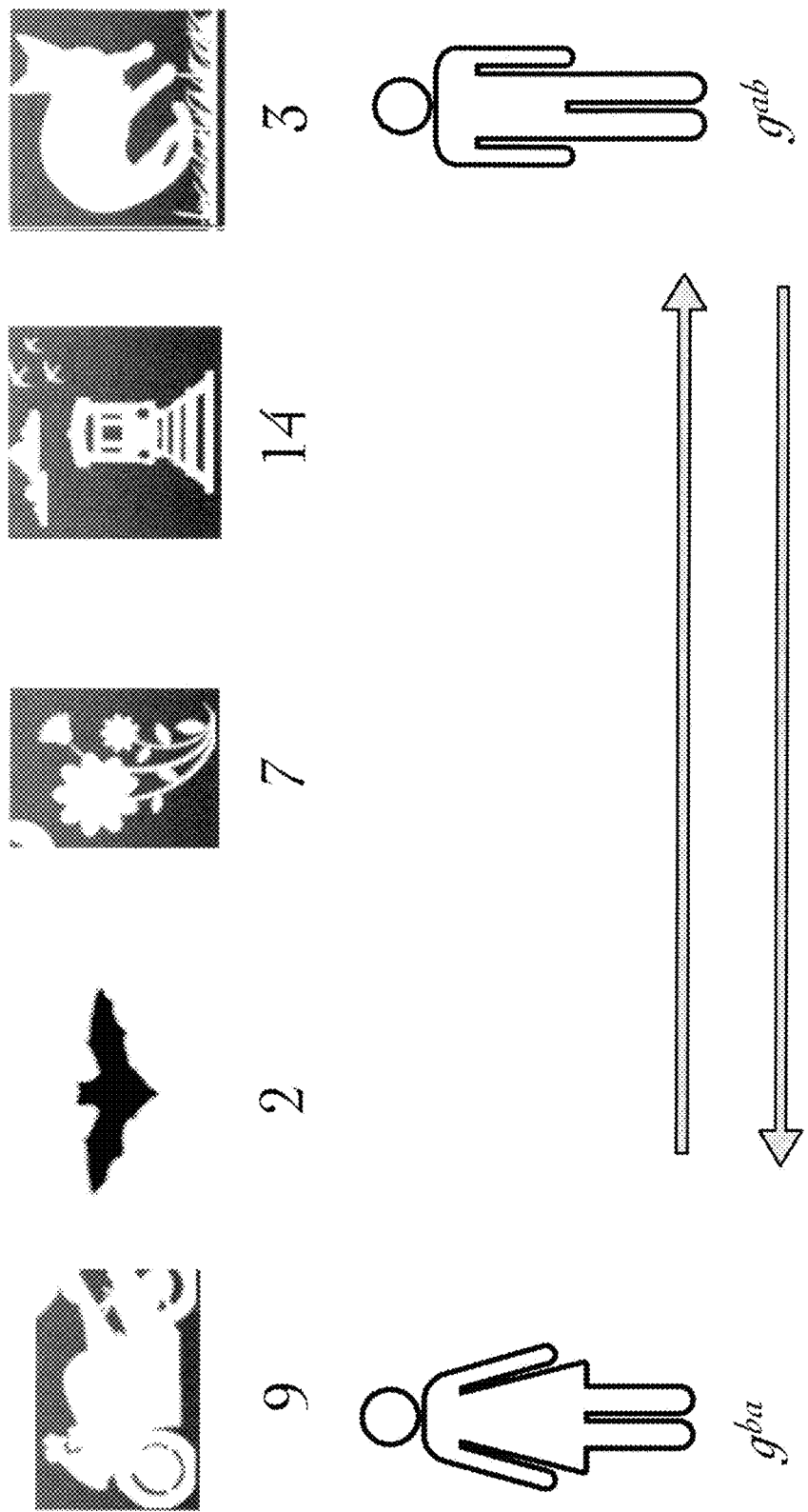

FIG. 22 shows Alice and Bob using visual image authentication to verify that Eve has not launched a man-in-the-middle attack on their key exchange. Alice and Bob both see the visual image sequence: motorcycle, bat, flower, train, cat.

Figure 23:
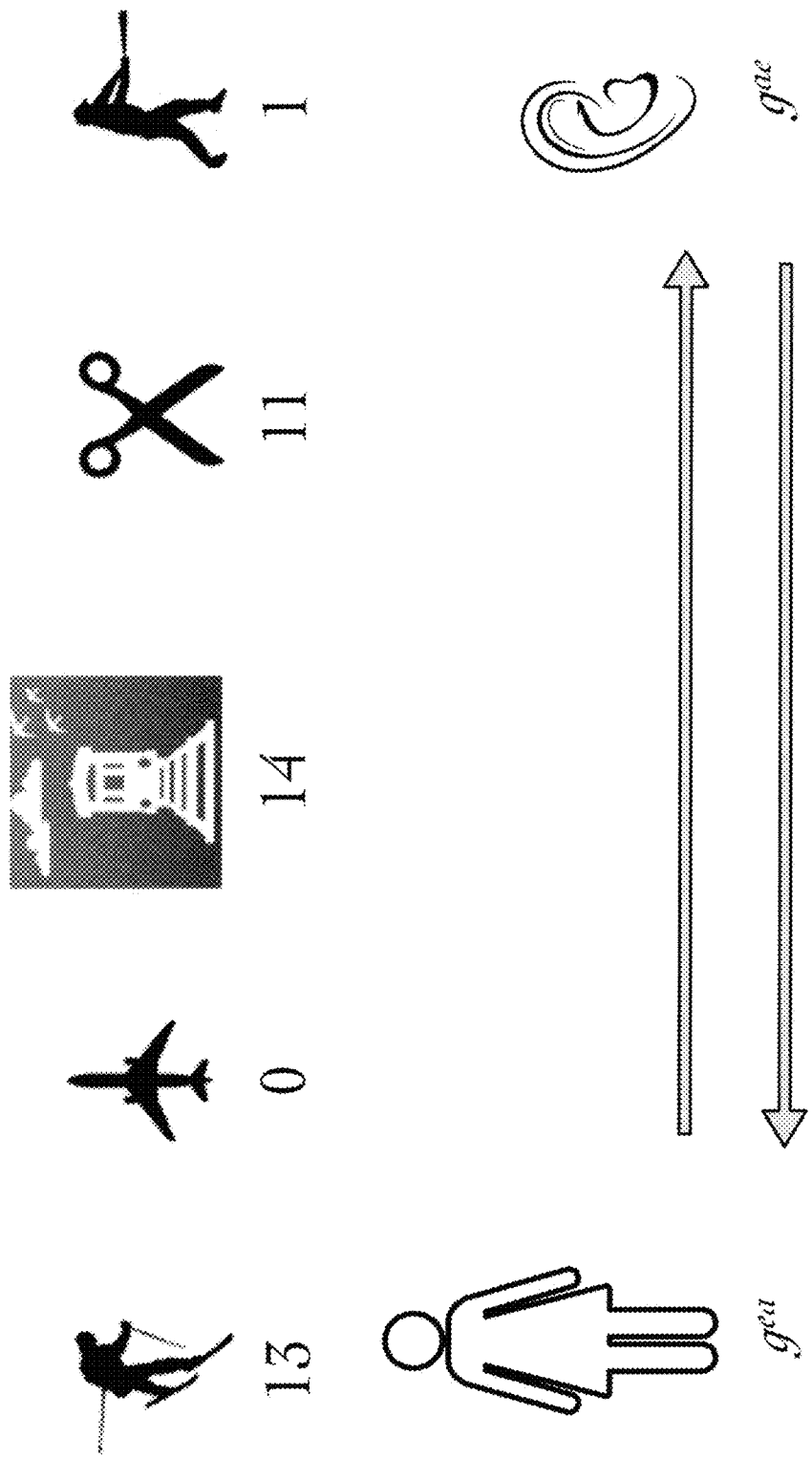

FIG. 23 shows a key exchange that has been hijacked by Eve. Alice has received Eve's public key $g^e$ instead of Bob's. Alice has computed a shared secret $g^{ea}$ with Eve and Alice's derived visual sequence of images is skiing, airplane, train, scissors, baseball.

Figure 24:
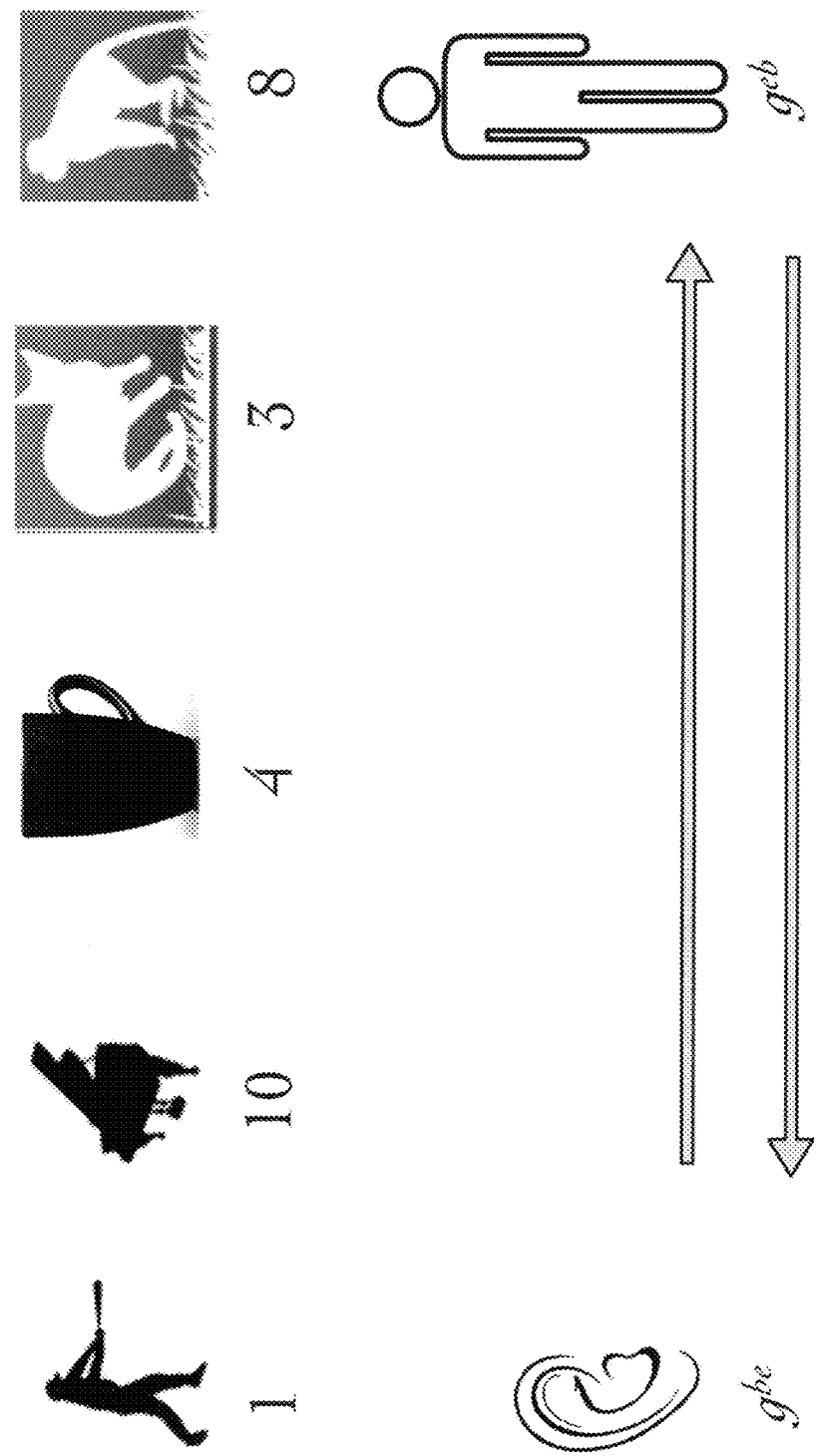

FIG. 24 shows a key exchange that has been hijacked by Eve. Bob has received Eve's public key $g^e$ instead of Alice's.

Bob has computed a shared secret $g^{eb}$ with Eve and Bob's derived visual sequence of images is baseball, piano, cup, cat, monkey.

Figure 25:
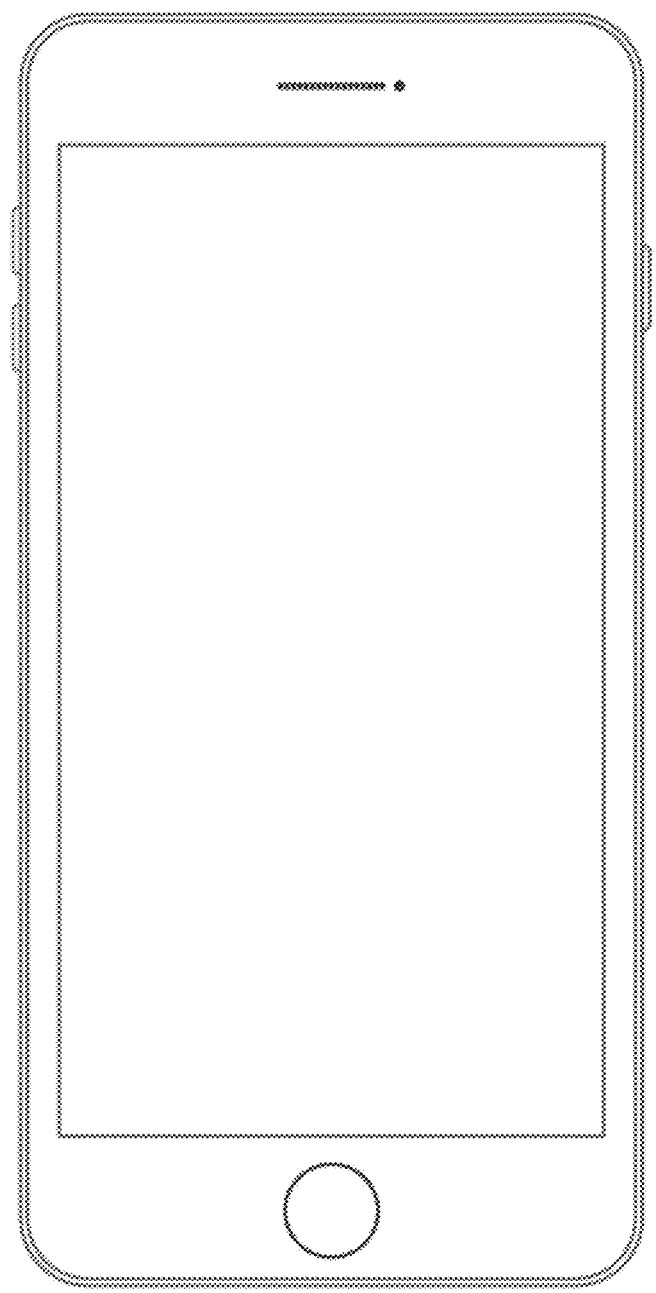

FIG. 25 shows a display screen of a smartphone.

Figure 26:
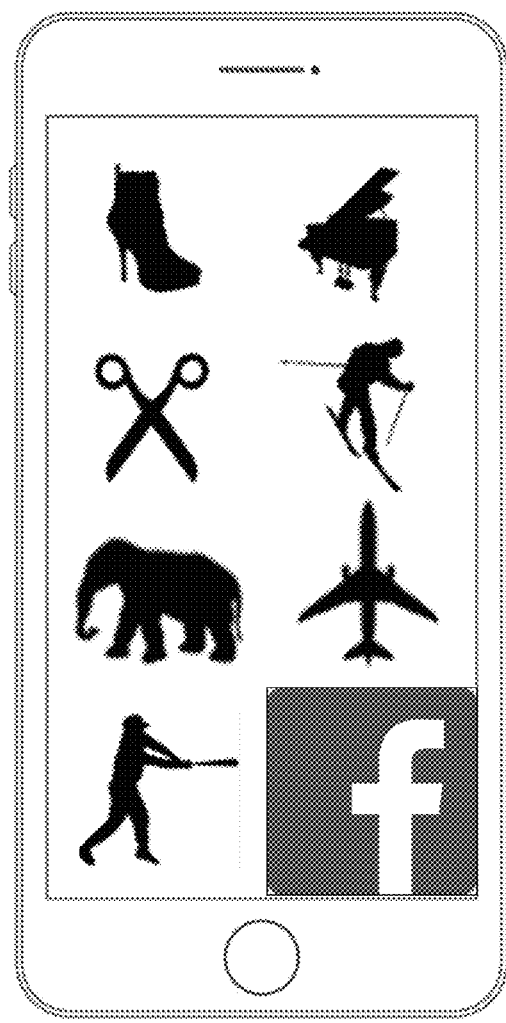

FIG. 26 shows a screen that displays eight different visual images where one of the visual images is the Facebook logo.

Figure 27:
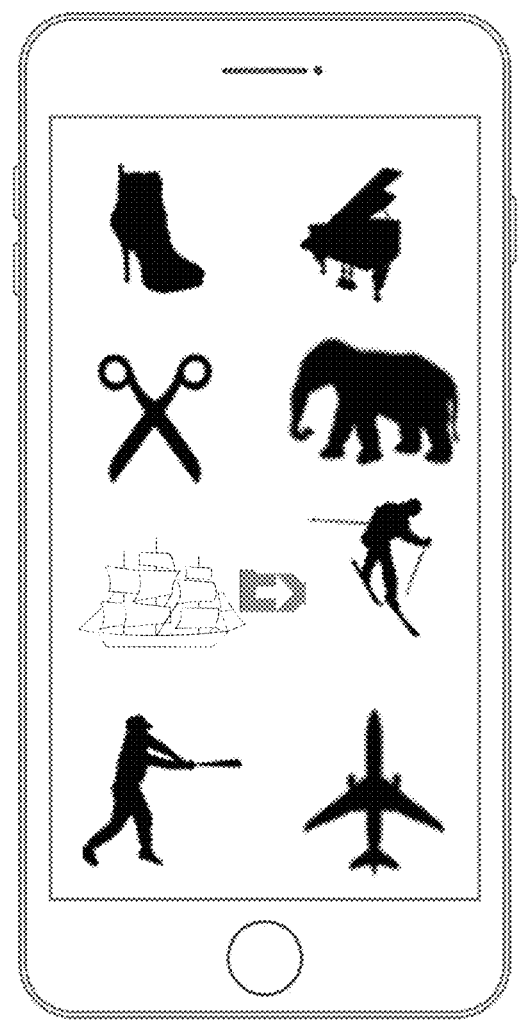

FIG. 27 shows a screen that displays eight different visual images where one of the visual images contains a combination of a ship and the arrow in the FedEx logo.

Figure 28:
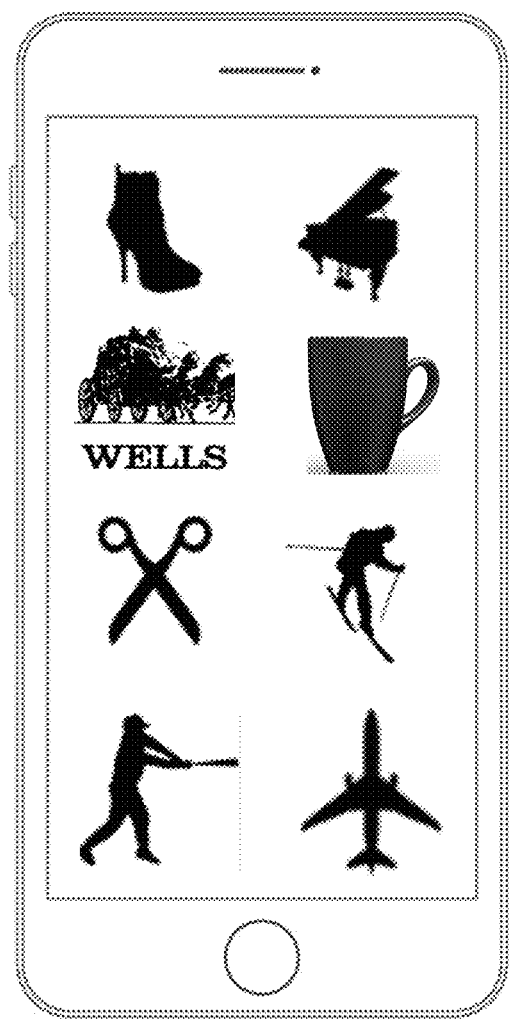

FIG. 28 shows a screen that displays eight different visual images where one of the visual images contains part of the Wells Fargo stagecoach.

6 DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Novel methods for cybersecurity is described that is more secure against modern malware, and provides a much better user experience compared with passwords or hardware tokens such as SecurID. In some embodiments, this invention uses visual images that are selected by a user to create a set of "favorites" that can easily be recalled and quickly selected by the user at login.

This invention leverages the superior power of eye-brain processing of humans and the natural language processing of humans versus machines to ensure that a human, and not a bot or malware, is involved in a transaction or communication.

Underlying the simplicity of this approach is a security technology that includes: A.) A non-deterministic random number generator hardware based on quantum physics. B.) Noise modification of images using the random number generator. C.) Visual image morphing, positioning and reordering based on the random number generator. D.) Transaction-dependent passcodes.

The application of multiple methods in concert addresses current cybersecurity issues, as well as anticipating other possible approaches that hackers may attempt in the future, while the flexibility of the approach supports the creation of advanced, user-friendly user interface designs.

Malware, phishing scams and other various forms of hacking and cybersecurity breaches have become a major issue today. The use of passwords is inadequate, inefficient and problematic for users and companies, and the problems with password use are increasing steadily.

The invention(s) described herein uses the unique, innate pattern recognition skills of humans to transform cybersecurity. It advances online transaction security, which currently relies mainly on the straightforward use of passwords or, in some cases, the addition of other security enhancements that may provide some improvement in security, but are still inadequate. These measures typically increase the cost of the system while greatly reducing the convenience to the user.

Malware resistant authentication and transaction authorization is provided through the combined application of various methods and embodiments. In an embodiment, this invention can eliminate use of the alpha-numeric password such as 34YUiklmn or a sequence of ASCII symbols such as "94Yzi2_e*mx&". The invention(s) herein also provides a basis for a much-improved user interface and the overall user experience around securing online transactions, access control, and the protection of an individuals personal data and identity.

The invention(s) described herein use visual representations (images) that are both personal and memorable to each individual user. There is an enrollment process in which the user selects a set of images from a group of categories representing the users favorites. At verification (i.e., login time) the user is asked to select some or all personal favorites from a set of randomly-selected options as verification of both the users identity and the fact that the user is in fact a human instead of an automated system that has hijacked the transaction flow. This approach has a number of advantages in terms of convenience to the user, while allowing anti-malware methods to be applied that provide substantial anti-hacking capability.

6.1 User Interface Design

The use of visual images to create a unique identity for a user has many advantages: The system is not only highly secure and resistant to various hacks and malware attacks, but is also intuitive, easy to use and attractive to users. The core technology behind an identity security system should support a user interface (UI) that provides these benefits; there is sufficient flexibility in the UI design and a range of security-enhancing features that can be used together in various ways to allow the UI design to be tailored to the needs of both the user and the device (e.g., PC, IPhone, Android IPhone, IPad, tablet computer) on which it is being used.

Since interaction with the user is a key part of the technology, it is helpful to describe a UI design example for two reasons: 1) to ensure that the technology is both effective and easy to use; 2) to help explain how embodiments work. The UI should be designed to run on the device(s) of choice within the intended application and tested for intuitiveness, ease of use, functionality, acceptance by and attractiveness to product users.

The UI described in this section shows how the user interface design can be implemented on a mobile phone. The example shown here is only meant to provide general clarity about what can be done with this technology and to serve as a high-level use case to describe the flow for creating and entering a unique login identity for a user.

Enrollment. To enroll, the user first initiates the enrollment. The process will start with the launching of an application, or a request to enroll within a running application on a particular device such as a mobile phone, computer, terminal or website. In the example here, and figures below, the device is a mobile phone and the user starts the enrollment process by launching an app.

Once launched, the application starts enrollment by displaying the first enrollment screen with a superimposed popup window that provides brief instructions for enrollment and a box in which the user is asked to enter a username. This is shown in FIG. 12A.

As soon as the username has been entered, the popup window disappears, showing the first enrollment screen that provides a list of categories for the users favorites, as shown in FIG. 12B. These categories can include almost anything, such as animals, musical instruments, travel destinations, famous people, sports, etc. In this example, a few items from the list of categories are displayed on the screen, but the central portion of the screen with the category icons can be scrolled up or down to show other choices. The items that the user has currently chosen are shown as small icons at the bottom of the screen. This part of the display (and the header at the top) does not scroll, and provides a running tally of the users choices throughout the process. This also serves as messaging to the user as to the progress of the enrollment process.

In an embodiment, after a category has been selected, a second screen appears showing specific items in the chosen category. This screen is shown in FIG. 12C. The tally of choices is carried over, and shown at the bottom of this screen as well. Again, in this example, the central portion of the screen with the icons can be scrolled up or down to display more than the nine items shown on the screen at one time. The user can then select his/her item from the available choices. Once a selection is made, the item chosen appears in the running tally below, and the display reverts back to the first enrollment screen which provides the category choices again.

This process is repeated seven times in this embodiment. The number of choices required from the user for enrollment can be changed, depending on the security level required, and an acceptable enrollment process for a particular case. In general, the fewer the choices required by the user, the less secure the embodiment will be, but the trade off between security and ease of use is important, and should be decided on a case-by-case basis.

FIG. 12A shows page 1 of an enrollment user interface (UI), which shows the popup window superimposed requesting entry of the username. In an embodiment, for added security, the username is obscured in a similar way as is typically accomplished with a password field.

FIG. 12B shows page 1 of an enrollment UI after the disappearance of the popup window, showing the same screen 1 the scrollable favorites category selections, and the boxes at the bottom of the screen where the running tally of the users choices will be displayed FIG. 12C shows enrollment page 2 showing 9 of the specific item choices available, and allowing the user to scroll for more. In this diagram, the user had selected sports as the category on the previous page, and this is the third favorite, as indicated by the running tally below showing the two previous choices, and the note in the header that reads selection 3.

6.2 Verification (Login)

In some embodiments, the enrollment process may take a minute or more, and require the user to be guided through multiple steps. It is desirable for the verification process to be quick and short as possible. This is well-known in biometrics since biometric devices usually require a sequence of steps to enroll. At verification, however, the expectation of the user is that the use of the technology will make verification of their identity not only more secure, but much easier and faster. The same is applicable with implementations. Despite widespread identity theft and hacking, some users are far more concerned with convenience than they are about security.

In the example presented here, an enrolled user initiates verification by launching an image-enabled app, or requesting login to a local or remote system Immediately, the verification screen appears with a randomized group of choices for the user, and a popup window superimposed that requests entry of the username, as depicted in FIG. 13A.

Once the username is entered, the popup window disappears exposing the screen with the randomized choices for the user to select. This is shown in FIG. 13B. The options offered on a single screen contain at least one of the users favorite images that were selected at enrollment, but also contains a number of other incorrect options that are selected randomly from a large set of options. The central portion of the screen with the icons of the selectable items can be scrolled up or down to expose more choices. In this example, to pass verification, the user chooses four of the seven favorite items that were chosen at enrollment. After a complete set of favorites have been correctly selected, the screen disappears, and login proceeds. If the choices are incorrect, the login process starts over again from the beginning. For added security, there may be a limit placed on the number of failed attempts a user can make in a login session.

FIG. 13A shows a verification user interface (UI) page with the popup window superimposed requesting entry of the username. In an embodiment, the verification page is a single page to make verification quick and simple. Also note again that for added security, the username can be obscured in the same way as is typically done with a password field.

FIG. 13B shows the verification user interface page after the disappearance of the popup window showing the scrollable favorites selections that have been randomly selected from a large array of options. As indicated in the footer at the bottom of the screen, the application is ready for the third favorite out of a total of four required for verification. In other embodiments, more than four favorites may be requested for a successful login. In another embodiment, more than four favorites may be requested to complete a financial transaction. In other embodiments, less than four favorites may be requested for a successful login.

In embodiments, robust security is desired but also convenience and a positive experience of the user are also important. There is sometimes a tradeoff between security and convenience for the user, and this tradeoff is fundamental to security technology from the old-fashioned lock and key, to modern security technology used today.

There is a correlation between the number of favorites required during enrollment, the number of favorites needed to verify, in the specific requirements of the order of the choices, and in the layout and presentation of the images themselves. For example, if the user is required to select his/her favorite images in the same order they were chosen at enrollment, this increases the security greatly, but makes remembering the images much easier than a password, since people memorize and remember by association. Each person has his own personal unique association, which makes this a natural approach to a stronger, more effective security system.

It is helpful to note that the technology and embodiments have flexibility in this aspect, and that the choice of these parameters can be adjusted, not only from one application to another, but if desired, from one transaction to another. For example, if in an embodiment a user has chosen seven items at enrollment, he/she may be asked to select only four items to unlock the phone interface; however, for an embodiment that logs into a bank account, he/she may be asked to enter seven favorite items. In an alternative embodiment, the user may be requested to select 12 items instead of 7. This means that the technology can be adjusted on the fly to accommodate varying security levels for different embodiments.

In addition, as explained in a previous section, the use of images, plus the application of image processing, and nondeterministic random number generator, makes the UI and the system secure against sophisticated malware and hacking methods. The images shown in the UI diagrams above can be reordered, and the options offered can be changed using the non-deterministic random numbers on every screen during enrollment and verification. This removes the possibility of malware or onlookers recognizing patterns in what is being presented to the user, or following the users behavior. As explained above, to address security, the images themselves are modified to prevent sophisticated malware from running in the background to recognize the images directly by means of computational pattern recognition. This can be accomplished by again using the non-deterministic random number generator to produce unpredictable parameters for the algorithms that modify the images using special types of noise, or applying rotation or translation to change the orientation or position of the image on the screen, or distorting the images slightly to change their shape. In fact, the above modifications can be applied simultaneously, randomly to each image, differently on every step in the enrollment or verification process, each time it is used. The same can be done to the text on the screen in order to make it unreadable by malware as well, if needed. Because the human eye/brain system is so highly adept at recognizing images, these modifications to the images can be made so that it is extremely difficult for sophisticated malware to recognize what is happening on the device, without spoiling the human users experience As stated above, the UI design presented here is an example of how embodiments can be implemented. There are other UI embodiments that use visual images for login and entry of information a non-digital or non ASCII format. The intent is to highlight the main components that make up this system, while showing flexibility. The exact layout and features of the UI are up to the designer of the product or system which uses the technology. Depending on the details of the device, the application and the security requirements, the user interface may be configured very differently. On some systems, it may be best to guide users though a series of separate screens instead of scrolling. If scrolling is preferred, it can be done in one or two dimensions on the screen, or perhaps using scroll wheels, similar to those used in the Apple iPhones date and time settings. In some cases, more category options, or sub category options may be useful. During the verification process, if preferred, the items can be categorized, similar to the example for enrollment, and it may be desirable to have all the choices displayed on a single screen, rather than offering more items to choose via scrolling, in which case the categories could be panelized on the screen.

The choice of the images used is also to be considered. Simple binary images, such as those shown in the example of an embodiment, may be used in some embodiments. Full-color images could be used as well, depending on what sort of image processing is preferred for security enhancements. The shape and size of the images is flexible as well. The images chosen could even be opened up to the user by providing a large database of downloadable images, similar to the wide array of ringtones now available for cell phones. There may be some restrictions on the properties of the images used, however, again depending on the specifics of the security needs, the device, and the user interface design, but overall, it is extremely flexible.

Security Advantages

Given the dangers posed by malware, it is essential that recipients of internet dataflow in a transaction can be assured that the sender is human and the recipient (on the server side) is the actual institution (e.g., a bank) and not malware posing as a bank. The solution ensures a live human is reading, entering and broadcasting information. A GUI based on special processed images renders messages that are unreadable by machines or automated processes. This robust security solution is web server driven making it usable by personal computers, mobile devices and any device with a visual interface. Before describing the interface and GUI, we discuss some security advantages.

6.3 Unpredictability

On the web server, the system uses one or more hardware devices that utilize fundamental laws of physics to generate non-deterministic random numbers. This is in contrast to the use of pseudo-random number generators in RSA SecurID, for example, which are based on deterministic algorithms. These unpredictable numbers are used for three major purposes:

Unpredictable numbers are used to unpredictably place images on the screen.

Unpredictable numbers are used to unpredictably change the image shape.

Unpredictable numbers are used to add unpredictable noise to images.

Given this unpredictability at multiple sites, the sequence of images used for a login/authentication cannot be reproduced by a digital computer program because the numbers are not generated by a deterministic algorithm (i.e., a digital computer program). Instead, quantum devices are used. In some embodiments, the quantum devices utilize one or more photons being emitted from a device and generating a random 0 or 1 based on the time at which the photon is emitted.

A well-designed quantum device can generate numbers according to the following two quantum-random properties of no bias and history has no effect on the next event.

There is no bias: A single outcome $x_k$ of a bit sequence $(x_1 x_2 \ldots)$ generated by quantum randomness is unbiased: $P(x_k=1)=P(x_k=0)=\frac{1}{2}$.

History has no effect on the next event: Each outcome xk is independent of the history. There is no correlation that exists between previous or future outcomes. For each $b_j \in \{0, 1\}$, $P(x_k=1|x_1=b_1, \ldots, x_{k-1}=b_{k-1})=\frac{1}{2}$ and $P(x_k=0|x_1=b_1, \ldots, x_{k-1}=b_{k-1})=\frac{1}{2}$.

Let $\Pi=\{(b_1 b_2 \ldots): b_k \in \{0, 1\}\}$ be the space of infinite sequences of 0s and is representing infinite quantum random bit sequences. It can be shown that if a quantum device producing the quantum randomness runs under ideal conditions to infinity, then the resulting infinite sequence of 0s and 1s (i.e., sequence in II) is incomputable. In other words, no digital computer program (i.e., deterministic algorithm) can reproduce this infinite sequence of 0s and 1s. This incomputability of quantum random sequences is a useful property of non-deterministic random numbers. The resulting unpredictability incorporated into the image generation and manipulation in the system can make the recognition of the visual images a difficult artificial intelligence (AI) problem for machines. This unpredictability can be applied in the noise generation that is used to make visual images more difficult for machine algorithms to recognize.

In an embodiment, a hardware device, as shown in FIG. 17, detects the polarization of photons and uses this detection to determine a quantum random 0 or 1. In an embodiment, the hardware detector uses linearly polarized photons (light). In an embodiment, the hardware detector uses circularly polarized photons (light). In an embodiment, a quantum random 0 or 1 is generated by the detection of a single photon. In an alternative embodiment, a quantum random 0 or 1 is generated by the detection of more than one photon.

In an embodiment, as shown in FIG. 18, a quantum random 0 or 1 is generated based on the relative timing based on quantum events 0, 1 and 2. In FIG. 18, $T_1$ is the time elapsed between quantum event 0 and quantum event 1; $T_2$ is the time elapsed between quantum event 1 and quantum event 2. In an embodiment, if elapsed time $T_1$ is greater than elapsed time $T_2$ then a quantum random 1 is generated; if elapsed time $T_1$ is less than elapsed time $T_2$ then a quantum random 0 is generated. In an alternative embodiment, if elapsed time $T_1$ is greater than elapsed time $T_2$ then a quantum random 0 is generated; if elapsed time $T_1$ is less than elapsed time $T_2$ then a quantum random 1 is generated. In an embodiment, events 0, 1, and 2 are the result of detecting a photon. In another embodiment, events 0, 1 and 2 are the result of detecting a photon that is horizontally polarized. In an embodiment, the detection of a photon may occur in a semiconductor chip as shown in FIG. 16.

6.4 Noise

As the number, scope and value of transactions being conducted via the Internet and through the use of mobile devices increases, so do the incentives for hackers to apply ever greater resources to their craft. At the same time, the available computing power that can be applied by malware towards attacks of escalating sophistication is increasing. Smart phones today have unprecedented number crunching power; while this power can be used to create clever security systems, it can also be harnessed by malware at any node in the communication path to which malware can gain access.

In embodiments, images help ensure that a human, not a machine, is controlling the transaction or the communication between the user and institution. This is based on the highly developed ability of humans to recognize images. Although machine vision is embryonic by comparison with the mature image recognition abilities of the human eye-brain combination, it is possible for machines to recognize images. In order to provide robust security in anticipation of the possibility that sophisticated malware may incorporate machine vision techniques to attack image-based security systems, proprietary methods were developed to counteract computational image recognition, and fully exploit innate human pattern recognition abilities.

One widely used approach to computational pattern recognition is the correlation operation. This is a direct point-by-point mathematical comparison of two functions that can be used not only to detect the presence of a feature in an image, but to also find its location accurately. The continuous expression that describes the non-normalized correlation operation C between two real, one-dimensional functions A and B is:

$$C(\tau) = A(t) \odot B(t) = \int_{-\infty}^{\infty} A(t+\tau)B(t)dt \tag{6.1}$$

The $\odot$ operator represents the correlation operation. In discrete form, as implemented in a digital computer, the correlation can be written as:

$$C(\tau) = \sum_t A(t+\tau)B(t) \tag{6.2}$$

This can be extended to two dimensions for use with images as:

$$C(v, w) = \sum_y \sum_x A(x+v, y+w)B(x, y) \tag{6.3}$$

It can be further extended to be used with two dimensional images, as well as finding the rotational orientation of one image with respect to the other as:

$$C(v, w, \theta) = \sum_\theta \sum_y \sum_x [R(\theta)A(x+v, y+w)]B(x, y) \tag{6.4}$$

where R is a rotation operator applied to A.

One reason the correlation operation is so powerful and widely used is that the calculation of the correlation function can be done efficiently using a fast Fourier transform (FFT). Herein the symbol $\mathcal{F}$ will be used to represent a fast Fourier transform and $\mathcal{F}^{-1}$ represents the inverse fast Fourier transform. Performing the correlation operation directly, point-by-point, can be executed very rapidly with modern computers for small images, but the computational complexity increases as $N^2$, where N is the number of data points in the image being cross correlated (for images of equal size). However, the correlation operation can be calculated using the fast Fourier transform as follows:

$$A \odot B = \mathcal{F}^{-1}(\mathcal{F}(A) \times \mathcal{F}(B)) \tag{6.5}$$

In equation 6.5, A and B are the two image arrays and $\mathcal{F}^{-1}$ represents the inverse fast Fourier Transform operation. This computation scales with image size much more slowly and increases as N log(N). In addition, since the fast Fourier Transform is so widely used for many data processing tasks, and fast Fourier Transforms are a common component of most floating-point benchmark tests for processors, many modern processors are designed with fast Fourier Transforms in mind and some are even optimized for performing fast Fourier Transforms. Therefore, for sufficiently large images, the use of fast Fourier Transforms to compare images is efficient. However, as the complexity of the correlation increases, for example if rotation is added, the computational load increases quickly, making computational pattern recognition more difficult.

If the images are small enough, the use of fast Fourier Transforms for doing correlations will become inefficient compared with direct correlation because of the extra computations needed to perform the forward fast Fourier Transforms and the inverse fast Fourier Transform. However, image recognition using correlation operations can be extremely effective with the power of modern computers and the choice of direct correlation or the alternate use of fast Fourier Transforms to calculate the correlation function (depending on image size).

It is important that the system be resistant to hacking through the use of correlation operations, and other computational pattern recognition techniques. Consequently, techniques can be applied to images to disrupt the use of correlation operations that either recognize images or locate features within an image, yet the image remains fully recognizable by a living human observer.

One of these techniques is the processing of the image using a specialized noise structure to create a noise modified image. There are several different noise structures that can use the non-deterministic random numbers generated by quantum physics-based hardware. Having various noise structures further enhances the security of the technique because the type of noise used to modify the image can be varied.

An example of using the noise structure is demonstrated in FIG. 14A, FIG. 14B., FIG. 14C, FIG. 15A, FIG. 15B., and FIG. 15C below. In the binarized (black or white pixels only) image in FIG. 14A, both the presence and exact locations of the letter p are found in the word apple using a correlation operation. When the noise modified image is correlated with an exact copy of the letters used in the base image, the result is unintelligible noise as shown in FIG. 15C.

FIG. 14A, FIG. 14B and FIG. 14C shows the use of correlation operation to detect and find the locations of features in an image. FIG. 14A shows an image containing the word apple in a handwritten style font. FIG. 14B shows an image of the letter p in the same font used in the image. FIG. 14C shows the correlation function image showing the detection of the presence, and exact locations of the letter p in the image in FIG. 14A, indicated by the bright peaks in FIG. 14C.

FIGS. 15A, 15B and 15C show the addition of special types of noise to defeat the use of the correlation operation to find features in an image. FIG. 15A shows an image containing the same word apple in the handwritten style font from FIG. 14A but with a special type of noise added that enhances the contrast of the noise over the letters versus the background, where the noise contrast is reduced.

FIG. 15B shows the raw image of the letter p in the same font used in the original image before the noise is added. FIG. 15C shows the correlation function image which is unintelligible, indicating the inability to detect the presence or locations in the letter p in the image in FIG. 15A.

In addition to the various noise structures that can be used, other randomized mathematical transformations can be applied to the images to make them even more difficult for machine algorithms to hack. These transformations include (1) translation, as in the figures above with the letters in the word apple being shifted up and down randomly; (2) rotation; (3) various types of morphing, including size and aspect ratio changes as well as both linear and non-linear geometric distortion. All of these transformations can be based on the non-deterministic random number generator for maximum security. Several of these different modifications can be applied to a single image simultaneously, making recognition by a machine nearly impossible. Again, the image of the word apple in FIG. 15A is an example. Here, the letters are distorted slightly in shape and size, their positions are randomly altered, and the noise structure is applied.

These noise methods may be applied to number images (e.g., images of the numbers 0, 1, 2, 3, 4, 5, 6, 7, 8 or 9), images of animals, images of sports items, face images, and other images of favorites.

In some embodiments, security solutions are provided for secure transactions against untrusted browser attacks and other cyberattacks. In some embodiments, the solution(s) described in the specification secure payment transactions. In other embodiments, the solution(s) may secure access and use of private networks such as Secret Internet Protocol Router Network (SIPRnet) or resources on a public infrastructure such as the electrical grid.

6.5 The System

Figure 1A:
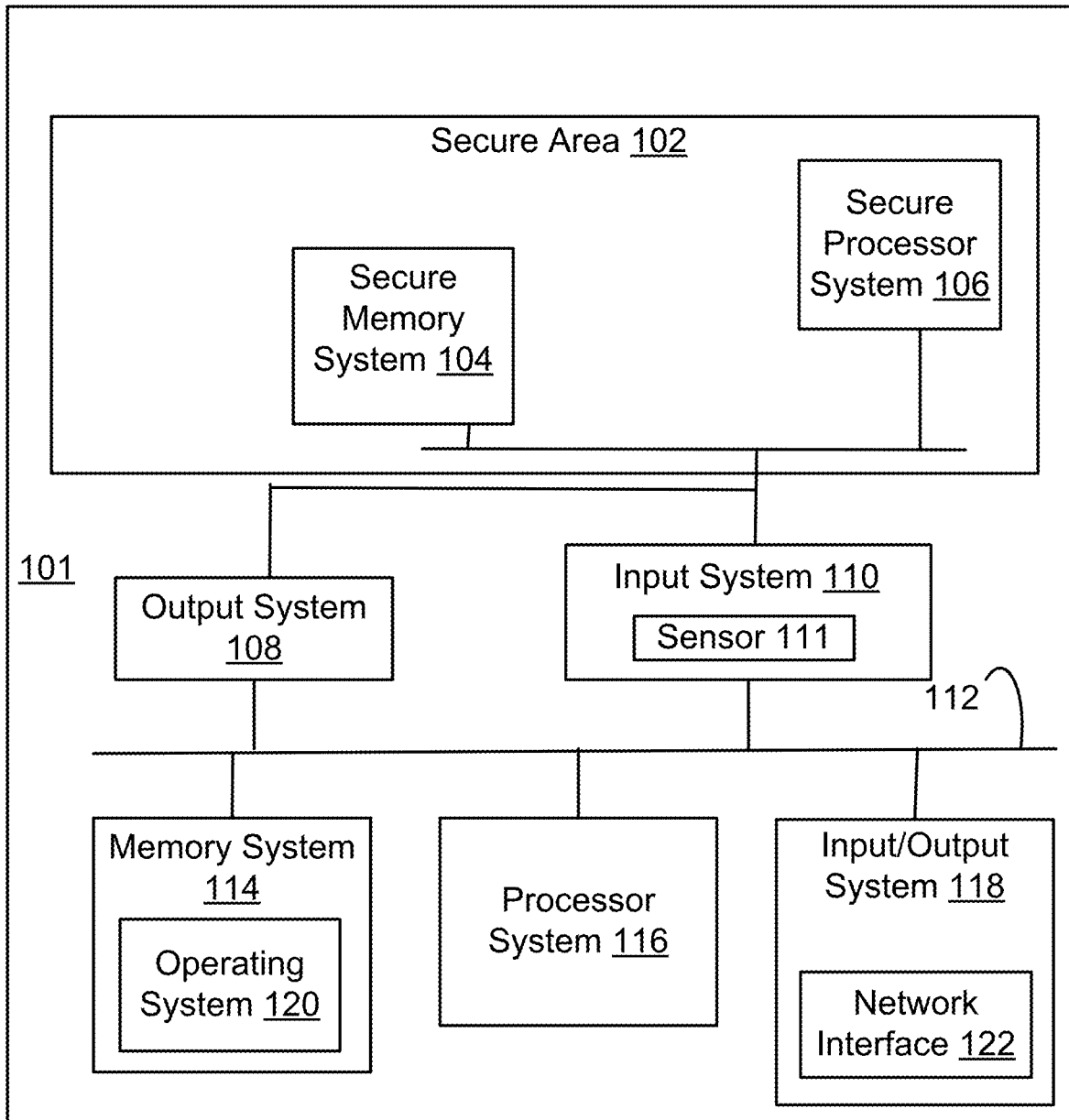
FIG. 1A shows a block diagram of an embodiment of a system for executing secure transactions resistant to malware.
Figure 1A:
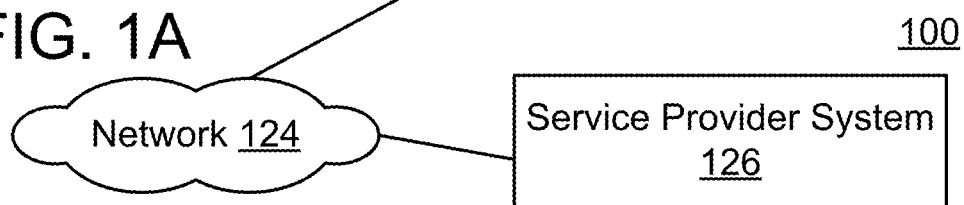

FIG. 1A shows an embodiment of a system 100 for providing secure transactions. In an embodiment, system 100 may include user system 101, and user system 101 may include secure area 102, secure memory system 104, secure processor system 106, output system 108, input system 110, sensor 111, communication system 112, memory system 114, processor system 116, input/output system 118, operating system 120, and network interface 122. System 100 may also include network 124 and service provider system 126. In other embodiments, system 100 may not have all of the elements or features listed and/or may have other elements or features instead of, or in addition to, those listed.

System 100 is a system within which a secure transaction takes place (FIG. 1A, FIG. 1B, FIG. 2A, FIG. 2B, FIG. 3, FIG. 3A, and FIG. 3B describe various details of system 100 and various methods for using system 100). In this specification the word system refers to any device or system of devices that communicate with one another. User system 101 is one that has a secure area that is dedicated for performing secure transactions over a network. User system 10 may be a single device or a combination of multiple devices. User system 101 may be a portable device, personal computer, laptop, tablet computer, handheld computer, mobile phone, or other network system, for example (in this specification a network system is any device or system that is capable of sending and/or receiving communications via a network). In an embodiment, a secure area 102 may be provided for performing secure transactions. In this specification, authentication information references to any form of information used for authenticating a user. In an embodiment, within secure area 102, authentication information, such as a biometric authentication and/or another form of authentication is bound to the authorization of an action. In other words, the authentication information is in some way combined with the information for performing the action, such as by being concatenated together and then applying a hash function to the result of the concatenation. In this specification, the words action and transaction may be switched one with another to obtain different embodiments. Throughout this specification, whenever information is disclosed as being combined, the information may be concatenated, added together (e.g., in a binary addition of the binary values of information), be different inputs to the same function, and/or combined in another manner.

A hash function, denoted by symbol $\Phi$, is a function that accepts as its input argument an arbitrarily long string of bits (or bytes) and produces a fixed-size output. In other words, a hash function maps a variable length message m to a fixed-sized output, $\Phi(m)$. Typical output sizes range from 160 bits, 256 bits, 512 bits, or can also be substantially larger.

An ideal hash function is a function $\Phi$ whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, the hash functions that are used are one-way. A one-way function $\Phi$ has the property that given an output value z, it is computationally extremely difficult to find a message $m_z$ such that $\Phi(m_z)=z$. In other words, a one-way function $\Phi$ is a function that can be easily computed, but that its inverse $\Phi^{-1}$ is extremely difficult to compute. Other types of one-way functions may be used in place of a hash function.

Any of a number of hash functions may be used. One possible hash function is SHA-512, designed by the National Security Agency and standardized by NIST [1, 2]. The output size of SHA-512 is 512 bits. Other alternative hash functions are of the type that conform with the standard SHA-256, which produces output values of 256 bits, and SHA-384, which produces output values of 384 bits. A hash function could be one of the SHA-3 candidates. A candidate example of a hash function is BLAKE [4]. Another example of a hash function is Grøstl [5]. Another example of a hash function is JH [6]. Another example of a hash function is Keccak [3]. Another example of a hash function is Skein [7].

In an embodiment, secure area 102 may have its own secure processor system and secure memory system, which are not accessible by the rest of user system 101. Secure area 102 may be capable of taking over and/or blocking access to other parts of user system 101.

Secure memory system 104 may be a dedicated memory for securing transactions. In an embodiment, secure memory system 104 may not be accessed by the other processor systems of user system 101. Memory system 104 may include, for example, any one of, some of, any combination of, or all of a long-term storage system, such as a hard drive; a short-term storage system, such as random access memory; a removable storage system, such as a floppy drive or a removable drive; and/or flash memory. Memory system 104 may include one or more machine-readable mediums that may store a variety of different types of information.

Secure memory system 104 may store methods and information needed to perform the secure transaction, user information, a method of generating a registration key, and encryption/decryption code. Secure memory system 104 may include one or more memory units that each write and/or read to one or more machine readable media. The term machine-readable medium is used to refer to any non-transient medium capable carrying information that is readable by a machine. One example of a machine-readable medium is a computer-readable medium. Another example of a machine-readable medium is paper having holes that are detected that trigger different mechanical, electrical, and/or logic responses. The content of secure memory 104 is discussed further in FIG. 1B, below.

Secure processor system 106 may include one or more processors. Processor system 116 may include any one of, some of, any combination of, or all of multiple parallel processors, a single processor, a system of processors having one or more central processors and/or one or more specialized processors dedicated to specific tasks. Processor system 116 implements the machine instructions stored in memory 114. Secure processor system 106 may include one or more processors that cannot be accessed by the main processor of the user system 101. For example, in an embodiment all of the processors of secure processor system 106 cannot be accessed by the main processor of system 101. In an embodiment, the operating system of user system 101 may have no access to secure area 102, and in an embodiment, secure area 102 may be programmed without benefit of an operating system, so that there is no standard manner of programming secure area 102, which thwarts hackers from sending read and/or write commands (or any other commands) to secure area 102, because secure area does not use standard read and write commands (and does not use any other standard commands). As a consequence, providing secure area 102 addresses the weakness of biometric authentication and other authentication methods.

Output system 108 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. In an embodiment, secure processor system 106 may be capable of taking over and using any portion of and/or all of output system 108. In an embodiment, a portion of the output system may be a dedicated display system that may be accessed only by secure area 102. In an embodiment, secure processor 106 may be capable of receiving input from input system 110 and/or blocking access to output system 108 by the main processor system and/or other devices.

Input system 110 may include any one of, some of, any combination of, or all of a biometric sensor 111, a keyboard system, a touch sensitive screen, a tablet pen, a stylus, a mouse system, a track ball system, a track pad system, buttons on a handheld system, a scanner system, a microphone system, a connection to a sound system, and/or a connection and/or interface system to a computer system, intranet, and/or internet (e.g. IrDA, USB). In an embodiment, biometric sensor 111 may be a finger print scanner or a retinal scanner. In an embodiment, user system 101 stores the processed data from user information 104B during registration. In an embodiment user system 101 retrieves user information 104B and compares the scanned output of sensor 111 to user information 104B to authenticate a user. In an embodiment secure processor 106 may be capable of receiving input from input system 110 and/or blocking access to input system 110 by the main processor system and/or other devices. In at least one embodiment, processor 116 may capture pressure (e.g., pressing fingers) events on a touch sensitive screen or a mouse clicking corresponding to something of interest (e.g., a visual image) on a PC display. FIG. 5 shows images of part of an icon, the word NAME and the letters of the alphabet ABCDEFGHIJLKLMNOPQRSTUVWXYZ.

Communication system 112 communicatively links output system 108, input system 10, memory system 114, processor system 116, and/or input/output system 118 to each other. Communications system 112 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Memory system 114 may include, for example, any one of, some of, any combination of, or all of a long-term storage system, such as a hard drive; a short-term storage system, such as random access memory; a removable storage system, such as a floppy drive or a removable drive; and/or flash memory. Memory system 114 may include one or more machine-readable mediums that may store a variety of different types of information. Memory system 114 and memory system 104 may use the same type memory units and/or machine readable media. Memory system 114 may also store the operating system of user system 101 and/or a web browser (which may also be referred to as an HTTP client). In embodiment, memory system 114 may also store instructions for input system 110 to read in biometric data and send the biometric data to secure area 102.

Processor system 116 may include one or more processors. Processor system 116 may include any one of, some of, any combination of, or all of multiple parallel processors, a single processor, a system of processors having one or more central processors and/or one or more specialized processors dedicated to specific tasks. Processor system 116 implements the machine instructions stored in memory 114. In an embodiment, processor 116 does not have access to secure area 102. In at least one embodiment, processor 116 may capture pressure (e.g., pressing fingers) events on a touch sensitive screen or a mouse clicking corresponding to something of interest (e.g., a visual image) on a PC display.

In an embodiment, clicking on the red letter R (e.g., via image entry 179 in FIG. 1B) shown at the bottom of the FIG. 6 would have a similar effect to typing the letter R on the keyboard but would make it more difficult for malware to know what the user is entering.

In an alternative embodiment, processor 116 only communicates to secure area 102 when secure area 102 authorizes processor 116 to communicate with secure area 102. Secure area 102 may prevent processor 116 from communicating to secure 102 during the secure areas execution of critical operations such as setup, generation of keys, registration key, biometric authentication or decryption of transaction information.

Input/output system 118 may include devices that have the dual function as input and output devices. For example, input/output system 118 may include one or more touch sensitive screens, which display an image and therefore are an output device and accept input when the screens are pressed by a finger or stylus, for example. In at least one embodiment, the user may see visual images of letters on a screen as shown in FIG. 5. In FIG. 5, pressing a finger over the letter B shown just below the word NAME would indicate typing or entering the letter B.

The touch sensitive screen may be sensitive to heat and/or pressure. One or more of the input/output devices may be sensitive to a voltage or current produced by a stylus, for example. Input/output system 118 is optional, and may be used in addition to or in place of output system 108 and/or input device 110. In an embodiment, a portion of the input/output system 118 may be dedicated to secure transactions providing access only to secure area 102. In an embodiment, secure processor 106 may be capable of receiving/sending input/output from/via input system 110 and/or blocking access to input system 110 by the main processor system and/or other devices. Restricting access to a portion of and/or all of the input/output system 118 denies access to third party systems trying to hijack the secure transaction.

Operating system 120 may be a set of machine instructions, stored in memory system 110, to manage output system 108, input system 110, memory system 114, input/output system 118 and processor system 116. Operating system 120 may not have access to secure area 102. Network interface 122 may be an interface that connects user system 101 with the network. Network interface 122 may be part of input/output system 118.

Network 124 may be any network and/or combination of networks of devices that communicate with one another (e.g., and combination of the Internet, telephone networks, and/or mobile phone networks). Service provider system 126 (which will be discussed further in conjunction with FIG. 2A) may receive the transactions. The recipient may be the final recipient or an intermediary recipient of transactions.

Service provider system 126 may be a financial institution or a recipient of a secure transaction. User system 101 may interact with any of a variety of service provider systems, such as service provider system 126, via a network 124, using a network interface 122. Service provider system 126 may be a system of one or more computers or another electronic device, and may be operated by a person that grants a particular user access to its resources or enables a particular event (e.g., a financial transaction, a stock trade, or landing a plane at an airport, and so on).

Methods for securing transactions are disclosed in this specification, which may be implemented using system 100. A financial transaction may be an instance or embodiment of a transaction. Further, a stock trade is one embodiment of a financial transaction; a bank wire transfer is an embodiment of a financial transaction and an online credit card payment is an embodiment of a financial transaction. Any operation(s) that runs in a trusted environment, which may be secure area 102 may be treated as a secure transaction. In an embodiment, every secure transaction may include one or more atomic operations and the use of the word transaction is generic to both financial transactions and operations including atomic operations unless stated otherwise. In this specification, the word transactions is also generic to an individual or indivisible set of operations that must succeed or fail atomically (i.e., as a complete unit that cannot remain in an intermediate state). Operations that require security may include operations that make use of, or rely on, the confidentiality, integrity, authenticity, authority, and/or accountability of a system should be executed in a trusted environment (e.g., in a secure area, such as secure area 102). Types of operations that require security may be treated as secure transactions. Further, a successful transaction other than logging information alters a system (e.g., of service provider 126) from one known, good state to another, while a failed transaction does not. To be sure that a transaction results in a change of state only when the transaction is successful particularly in systems that handle simultaneous actions rollbacks, rollforwards, and deadlock handling mechanisms may be employed to assure atomicity and system state integrity, so that if there is an error in the transaction, the transaction does not take effect or does not cause an unacceptable state to occur.

In at least one embodiment, a secure transaction assures the following properties: A. Availability: Having timely and reliable access to a transactional resource. B. Confidentiality: Ensuring that transactional information is accessible only to those authorized to use the transactional information. C. Integrity: Ensuring that transactional information is protected from unauthorized modification. D. Authentication: Ensuring that transactional resources and users accessing the transactional resources are correctly labeled (identified). E. Authorization: Ensuring that only authorized users have access rights to transactional resources. F. Accounting: Ensuring that a transaction cannot be repudiated. Any operation that handles or provides access to data deemed too sensitive for an untrusted environment (e.g., any private data) may be treated as a secure transaction to ensure that information leakage does not occur.

In at least one embodiment, these functionalities may be processed using a mobile phone. Some examples of a mobile phone are an Android phone, the iPhone and the Blackberry. In at least one embodiment, a secure chip or secure part of the chip may reside in a personal computer. In at least one embodiment involving a mobile phone or computer, a secure chip may be temporarily or permanently disconnected from the rest of the system so that the operating system 120 does not have access to critical information entered into and received (e.g., read or heard) from the secure areas user interface. In at least one embodiment, this critical information may be authentication information, such as a collection of images, biometric information, passwords, passcodes, PINS, other kinds of authentication factors, transaction information, and/or other user credentials.

In at least one embodiment in which user system 101 is a portable device, the portable device may have a user interface with a keyboard and mouse or display screen that is sensitive to the placement of fingers enables the user to select buttons, images, letters, numbers or symbols. In at least one embodiment, the screen may be used to select one or more images. As an example, FIG. 7 shows the choice of selecting ACCEPT or ABORT using images. The selection is captured by image entry 179 shown in FIG. 1B. At least one embodiment may enable the user to enter transaction information using this keyboard and mouse or the display screen. Portable embodiments of user system 101 enable users to execute secure transactions in remote places such as inside a jet, on a golf course, inside a moving automobile, from a hotel room, in a satellite, at a military gate, and/or other isolated places.

In at least one embodiment, a person may be requested to choose their favorite food and he or she may select an apple image—via the user interface—as user verification. In another instance at a later time, a transaction may require a person to select one or more images (i.e., a collection of images) from a display screen. Example images could be a picture or photo of an orange, a train, a specific pattern such as a peace sign or a diagram or a logo, a Mercedes car, a house, a candle, the Golden Gate bridge or a pen.

Figure 4:
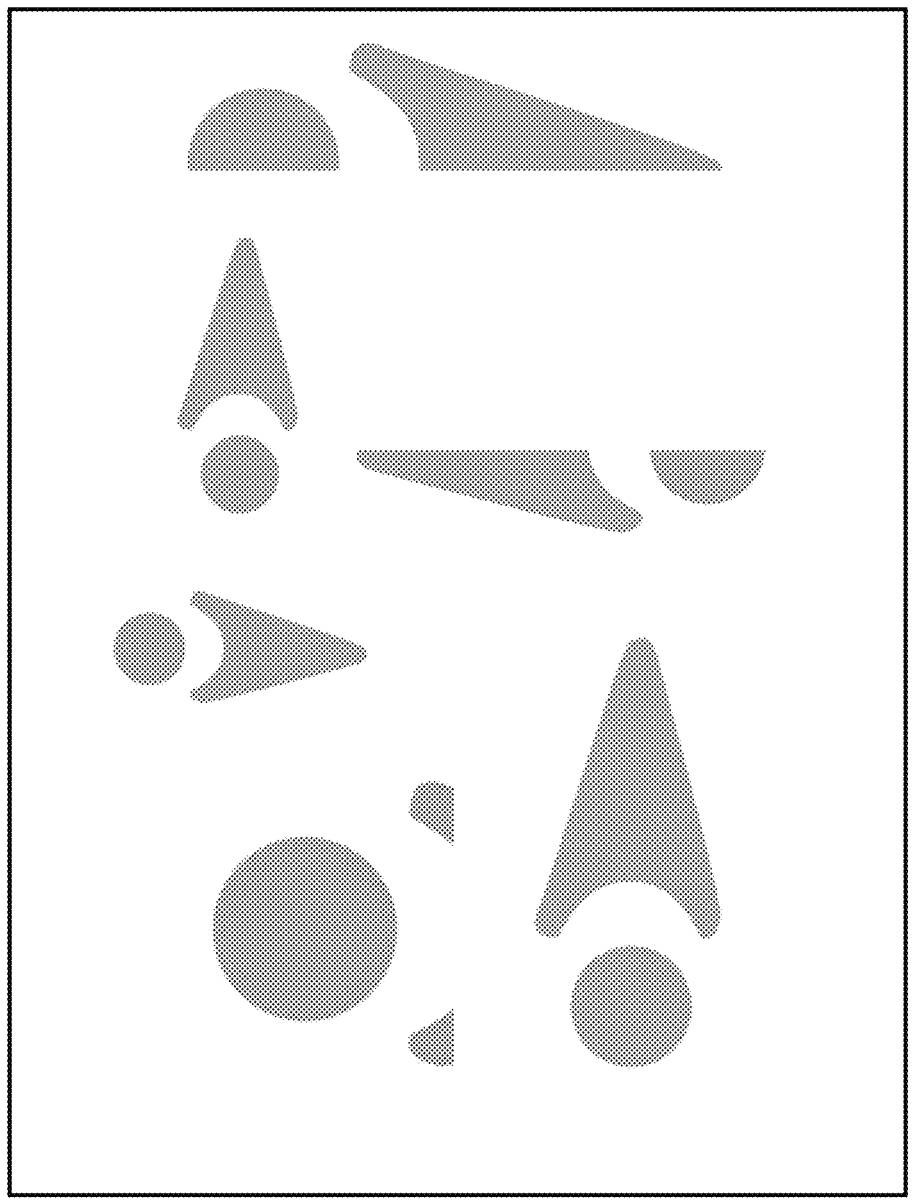
FIG. 4 shows a collection of images that are parts or a whole of a logo. Some of the images are rotated.

FIG. 4 shows images of parts of a logo. FIG. 9 shows different texture images: horizontal, vertical, triangular, mixed, dotted, bubble, simplicial, and foliation. At the bottom of FIG. 8 is a geometric image of a blue rectangle on top of a blue triangle which is on top of a red blob. Just to the right in FIG. 8, is a rectangle with vertical texture on top of a triangle with dotted texture on top of a blob with simplicial texture. FIG. 5 shows images of the alphabet letters: ABCDEFGHIJKLMNOPQRSTUVWXYZ. In at least one embodiment, during setup the person may add his or her own images using image acquisition 173, which are then used for user verification during the transaction. When images are a part of the user verification process, a display screen may be used, which may call image display 177.

Although some embodiments of user system 101 below may be described as using collections of visual images as a users universal identifier or as user authentication, other items or a combination of these items may be used for verifying the identity of the person such as face prints, iris scans, finger veins, DNA, toe prints, palm prints, handprints, voice prints and/or footprints. Any place, the expression biometric prints occurs any of the above listed different specific types of biometrics may be substituted to get specific embodiments. In terms of what a person knows, the authentication items may be PINs, passwords, sequences, collections of images that are easy to remember, and/or even psychometrics. In an embodiment, the item used to verify the person may be any item that is unique. In an embodiment, the item(s) used to verify the person may be one or more items that as a combination are difficult for malware to fabricate, guess, find by trial and error, and/or compute. In an embodiment, the item(s) used to verify the person are uniquely associated with this person. In an embodiment, the item used to verify the person has an unpredictable element.

In at least one embodiment, there is a secure area 102 that may be a specialized part of the chip (e.g., a microprocessor), where the operating system 120 and web browser software do not have access to this specialized part of the chip. In at least one embodiment, a specialized part of the chip may be able to turn off the operating system 120s access to presses of the buttons or a screen of a mobile phone (or other computing device), preventing malware and key or screen logging software from intercepting a PIN or the selection of an image. In at least one embodiment, a specialized part of the chip may be able to temporarily disconnect the rest of the chips access to the screen (e.g., by preventing the execution of the operating system 120 and web browser). In at least one embodiment, part of the display screen may be permanently disconnected from the part of the chip (e.g., from the microprocessor of the chip) that executes the operating system 120 and web browser. In at least one embodiment, a part of the chip may only have access to the biometric sensor, while the rest of the chip executing the operating system 120 and web browser is permanently disconnected from the biometric sensor.

In at least one embodiment, there includes a secure area, such as secure area 102, that executes a biometric acquisition and/or storage of cryptography keys, and other user credentials, which may be created from the biometric prints or created from unpredictable physical processes in secure area 102, or created from a combination of the biometric prints and unpredictable processes In at least one embodiment, photons may be produced by the hardware as a part of the unpredictable process. In least one embodiment, the unpredictable process may be produced by a specialized circuit in the secure area.

In yet another embodiment of the invention, biometric prints and/or unpredictable information from unpredictable physical process are used to generate one or more keys in the secure area 102. The secure area 102 may include embedded software. In at least one embodiment, the embedded software is on a chip with a physical barrier around the chip to hinder reverse engineering of the chip, and/or hinder access to keys, transaction information, and/or possibly other user credentials.

By executing software from server provider system 126, the selection of visual images, using image entry 179, are less susceptible to theft as they can be displayed on the screen in a form that is not easily recognizable or captured by malware. Because they are difficult for malware to recognize or apprehend, they can be presented by image display 177 in a less secure part of the system such as operating system 120 running a web browser. Each of the above embodiments may be used separately from one another in combination with any of the other embodiments. All of the embodiments of this specification may be used together or separately.

Secure Area in a Device or a Chip

To provide additional security, some embodiments may use a secure area 102 that may be part of user system 101 or a special part of the chip that is able to acquire biometric prints, store authentication information, and/or authenticate the newly acquired items. The authentication information may include templates of biometric prints, images, pins, and/or passwords. The secure area may also be a part of the device where critical transaction information may be entered or verified on a display that the secure area only has access to. In at least one embodiment, the host computer (domain) and the network have no access to the transaction information, no access to the keys, no access to biometrics, and/or no access to other critical user credentials (the transaction information, the keys, the biometrics, and/or other critical user credentials may be the contained and processed by the secure area).

Payment Transaction Information

In this specification, transaction information refers to one or more items of information that describe the transaction. For a payment transaction, one item of transaction information may be the name of the person or entity sending the money. Another item of transaction information may be the name of the person or entity receiving the money. Another item of transaction information, may be the date or time of day. Another item of transaction information may be the sending persons (or entitys) account number. Another item of transaction information may be the receiving persons (or entitys) bank account number. FIG. 10 shows a recipient account number 9568342710 with a collection of visual images. The sending person or entity is the person or entity that sends a message that is part of the transaction and the receiving person or entity (recipient) is the person or entity that receives the message that is part of the transaction. Another item of transaction information may be the sending persons (or entitys) routing number. Another item of transaction information may be the receiving persons (or entitys) routing number. Another item of transaction information may be the amount of money that may be expressed in dollars, Euros, yen, francs, deutschmark, yuan or another currency.

Setup

During setup, one or more images may be acquired by using image acquisition 173 in user system 101. These one or more images may serve as a users universal identifier or provide a method to authenticate the user. An example of one or more images that may serve as a universal identifier is shown in FIG. 11. In at least one embodiment, no images are stored in user system 101. In at least one embodiment, these images are acquired and encrypted by image encrypt/decrypt 175 and transmitted to service provider system 126. During setup, in at least one embodiment, a background texture may be selected by the user, that was generated by image generator 238 in service provider system 126. FIG. 9 shows some examples of textures.

In at least one embodiment, a symbol, letter, number and/or image texture may be selected or generated. As an example, FIG. 8 shows the word SIMPLICIAL written with a bubble texture using a simplicial background texture. In at least embodiment, a unique icon or image may be chosen or generated by the user system 101 and/or the user and/or service provider system 126.

In at least one embodiment, user makes sure that a recognizable image generated by image generator 238 appears on the user interface that is only known to service provider system 126. FIG. 4 shows an example of different parts of a unique logo that may serve this purpose. The use of recognizable image in different forms helps hinder malware from capturing important setup information and helps assure that the user is communicating with the appropriate service provider system 126.

During setup, in at least one embodiment, some initial transaction information is provided to service provider system 126. This transaction information may include the users name, the users bank account number and bank. In at least one embodiment, some of this transaction information provided via image entry 179 to service provider system 126, may be provided by using images (i.e., acquired with image acquisition 173) that are difficult for malware to capture or apprehend.

In at least one embodiment, during setup one or more biometric prints may be acquired, and one or more unique registration keys and cryptography keys may be generated from the one or more of the biometric prints (items) or generated from an unpredictable physical process or both. In at least one embodiment, the unpredictable physical process may come from a hardware chip or hardware circuit that uses photons as a part of the unpredictable process to create the cryptography keys. During authentication, if the acquired biometric print is an acceptable match, then a sequence of transaction steps that make up the complete transaction may be initiated.

In embodiments using a secure area, the software that secure area 102 executes may be embedded in secure memory 104. In an embodiment, there is no operating system on the device or on secure area 102 of user system 101. In an alternative embodiment, there is an operating system. The secure biometric print device has a number of components, which are described later. The security of the secure area 102 may be enhanced by any one of, any combination or of, or all of (1) the use of embedded software, (2) the lack of an operating system, and (3) the secure area being at least part of a self-contained device not connected to a computer or the internet. For example, the unit that includes the secure area may contain its own processor. In an embodiment, the secure area may not have any of these security enhancing features. The biometric sensor enables user system 101 to read biometric prints. The biometric sensor may include a fingerprint area sensor or a fingerprint sweep sensor, for example. In at least one embodiment, the biometric sensor may contain an optical sensor that may acquire one or more types of biometrics. In at least one embodiment, the biometric sensor may be a microphone or other kind of sensor that receives acoustic information, such as a persons voice. In at least one embodiment, the sensor may be a device that acquires DNA or RNA. In an embodiment, secure processor system 106 may execute the software instructions, such as acquiring a biometric print from the sensor, matching an acquired biometric print against a stored biometric print, sending communication and control commands to a display, and/or encrypting the registration key and transmitting the registration key to the administrator when the user and administrator are not in the same physical location. By including processor system 106 in secure area 102, the security is enhanced, because the external processor is given fewer chances to inspect contents of secure area 102. Alternatively, secure area 102 may store software instructions that are run by secure processor system 106. Processor system 106 performs the biometric print acquisition, and/or the encryption or decryption. Alternatively, a specialized logic circuit is built that carries out the functions that the software causes the processors to perform, such as driving sensor 111 (which may be an acquisition unit, such as a biometric sensor).

Secure memory system 104 may contain non-volatile memory in addition to volatile memory. Non-volatile memory enables the device to permanently store information for generating cryptography keys (encryption or decryption). In another embodiment, secure memory system 104 may include memory on secure processor system 106. In another embodiment, the sensor or input system 110 and secure processor system 106 may be integrated into a single chip. Alternatively, in another embodiment, the sensor in input system 110 and secure processor system 106 may be two separate chips.

Content of Memory in Secure Area

Figure 1B:
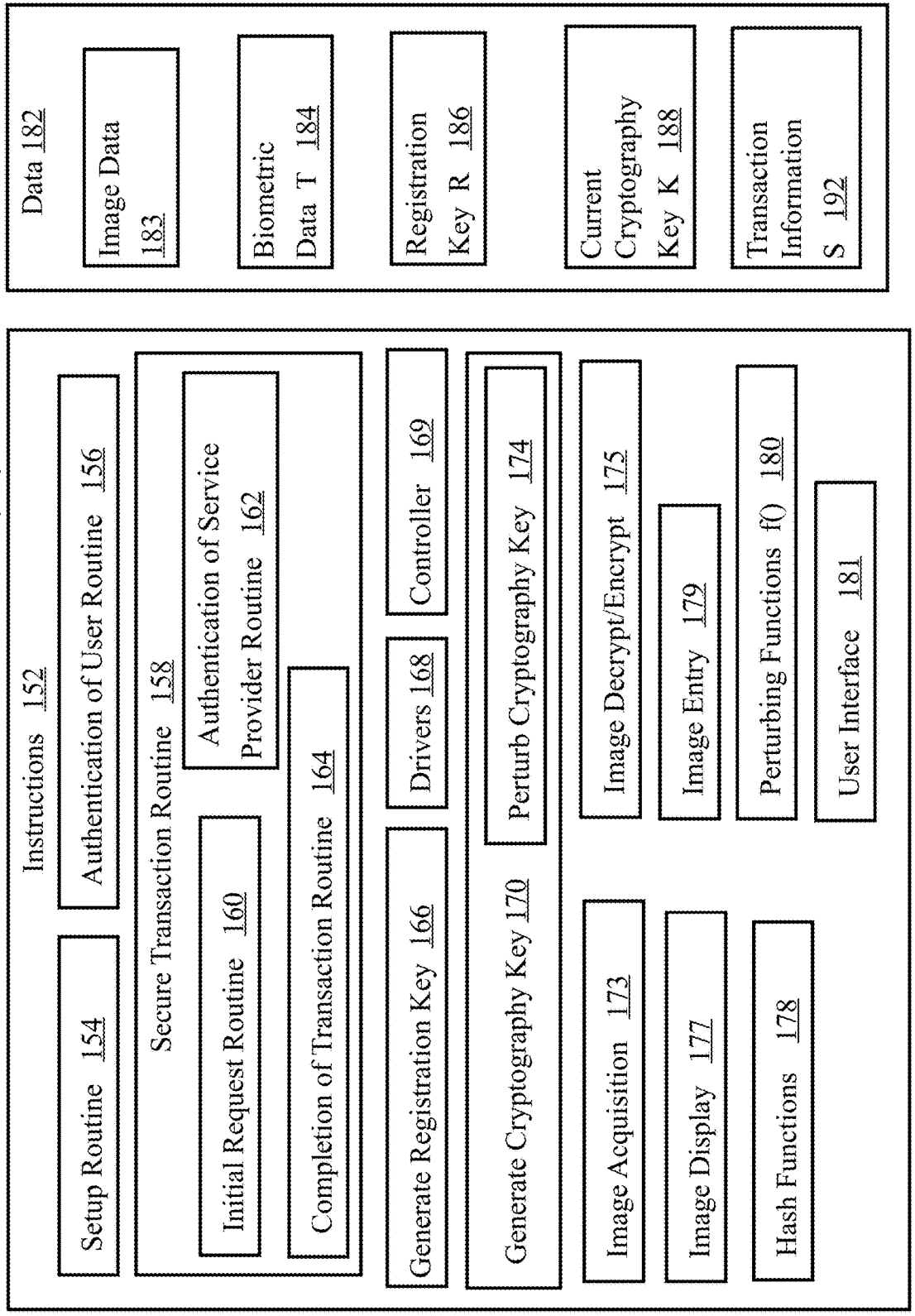
FIG. 1B shows a memory system that is a component of the system shown in 1A.

FIG. 1B shows an embodiment of a block diagram of the contents of memory system 104 of FIG. 1A, Memory system 104 may include instructions 152, which in turn may include a setup routine 154, an authentication of user routine 156, a secure transaction routine 158, having an initial request routine 160, a service provider authentication routine 162, and a completion of transaction routine 164. Instructions 154 (of memory 104) may also include registration key generator 166, drivers 168, controller 169, generate cryptography key 170, perturb cryptography key 174, hash functions 178, perturbing functions 180, and user interface 181. Memory system 104 may also store data 182, which may include biometric template T 184, registration key R 186, current cryptography key K 188 and transaction information S 192. In other embodiments, memory system 104 may not have all of the elements or features listed and/or may have other elements or features instead of, or in addition to, those listed.

Instructions 152 may include machine instructions implemented by processor 106. Setup routine 154 is a routine that handles the setting up of the user system 101, so that user system 101 may be used for performing secure transactions. Setup routine 104 may collect a new users biometric print, and apply a hash function to the biometric print (and/or to other user information) to generate a registration key R. In at least one embodiment, there may be specialized hardware in the secure area to help create unpredictableness used for the generation of cryptography key(s), seed(s), and/or registration key(s). Alternatively, a registration key, seed, or cryptography key may be generated by applying the hash function to the raw biometric print data, for example. Similarly, setup routine 154 may apply a hash function to authentication information, such as a biometric print, to hardware noise produced by a phototransistor, and/or other user information or a combination of these to generate an initial cryptography key. The setup routine 154 may also send the registration key and/or the cryptography key to the service provider system 126. In another embodiment, the registration key R and/or the initial cryptography key may be received from service provider 126.

Authentication of user routine 156 may authenticate the user each time the user attempts to use user system 101. This routine may call image acquisition 173 to acquire a collection images for user authentication. For example, user system 101 may include a biometric sensor (e.g., as sensor 111) that scans the users biometric print, reduces the biometric print to a template, and matches the newly derived biometric template to a stored template (which was obtain by setup routine 154). Then, if the stored template and the newly derived template match, the user is allowed to use user system 101.

In an alternative embodiment, a biometric print acquired may be directly matched with a stored template. Alternatively or additionally, authentication of user routine 156 may require the user to enter a password. If the password received and the password stored match, the user is allowed to use user system 101.

Secure transaction routine 158 is a routine that implements the secure transaction. The initial request routine 160 is a first phase of secure transaction routine 158. One purpose of initial request routine 160 is to receive a selection of images known to the user and acting as a user authentication that are difficult for malware to recognize or apprehend and transaction information entered and represented as images that are difficult for malware to recognize or apprehend. The transaction information is encrypted with the cryptography key. The encrypted transaction information and encrypted user authentication both represented as images before encryption are sent to the service provider. During initial request routine 160, the cryptography key may perturbed to obtain a new cryptography key, respectively. In an alternative embodiment, the cryptography key is not changed each time Service provider authentication routine 162 authenticates the information provided by the service provider. The collection of images, representing the users universal identifier or user authentication, received by service provider 126 to system 101 in reply to initial request 160 may be authenticated by service provider authentication routine 162.

Drivers 168 may include drivers for controlling input and output devices, such as the keyboard, a monitor, a pointing device (e.g., a mouse and/or a touch pad), a biometric print sensor (for collecting biometric prints). Controller 169 may include one or more machine instructions for taking control of the keypad, monitor and/or network interface, so the transaction may be performed securely, without fear of the processor system 116 compromising security as a result of being taken over by malware sent from another machine.

Generate cryptography key 170 are machine instructions that generate a new cryptography key (e.g., by applying a function). In at least one embodiment, the cryptography key is not updated after the initial step. Perturb cryptography key 174 perturbs the current cryptography key to thereby generate the next cryptography key.

Image acquisition 173 are machine instructions that acquire images. Image encrypt/decrypt are machine instructions that encrypt or decrypt one or more images. In at least one embodiment, these images are encrypted before sending to service provider system 126. In at least one embodiment, encrypted images are received from service provider system 126 and decrypted with service provider system 126 before they are displayed to the user with image display 177. Image display 177 are machine instructions that display one or more images to the user, utilizing user interface 181. In at least one embodiment, images are displayed on a screen of a mobile phone or PC. Image entry 179 are machine instructions that determine which image a user has selected with his or her finger on a touch sensitive screen or has selected with a mouse.

Hash functions 178 may be one or more one-way functions, which may be used by generate registration key 166 for generating a registration key from a biometric print and/or other user information. Those hash function(s) of hash functions 178 that are used by initial request 160, authentication of service provider routine 162, and completion of transaction routine 164 may be the same as one another or different from one another.

Perturbing functions 180 may include one or more perturbing functions, which may be used by perturb cryptography key 174. Different perturbing functions of perturbing functions 180 may be used during each initial request 160, authentication of service provider routine 162, and/or completion of transaction routine 164. In this specification anytime a hash function is mentioned or a perturbing function is mentioned any other function may be substituted (e.g., any perturbing function may be replaced with a hash function and any hash function may be replaced with a perturbing function) to obtain another embodiment. Optionally, any perturbing function and/or hash function mentioned in this specification may be a one way function.

User Interface

User interface 181 provides a page, a web browser or another method of displaying and entering information so that the user interface may provide one or more of the following functionalities, labeled with the letters A-F.

A. The user may view the transaction information being sent. B. The user may enter instructions for sending transaction information. C. The user may receive information about whether or the user authentication was valid. D. The user may enter or generate one or more images known by the user and/or enter another biometric print or another type of user authentication such as a PIN. E. The user may determine the current state in the transaction process. F. The user may read directions or enter information for the next step in the transaction process.

Data and Keys

Data 182 may include any data that is needed for implementing any of the routines stored in memory 104. Biometric template T 184 may include templates, such as minutiae and/or other information characterizing biometric prints of users, which may be used to authenticate the user each time the user would like to use secure area 102 and/or system 101. Registration key R 186 may be generated by applying a hash function to a collection of images selected or generated by the user, biometric print(s) and/or information derived from an unpredictable physical process. In one embodiment, the unpredictable physical process may use one or more phototransistors, each of which senses photons. Current cryptography key K 188 is the current cryptography key, which may be stored long enough for the next cryptography key to be generated from the current cryptography key. Transaction information S 192 may include information about a transaction that the user would like to perform.

Service Provider System

Figure 2A:
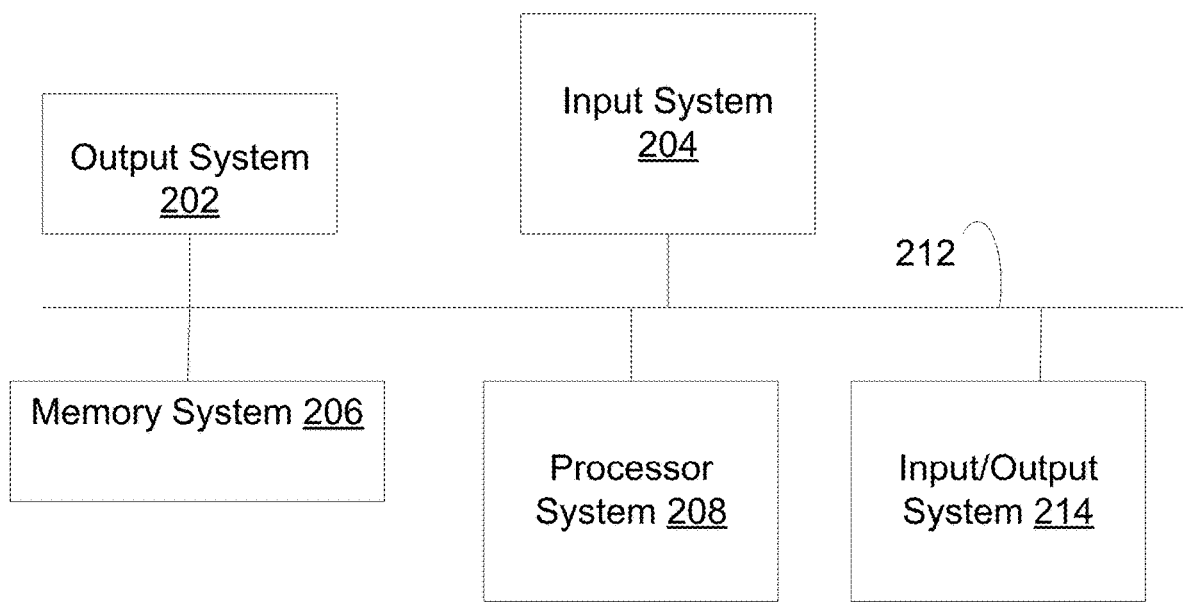
FIG. 2A shows a block diagram of an embodiment of a service provider system.

FIG. 2A shows a block diagram of an embodiment of a service provider system 200 in a system for securing transactions against cyber attacks. In an embodiment, service provider system 200 may include output system 202, input system 204, memory system 206, processor system 208, communication system 212, and input/output system 214. In other embodiments, the service provider system 200 may not have all the components and/or may have other embodiments in addition to or instead of the components listed above.

Service provider system 200 may be a financial institution or any other system such as a power plant, a power grid, or a nuclear plant or any other system requiring secure access. In an embodiment, service provider system 200 may be an embodiment of service provider system 126. Any place in this specification where service provider 126 is mentioned service provider 200 may be substituted. Any place in this specification where service provider 200 is mentioned service provider 126 may be substituted. Service provider system 200 may include one or more webservers, applications servers, and/or databases, which may be part of a financial institution, for example.

Output system 202 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 204 may include any one of, some of, any combination of, or all of a keyboard system, a touch sensitive screen, a tablet pen, a stylus, a mouse system, a track ball system, a track pad system, buttons on a handheld system, a scanner system, a microphone system, a connection to a sound system, and/or a connection and/or interface system to a computer system, intranet, and/or internet (e.g. IrDA, USB).

Memory system 206 may include may include, for example, any one of, some of, any combination of, or all of a long term storage system, such as a hard drive; a short term storage system, such as random access memory; a removable storage system, such as a floppy drive or a removable drive; and/or flash memory. Memory system 206 may include one or more machine-readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Memory 206 may include encryption/decryption code, algorithms for authenticating transaction information, for example (memory 206 is discussed further in conjunction with FIG. 2B).

Processor system 208 executes the secure transactions on system 200. Processor system 208 may include any one of, some of, any combination of, or all of multiple parallel processors, a single processor, a system of processors having one or more central processors and/or one or more specialized processors dedicated to specific tasks. In an embodiment, processor system 208 may include a network interface to connect system 200 to user system 101 via network 124. In an embodiment, processor 208 may execute encryption and decryption algorithms, with which the transaction information was encrypted. In an embodiment, processor 208 may decrypt secure messages from user system 101 and/or encrypt messages sent to user system 101.

Communication system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves. In embodiment, memory system 206 may store instructions for system 200 to receive authenticated secure transaction information from user system 101.

Input/output system 214 may include devices that have the dual function as input and output devices. For example, input/output system 214 may include one or more touch sensitive screens, which display an image and therefore are an output device and accept input when the screens are pressed by a finger or stylus, for example. The touch sensitive screen may be sensitive to heat and/or pressure. One or more of the input/output devices may be sensitive to a voltage or current produced by a stylus, for example. Input/output system 118 is optional, and may be used in addition to or in place of output system 202 and/or input device 204.

Figure 2B:
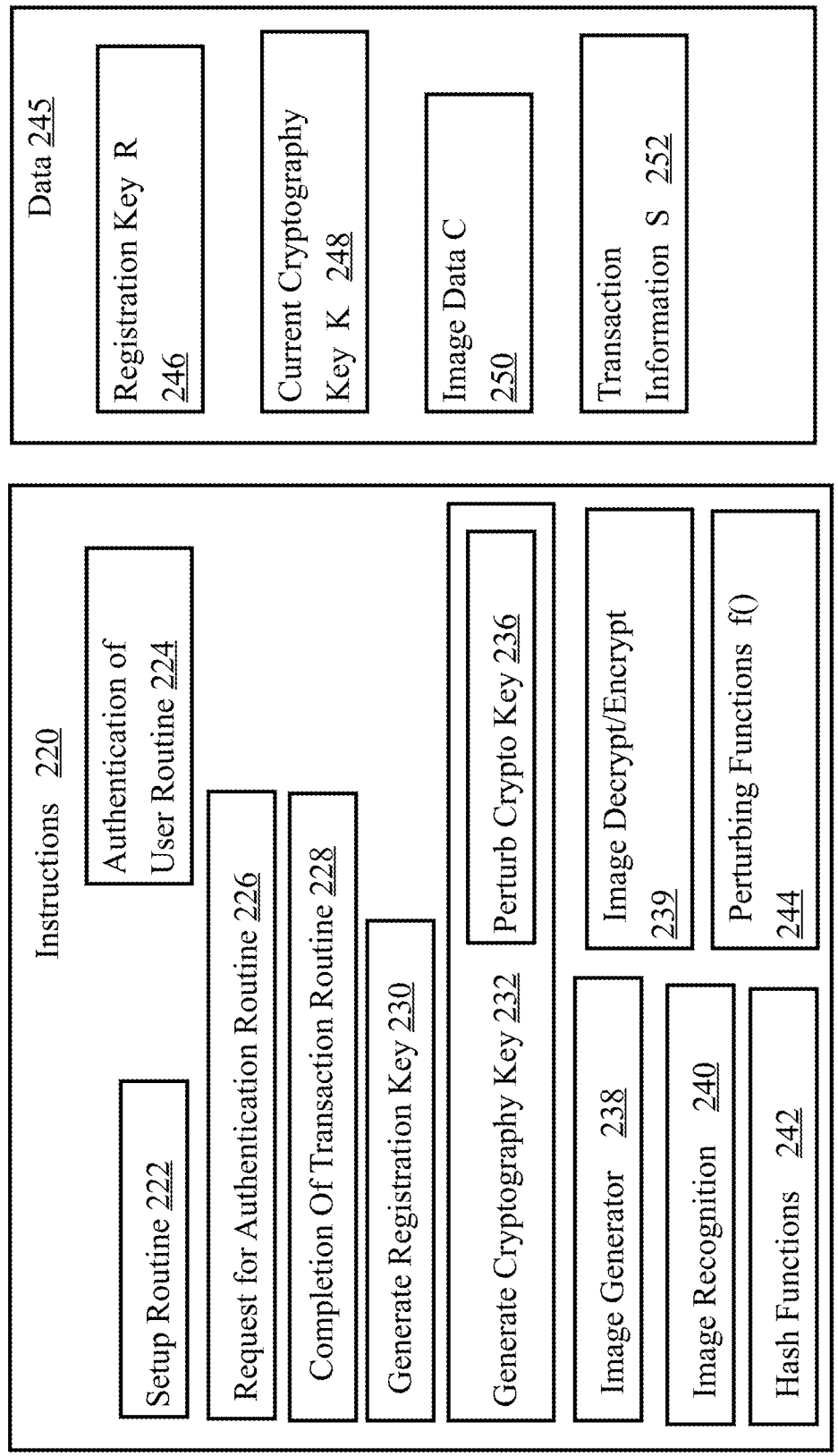
FIG. 2B shows memory system that is a component of the system in FIG. 2A.

FIG. 2B shows an embodiment of a block diagram of the contents of memory system 206 of FIG. 2A, Memory system 206 may include instructions 220, which in turn may include a setup routine 222, an authentication of user routine 224, a request for authentication routine 226, completion of transaction routine 228, generate registration key 230, generate cryptography key 232, hash functions 242, and perturbing functions 244. Memory system 206 may also store data 245, which may include registration key R 246, current cryptography key K 248, and transaction information S 252. In other embodiments, memory system 206 may not have all of the elements or features listed and/or may have other elements or features instead of, or in addition to, those listed.

Setup routine 222 is a routine that handles the setting up of the service provider system 200, so that service provider system 200 may be used for performing secure transactions. Setup routine 222 may receive a registration key from the user system, which in turn may be used for generating the initial cryptography key.

In an alternative embodiment, the user may send the biometric print or template of the biometric print to service provider system 200, and service provider system 200 may generate the registration key from the biometric print in the same manner that user system 101 generates the registration key from the template of the biometric print or from the biometric print and/or information obtained from an unpredictable physical process (e.g., by setup routine 222 applying a hash function to the biometric print and/or information derived from an unpredictable physical process).

In another embodiment, the user may visit the location of service provider, where the service provider may acquire a collection of images known to the user, which is used by service provider system 200 for at least partially creating the initial cryptography key.

Generate cryptography key 232 are machine instructions that generate a new cryptography key from (e.g., by applying a function, such as a perturbing function to) a prior cryptography key. Generate cryptography key 232 may be the same routine as generate cryptography key 170 except that generate cryptography key 232 is implemented at service provider 200 and generate cryptography key 170 is implemented at user system 101.

Perturb cryptography key 236 may be the same as perturb cryptography key 174, and perturb cryptography key 236 perturbs the current cryptography key to thereby generate the next cryptography key Hash functions 242 may be the same as hash functions 178. Hash functions 242 may be one a way functions, which may be used by generate cryptography keys routine 230. Optionally, hash functions 242 may include a different function for generate cryptography keys 230. Those hash function(s) of hash functions 242 that are used by authentication of user routine 224, request for authentication routine 226, and completion of transaction routine 228 may be the same as one another or different from one another.

Different perturbing functions of perturbing functions 244 may be used during each of authentication of user routine 224, request for authentication routine 226, and completion of transaction routine 228.

Although perturbing functions 244 and hash functions 242 are indicated as separate storage areas in from perturb cryptography key 236, the perturbing functions may just be stored as part of the code for perturb cryptography key 236.

Data 245 may include any data that is needed for implementing any of the routines stored in memory 206. Registration key R 246 may be the same as registration key 186 and may be generated by applying a hash function to a collection of images selected or generated by the user and/or biometric print(s) and/or information from an unpredictable physical process.

Current cryptography key K 248 may be the same as current cryptography key 188, and may be the current cryptography key, which may be stored long enough for the next cryptography key to be generated from the current cryptography key.

Transaction information S 252 may be the same as transaction 192, and may include information about a transaction that the user would like to perform. Transaction information S 252 may be received from user system 101 and may be used to perform a transaction at service provider system 200 on behalf of user system 101.

Setup of User System

FIG. 3 shows a flowchart of an embodiment of setting up user system 101 for securing transactions. This user system method may be the setup performed by user system 101 before enabling a user to execute secure transactions with a bank, financial institution or financial exchange.

In step 302, a sequence or collection of visual images that are easy to remember are obtained from the user. In an embodiment, some visual images may be an image of an animal, an image of a car, an image of a house, an image of a place, an image of a persons name, an image of all or part of a bank logo. In at least one embodiment, this collection of universal images may act as a universal identifier for the user. As an example, the universal identifier for that particular user may be composed of the following 7 images where order is not important: a train, the Golden Gate bridge, pink sparkle shoes, chocolate ice cream in a waffle cone, one of the Wells Fargo stagecoach horses, an orange, and a visual image of the name Haley. An example of this visual image of a name is displayed as a visual image as shown in FIG. 11. The universal identifier may use a particular background texture or pattern that is determined by the user or service provider system during setup. FIG. 9 shows examples of different textures. The visual image of Haley in FIG. 11 is represented with a bubble texture against a foliation background texture.

In an embodiment, the universal identifier may be used to request from the user as user authentication. In an alternative embodiment, user authentication may involve a subset of these images of the universal identifier or different set of visual images.

In an alternative embodiment, biometric print information may be obtained from the user from a biometric sensor 111 in input system 110 in order to establish a method of user authentication. The user setup method may also collect other setup information, such as a Personal Identification Number (PIN), or a password.

The setup data that was collected may be denoted as a T.

In step 304, the universal identifier and user authentication information are encrypted and transmitted to the service provider system. In at least one embodiment, this information is encrypted as visual images and then sent back to the service provider system. In at least one embodiment, a Diffie-Hellman key exchange is used to establish keys to encrypt the universal identifier and user authentication information.

In step 306, the user service provider receives the encrypted universal identifier and user authentication information and decrypts them and stores them. In step 308, users account is initialized with user service provider and enabled for executing transactions.

6.6 Key Exchange

A Diffie-Hellman key exchange [8] is a key exchange method where two parties (Alice and Bob) that have no prior knowledge of each other jointly establish a shared secret key over an unsecure communications channel. Before the Diffie-Hellman key exchange is described it is helpful to review the mathematical definition of a group. A group G is a set with a binary operation * such that the following four properties hold: (i.) The binary operation * is closed on G. This means a*b lies in G for all elements a and b in G. (ii.) The binary operation * is associative on G. That is, a*(b*c)=(a*b)*c for all elements a, b, and c in G (iii.) There is a unique identity element e in G, where a*e=e*a=a. (iv). Each element a in G has a unique inverse denoted as $a^{-1}$. This means $a*a^{-1}=a^{-1}*a=e$.

g*g is denoted as $g^2$; g*g*g*g*g is denoted as $g^5$. Sometimes, the binary operation * will be omitted so that a*b is expressed as ab.

The integers { . . . , 2, 1, 0, 1, 2, . . . } with respect to the binary operation + are an example of an infinite group. 0 is the identity element. For example, the inverse of 5 is 5 and the inverse of 107 is 107.

The set of permutations on n elements {1, 2, . . . , n}, denoted as $S_n$, is an example of a finite group with n! elements where the binary operation is function composition. Each element of $S_n$ is a function p:{1, 2, . . . , n}→{1, 2, . . . , n} that is 1 to 1 and onto. In this context, p is called a permutation. The identity permutation e is the identity element in $S_n$, where e(k)=k for each k in {1, 2, . . . , n}.

If H is a non-empty subset of a group G and H is a group with respect to the binary group operation of G, then His called a subgroup of G. H is a proper subgroup of G if H is not equal to G (i.e., H is a proper subset of G). G is a cyclic group if G has no proper subgroups.

The integers modulo n (i.e., $Z_n$={[0], [1], . . . , [n−1]} are an example of a finite group with respect to addition modulo n. If n=5, [4]+[4]=[3] in $\mathbb{Z}_5$ because 5 divides (4+4)−3. Similarly, [3]+[4]=[2] in $Z\mathbb{Z}_5$. Observe that $\mathbb{Z}_5$ is a cyclic group because 5 is a prime number. When p is a prime number, $\mathbb{Z}_p$ is a cyclic group containing p elements {[0], [1], . . . [p−1]}. [1] is called a generating element for cyclic group $\mathbb{Z}_p$ since $[1]^m$=[m] where m is a natural number such that 0<m≤p−1 and [1]p=[0]. This multiplicative notation works as follows: $[1]^2$=[1]+[1]; $[1]^3$=[1]+[1]+[1]; and so on. This multiplicative notation (i.e. using superscripts) is used in the description of the Diffie-Hillman key exchange protocol described below.

There are an infinite number of cyclic groups and an infinite number of these cyclic groups are extremely large. The notion of extremely large means the following: if $2^{1024}$ is considered to be an extremely large number based on the computing power of current computers, then there are still an infinite number of finite cyclic groups with each cyclic group containing more than $2^{1024}$ elements.

FIG. 19 shows a Diffie-Hellman key exchange between Alice and Bob. Before the Diffie-Hellman key exchange is started, in some embodiments, Alice and Bob agree on an extremely large (huge), finite, cyclic group G and a generating element g in G. In some embodiments, Alice and Bob sometimes agree on finite, cyclic group G and element g before the rest of the key exchange protocol; g is assumed to be known by Eve, which represents attackers who are trying to capture their shared secret. The group operations of G are expressed multiplicatively as explained previously. In some embodiments, G may not be cyclic; in this case, it is better for the order of g to be huge.

Cryptographic method 1 describes a Diffie-Hellman key exchange, where Alice executes steps 1 and 3 and Bob executes steps 2 and 4.

Cryptographic Method 1. Key Exchange
1. Alice randomly generates private key a, where a is a large natural number, and sends $g^a$ to Bob.
2. Bob randomly generates private key b, where b is a large natural number, and sends $g^b$ to Alice.
3. Alice computes $(g^b)^a$.
4. Bob computes $(g^a)^b$.

After the key exchange is completed, Alice and Bob are now in possession of the same shared secret key $g^{ab}$. The values of $(g^b)^a$ and $(g^a)^b$ are the same because G is a commutative group. Commutative means ab=ba for any elements a, b in G.

In some embodiments, Alice subsequently encrypts a plaintext message m, as E(m, $g^{ab}$) and sends E(m, $g^{ab}$) to Bob. Bob receives E(m, $g^{ab}$) and decrypts it by computing m=D(E(m, $g^{ab}$), $g^{ba}$). Bob knows |G|, b, $g^a$. Alice and Bob know the encryption algorithm E(m,k), whose first argument m is plaintext and whose second argument k is the key. Alice and Bob also know the decryption algorithm D (C,k), whose first argument c is ciphertext and whose second argument k is the key.

In an embodiment, the user and the service provider 126 agree upon a common key for the registration key, by executing a Diffie-Hellman key exchange. The user encrypts one of the common keys with the registration key. The service provider 126 encrypts the common key with other information, which may be information specific to the user or a random number, for example. Then the user sends the encrypted common key (that was encrypted by the user with the registration) to the service provider 126, and the service provider 126 sends the encrypted common key that the service provider 126 encrypted to the user. Next, the user encrypts the encrypted common keys that was received from the service provider 126 with the registration key, and the service provider 126 encrypts the encrypted common key received from the user (which was encrypted with the registration key) with the same information that was used to encrypt the original copy of the common key of the service provider 126. Thus, both the user and the service provider 126 will now have the common encrypted key derived from the registration key supplied by the user and the information supplied by the service provider 126. The resulting encrypted common key may be used as the registration key (instead of the original registration key).

Optionally, the user system 101 and the service provider 126 may also agree upon a common key for the cryptography key. The common key of the cryptography key and registration key may be the same as one another or different. The user system 101 then encrypts one of the common keys and the cryptography key. The server encrypts the common key with other information, which may be information specific to the user or a random number for example (as was done for the registration key). Then the user system 101 sends the encrypted common key (that was encrypted by the user with the cryptography key) to the service provider 126, and the service provider 126 sends the encrypted common keys (which was encrypted service provider 126) to the user. Next, the user encrypts the encrypted common key that were received from the service provider 126 with the cryptography key, and the service provider 126 encrypts the encrypted common keys received from the user (which was already encrypted with the cryptography key by the user) with the same information that was used to encrypt the original copy of the common keys of the service provider 126. Thus, both the user and the service provider 126 will now have the common key encrypted by the cryptography key supplied by the user and the information supplied by the service provider 126. The resulting encrypted common key may be used as the cryptography key (instead of the original cryptography key).

In other embodiments, the secure transmission may use elliptic curve cryptography to implement the key exchange described previously in steps 1, 2, 3, 4 and 5 of cryptographic method 1.

In other embodiments, the secure transmission of cryptography key(s) K may use a camera that reads a proprietary pattern from the users display of the device after setup is complete. In an embodiment, the users display is the screen of a mobile phone.

In at least one embodiment, the registration key R may be given to the administrator in the same physical place, such as at a bank, or the registration key may be mailed or electronically transmitted to the administrator if setup is accomplished remotely. In some applications, the registration key may be encrypted first and then electronically transmitted or sent by mail. The service provider system 126 uses the registration key R to generate the cryptography key (that service provider system 126 received), and is used to compute the cryptography key K as K=$\Phi^j$(R) where j≥0 and stores cryptography key K for a particular user in a secure area 102. The number j in the operator $\Phi^j$( ) is the number of times that the operator ( ) is applied to R.

6.7 Elliptic Curve Group Operations

For elliptic curves [11] the mathematical operations—derived from the Weierstrauss curve—are as follows:
1. Select two geometric points $p_1$, $p_2$ on the Weierstrauss curve.
2. Draw a line through these two points $p_1$ and $p_2$.
3. Compute the new intersection point of the line with the Weierstrauss curve.
4. Reflects this new intersection point about the y axis, resulting in the point $p_{new}=p_1*p_2$.
5. The new point $p_{new}$ is the result of the mathematical operations on points $p_1$ and $p_2$.

In the special case, when the two points are the same point (i.e., $p_1=p_2$), the mathematical operations consist of the following. A tangent line to the Weierstrauss curve at $p_1$ is computed. Then a new intersection point with the tangent line and the Weierstrauss curve is computed. Then a reflection is applied to this new intersection point, resulting in $p_{new}$.

In another embodiment, elliptic curve computations are performed on an Edwards curve over a finite field. When the field K does not have characteristic two, an Edwards curve is of the form: $x^2+y^2=1+dx^2y^2$, where d is an element of the field K not equal to 0 and not equal to 1. For an Edwards curve of this form, the binary operator * is defined as $$(x_1, y_1)*(x_2, y_2) = \left(\frac{x_1y_2+x_2y_1}{1+dx_1x_2y_1y_2}, \frac{y_1y_2-x_1x_2}{1-dx_1x_2y_1y_2}\right),$$

where the elements of the group are the points $(x_1, y_1)$ and $(x_2, y_2)$. The definition of * defines elliptic curve computations that form a commutative group. For more information on Edwards curves, refer to the math journal paper [12].

In an alternative embodiment, elliptic curve computations are performed on a Montgomery curve over a finite field. Let K be the finite field over which the elliptic curve is defined. A Montgomery curve is of the form $By^2=x^3+Ax^2+x$, for some field elements A, B chosen from K where $B(A^2-4)\neq 0$. For more information on Montgomery curves, refer to the publication [13].

6.8 Goppa Code Group Operations

Goppa codes are covered in Chapter 8 of reference [17]. This section summarizes how Goppa codes and the mathematical operations described below can used in a public-key cryptosystem, conceived by McEliece [18]. As of this time, this McEliece public-key cryptosystem is considered resistant to known quantum computing algorithms.

Corresponding to each irreducible polynomial of degree t over GF($2^m$), there exists a binary irreducible Goppa code of length n=$2^m$, such that the Goppa code's dimension k≥n−tm.

Furthermore, this Goppa code is capable of correcting any pattern with t or fewer errors. Moreover, there exists a fast algorithm for decoding these Goppa codes: the run time is O(nt). This fast algorithm is called Patterson's algorithm. See problem 8.18 in reference [17].

Suppose that the information system chooses a large enough value of n and t, and then randomly selects an irreducible polynomial of degree t over GF($2^m$). The value $$\frac{1}{t}$$

is close to the probability that a randomly selected polynomial of degree t is irreducible. There is a fast algorithm for testing irreducibility, shown in chapter 6 of reference [14]. Next, the information system (Alice) computes a k×n generator matrix G for the code which is canonical, for example, row-reduced echelon form.

After generating G, Alice's information system scrambles G by randomly selecting a dense k×k nonsingular matrix S and randomly selecting an n×n permutation matrix P. Next, Alice's information system computes G'=S*G*P, where * represents matrix multiplication. The result G' generates a linear code with the same rate and minimum distance as the code generated by G. Matrix G' is called the public generator matrix and acts as Alice's public key.

Alice transmits her public key G' to Bob. Bob is able to encrypt his plaintext data using the following encryption algorithm, along with Alice's public key G'.

McEliece Encryption Algorithm.
1. Bob divides the plaintext data into k-bit blocks.
2. Suppose u is a plaintext block that Bob wishes to securely send to Alice. Bob computes the vector x=u*G'+z, where G' is a public generator matrix, and z is a randomly generated random vector of length n and weight t. Bob keeps z local.
3. Bob transmits encrypted data x to Alice.

Alice can efficiently recover u by performing the following decryption algorithm.

McEliece Decryption Algorithm.
1. Alice computes x'=x*$P^{-1}$, where $P^{-1}$ is the inverse of permutation matrix P.
2. x' is a codeword for the Goppa code previously chosen. Alice executes Patterson's algorithm to help compute u'=u*S.
3. Alice recovers u by computing u=u'*$S^{-1}$, where $S^{-1}$ is the inverse matrix of the nonsingular matrix S, randomly selected by her information system.

6.9 Lattice Group Operations

This section describes lattices and how public keys can be computed from mathematical operations based on lattices. In some embodiments, the binary operation of vector addition on a lattice makes the lattice into a commutative group. The symbol $\mathbb{R}$ represents the real numbers. The symbol $\mathbb{Z}$ represents the integers.

Let L be subset of points of the vector space $\mathbb{R}^n$ that contains the origin (0, 0, . . . , 0). Then the set L is a lattice if it satisfies the following two conditions.
1. L is a group with vector addition as its binary operation.
2. There exists an r>0, such that for each point x in L, the open ball with center x and radius r contains no other points of L besides x.

It is well-known [19] that if L is a lattice in an n-space (n-dimensional vector space) then there exists k linearly independent vectors $v_1, v_2 \ldots v_k$ with k≤n such that L consists of all points of the form $$m_1 v_1 + m_2 v_2 + \ldots + m_k v_k$$

where each $m_i$ is an integer. Let $\mathbb{Z}_q^{m \times n}$ be the set of all n rows of m tuples of integers modulo q. The following math operations make up a public cryptographic system, called LWE (i.e., Learning with Errors) based on lattices. The errors are assigned according to the noise distribution $\chi$ such that $$\|e\| \leq \frac{q}{4m}$$

with high probability.

LWE Key-Pair Generation.
1. n is the input parameter for Alice.
2. A in $\mathbb{Z}_q^{m \times n}$ is randomly selected by Alice and is open to the public. A is an n×m matrix with entries in $\mathbb{Z}_q$, selected according to a uniform distribution.
3. Alice selects e in $\mathbb{Z}_q^m$, according to a uniform distribution.
4. Alice's secret s is randomly selected in $\mathbb{Z}_q^n$, according to a uniform distribution.
5. Alice's key pair is (p,s), with public key $p=(A, s^T*A+e^T)$. Note $s^T*A$ is vector $s^T$ multiplied by matrix A. Expression $s^T$ is the transpose of vector s. Expression $e^T$ is the transpose of vector e.

LWE Encryption with the Public Key.
1. Bob receives as input Alice's public key $(A, b^T)$ and plaintext message m in {0, 1}.
2. Bob randomly samples m-bit vector r in $\{0, 1\}^m$ and computes ciphertext $$\left(A*r, b^T*r + m\left\lceil\frac{q}{2}\right\rceil\right).$$

6.10 Visual Image Authentication Protects Key Exchange from a Man-in-the-Middle Attack A common vulnerability during a Diffie-Hellman key exchange is a man-in-the-middle attack, where Eve is able to pretend she is Bob to Alice and also pretend that she is Alice to Bob. A man-in-the-middle attack by Eve is shown in FIG. 20. Eve sends her public key $g^e$ to Alice and also sends her public key $g^e$ to Bob. Alice believes she is sending Bob public key $g^a$, but Eve intercepts $g^a$ and Bob doesn't receive $g^a$. Instead, Eve sends her public key $g^e$ to Bob. Bob believes that $g^e$ is Alice's public key.

Similarly, as shown in FIG. 20, Bob believes he is sending Alice public key $g^b$, but Eve intercepts $g^b$ and Alice doesn't receive $g^b$. Instead, Eve sends her public key $g^e$ to Alice. Alice believes that $g^e$ is Bob's public key. In some cases of the man-in-the-middle attack, Eve may send public key $g^{e_1}$ to Bob and send a different public key $g^{e_2}$ to Alice. That is, $g^{e_1} \neq g^{e_2}$.

After a key exchange is completed, visual image authentication between Alice and Bob can notify Alice and Bob that Eve has launched a man-in-the-middle attack. When Alice's sequence of visual images derived from her shared secret do not match Bob's sequence of visual images, Alice and Bob know that they should perform their key exchange again.

FIG. 21, shows a one-to-one correspondence between image numbers, derived from Alice and Bob's shared secret, and visual images that help Alice and Bob perform a visual image authentication of their shared secret established after a key exchange. Image number 0 corresponds to an airplane. Image number 1 corresponds to baseball. Image number 2 corresponds to a bat. Image number 3 corresponds to a cat. Image number 4 corresponds to a cup. Image number 5 corresponds to an elephant. Image number 6 corresponds to a fish. Image number 7 corresponds to a flower. Image number 8 corresponds to a monkey. Image number 9 corresponds to a motorcycle. Image number 10 corresponds to a piano. Image number 11 corresponds to scissors. Image number 12 corresponds to a shoe. Image number 13 corresponds to skiing. Image number 14 corresponds to a train. Image number 15 corresponds to a truck.

Visual image authentication uses the mathematics of the key exchange to assure that Eve cannot construct the same shared secret $g^{ab}$ as Alice and Bob. More precisely, the probability that $g^{ae}=g^{be}$ is extremely small when a and b are large numbers and the size of commutative group |G| is huge. In an embodiment, |G| is greater than $10^{75}$; this is 1 followed by seventy-five zeroes. In another embodiment, |G| is greater than $10^{1000}$, which is a googol to the 10th power.

Overall, the authentication method creates a message authentication code (MAC) from the shared secret established between Alice and Bob. This message authentication code computation is expressed as a function h shown below in method 2. In some embodiments, h is computed by applying a one-way hash function at least once. In some embodiments, h is computed by applying a one-way hash function more than once. In an embodiment, h is computed using the HMAC standard [9]. In an embodiment, the one-way hash function is SHA-512. Afterward, the MAC output is translated to a sequence of visual images that corresponds to this MAC.

Cryptographic Method 2. A Key Exchange with Successful Visual Image Authentication
1. Alice randomly generates private key a, where a is a large natural number, and sends $g^a$ to Bob.
2. Bob randomly generates private key b, where b is a large natural number, and sends $g^b$ to Alice.
3. Alice computes $(g^b)^a$.
4. Bob computes $(g^a)^b$.
5. Alice computes $h(g^{ab})$.
6. Bob computes $h(g^{ab})$.
7. Alice's sequence of visual images are derived from $h(g^{ba})$.
8. Bob's sequence of visual images are derived from $h(g^{ab})$.
9. Alice communicates her sequence of visual images to Bob.
10. Bob communicates his sequence of visual images to Alice.
11. Since $g^{ba}=g^{ab}$, then $h(g^{ba})=h(g^{ab})$ which implies that Alice and Bob's sequence of visual images have a successful match.

In an embodiment that implements method 2, Alice's sequence of visual images are chosen from 16 different types of images, as shown in FIG. 21. In an embodiment, step 7 of method 2 is executed by deriving a sequence of numbers from $h(g^{ba})$, where each number is between 0 and 15, inclusive. In another embodiment, each image number is between 0 and 31, inclusive. In an embodiment, the image train, corresponding to image number 14, has other objects in it such as birds and clouds. When the images are displayed or rendered on a screen that may be susceptible to malware infection (for example, screen of a mobile phone), the images may have other objects such as birds and clouds in order to confuse the malware.

In an example of an embodiment, Alice's private key a is expressed as the 32-byte key a=8 40 120 203 132 152 168 76 63 132 223 158 121 88 204 109 46 231 205 178 229 171 37 211 20 149 133 96 215 47 37 119, where each byte is expressed a number between 0 and 255, inclusive. Alice's public key is $g^a$=13 199 62 59 3 7 29 92 49 227 245 48 164 199 20 73 165 44 177 168 80 146 145 83 174 159 199 135 160 184 105 70.

Bob's private key b is expressed as the 32-byte key b=16 61 136 27 117 188 95 12 221 26 10 49 248 229 27 244 33 222 146 137 104 85 101 251 102 157 196 149 202 155 151 115. Bob's public key is $g^b$=213 170 155 226 153 190 7 92 173 72 12 220 129 196 200 177 176 184 193 240 85 231 64 110 88 83 89 135 37 36 20 65.

The key exchange described in method 2 is shown in FIG. 19. After the key exchange is completed, in step 3 Alice computes shared secret $g^{ba}$ and in step 4 Bob computes $g^{ab}$. In an embodiment, Alice's key exchange computations are executed in Alice's secure processor 106, shown in FIG. 1A. In an embodiment, Bob's key exchange computations are executed in Bob's secure processor 106. In some embodiments, Alice's private key a may be at least partly generated from photons detected by a semiconductor as shown in FIG. 16. In some embodiments, Alice and Bob's processors 106 may be located inside a mobile phone.

In an embodiment, the private keys a, b and public keys $g^a$ and $g^b$ establish a 32-byte shared secret $g^{ba}=g^{ab}$=90 23 83 103 175 51 88 139 108 79 206 58 91 231 126 83 167 42 71 251 163 229 238 117 78 168 137 254 210 168 119 104. In another embodiment, the shared secret established between Alice and Bob is 128 bytes.

After Alice and Bob compute the same shared secret $g^{ba}$, a function h is applied which creates a message authentication code. In an embodiment, the first 5 bytes $b_0$, $b_1$, $b_2$, $b_3$, $b_4$ of this message authentication code are modulo'd by 16, expressed as $b_0$ mod 16, $b_1$ mod 16, $b_2$ mod 16, $b_3$ mod 16, $b_4$ mod 16, producing a sequence of 5 image numbers between 0 and 15, inclusive.

FIG. 22 shows an embodiment of cryptographic method 2, where the first 5 image numbers are between 0 and 15, inclusive, derived from Alice and Bob's shared secret $g^{ba}$=90 23 83 103 175 51 88 139 108 79 206 58 91 231 126 83 167 42 71 251 163 229 238 117 78 168 137 254 210 168 119 104. Both Alice and Bob see the following sequence of visual images: motorcycle, bat, flower, train and cat on their respective displays due to the one-to-one correspondence between image numbers and images, as shown in FIG. 21.

In some embodiments, the sequence of images that Alice sees will be communicated to Bob on a different channel than the channel used to transmit Alice's public key. A communication channel can utilize physical media and also different methods of encoding and representing the information that is being communicated.

In an embodiment, the physical media is the earth's atmosphere and the encoding involves sound waves. For example, Bob and Alice could be standing next to each other: Alice reads to Bob her sequence of visual images of visual images displayed on her mobile phone that has output system 118, as shown in diagram 1A. The sound waves created by Alice travel through the air to Bob's ear. This channel utilizing sound waves through air is different than a channel that uses the TCP/IP infrastructure. It is also different than a channel that uses electromagnetic waves (visible light, radio waves, infrared) to transmit the information. Sending text via SMS is another different channel. Faxing a page of paper with a sequence of visual images is another different channel.

In an embodiment, Alice and Bob's public keys are transmitted via TCP/IP, using network interface 122 and network 124 in FIG. 1A. In an embodiment, a TCP/IP protocol is performed by Alice and Bob's mobile phones, which contain secure area 102, processor system 116, memory system 114, input/output system 118, and network interface 122.

In another embodiment, Alice prints on a page of paper her sequence of visual images and Bob prints on a page of paper his sequence of visual images. They mail each page to each other, using the U.S. postal service. The printed pages sent via USPS mail provides a different channel.

In some embodiments, Alice and Bob may stand next to each other. Alice shows Bob her sequence of visual images: motorcycle, bat, flower, train and cat. Bob visually checks that Alice's sequence of visual images is the same as his, as described in cryptographic method 2. Alice also visually checks Bob's sequence of images. This method provides a different channel.

Cryptographic method 3 describes how Alice and Bob can detect a man-in-the-middle attack on their key exchange.
Cryptographic Method 3. Alice and Bob detect a Man-in-the-Middle Attack on the Key Exchange
1. Alice randomly generates private key a, where a is a large natural number, and sends $g^a$.
2. Eve intercepts $g^a$ and sends Eve's public key $g^e$ to Bob.
3. Bob randomly generates private key b, where b is a large natural number, and sends $g^b$.
4. Eve intercepts $g^b$ and sends Eve's public key $g^e$ to Bob.
5. Alice computes $(g^e)^a$.
6. Bob computes $(g^e)^b$.
7. Alice computes $h(g^{ea})$.
8. Bob computes $h(g^{eb})$.
9. Alice's sequence of visual images are derived from $h(g^{ea})$.
10. Bob's sequence of visual images are derived from $h(g^{eb})$.
11. Alice communicates her sequence of visual images to Bob.
12. Bob communicates his sequence of visual images to Alice.
13. With a probability extremely close to 1, $g^{ea} \neq g^{eb}$, so that $h(g^{ea}) \neq h(g^{eb})$. With a probability extremely close to 1, Alice and Bob's sequence of visual images DO NOT MATCH.
14. Alice and Bob abort the key exchange.

In an embodiment that implements method 3, Alice's and Bob's sequence of visual images are chosen from 16 different types of images, as shown in FIG. 21. In an example of an embodiment of method 3, Eve's private key e is represented as the 32-byte key e=16 31 58 5 205 235 85 75 11 137 119 193 84 0 245 141 7 238 210 242 232 6 14 42 146 75 151 63 152 105 197 99 and Eve's public key $g^e$ is represented as the 32-byte key 130 196 135 248 86 83 73 102 248 101 182 44 195 124 104 232 49 170 251 233 177 173 26 190 8 35 156 211 95 174 93 44.

In an example of an embodiment of method 3, Eve intercepts Alice public key and establishes shared secret $g^{ae}$ with Alice, represented as the 32-byte shared secret $g^{ae}$=124 232 2 192 27 111 101 252 1 207 31 20 58 198 135 175 77 82 250 221 242 42 254 4 58 31 252 240 206 130 119 108.

From the shared secret $g^{ae}$, Alice computes message authentication code $h(g^{ae})$. Alice performs modulo 16 arithmetic on the first 5 bytes of $h(g^{ae})$ and computes the sequence of image numbers 13, 0, 14, 11, and 1. As shown in FIG. 23, Alice's visual image sequence, derived from her shared secret $g^{ae}$, is skiing, airplane, train, scissors, baseball.

Eve also intercepts Bob's public key and establishes shared secret $g^{be}$ with Bob, represented as the 32-byte shared secret $g^{be}$=67 83 209 173 189 45 174 170 129 84 185 14 93 245 15 20 161 158 193 22 244 83 79 245 164 28 10 24 81 216 33 121.

From the shared secret $g^{be}$, Bob computes message authentication code $h(g^{be})$. Bob performs modulo 16 arithmetic on the first 5 bytes of $h(g^{be})$ and computes the sequence of image numbers 1, 10, 4, 3, and 8. As shown in FIG. 24, Bob's visual image sequence, derived from his shared secret $g^{be}$ is baseball, piano, cup, cat, monkey.

Alice and Bob communicate and then compare their respective visual image sequences, which DO NOT match. Alice and Bob detect that a man-in-the-middle attack has been launched by Eve. Alice and Bob can choose to abort their communication or attempt another key exchange. As discussed previously, Alice and Bob can communicate their visual image sequences to each other, using a different channel than they used to transmit their public keys.

An embodiment of the key exchange in cryptographic methods 2 and 3 is briefly described using the 25519 elliptic curve [10]. The curve 25519 function is $\mathbb{F}_p$ restricted x-coordinate multiplication on $E(\mathbb{F}\,p_2)$, where p is the prime number $2^{255}-19$ and E is the elliptic curve $y^2=x^3+486662x^2+x$. During the key exchange, a public key is computed from a 32-bit private key and basepoint 9. An embodiment where basepoint 9 is represented as a 32-byte array of bytes is shown in below. The variable name is Base_Point_9.

const unsigned char Base_Point_9[32]={9, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0};

Generator 9 has order 7237005577332262213973186563042994240857116359379907606001950938285454250989, which is a prime number. This prime equals $2^{252}+27742317777372353535851937790883648493$. Observe that $2^{252}=7237005577332262213973186563042994240828293740416025352524660990004945706024$96.

The symbol A represents Alice's 32-byte private key and B is Bob's 32-byte private 25519 key. $9^A$ and $9^B$ are Alice and Bob's public 25519 keys, respectively. In terms of the group operation with respect to the 25519 elliptic curve, when Eve is UNABLE to launch a man-in-the-middle attack, Alice will have shared secret $9^{AB}$ and Bob will have shared secret $9^{BA}$. Since the elliptic curve binary operation is commutative, $9^{AB}=9^{BA}$, so Alice and Bob's shared secrets are the same.

Alice and Bob compute a message authentication code. Then they compute the same sequence of image numbers (since there was not a man-in-the-middle) so that when they compare their sequence of visual images, their images will match. This is an example of implementing cryptographic method 2 with elliptic curve 25519.

When Eve launches a man-in-the-middle attack, Eve can do the following: she can compute her own private key E and send $9^E$ to Alice and Bob. After exchanging with Alice, Eve computes $9^{EA}$. Similarly, Alice computes $9^{AE}$. After exchanging with Bob, Eve computes $9^{EB}$. Similarly, Bob computes $9^{BE}$.

The visual image authentication in method 3 works because Eve does not know Alice's private key A and Eve does not know Bob's private key B. If Eve attempts to attack in the middle, Eve can send $9^B$ to Alice and also send $9^A$ to Bob, but, in this case, Eve won't be able to compute $9^{AB}$ because Eve doesn't know their private keys A or B. Alice applies her MAC function h to compute $h(9^{EA})$; Bob applies his MAC function to compute $h(9^{EB})$. In an embodiment, h is collision resistant, where it utilizes a one-way hash function, so $h(9^{EA}) \neq h(9^{EB})$ with probability extremely close to 1. This means with probability extremely close to 1, Alice will derive a different sequence of visual images from $h(9^{EA})$ than Bob will derive from $h(9^{EB})$. After Alice and Bob communicate and compare their sequence of visual images, as described in step 13 of method 3, Alice and Bob can discover that Eve has launched a man-in-the-middle attack.

6.11 Securely Executing a Financial Transaction

Transaction Information for Exchanges

For a payment transaction, one item may be the name of the person or entity sending the money. In at least one embodiment, the transaction may be a stock trade. In these embodiments, the stock account number may be part of the transaction information. In at least one embodiment, the ticker symbol of the stock for example, GOOG—being bought or sold may be part of the transaction information (or the name of a commodity or other item being purchased). The number of shares may be part of the transaction information. The price per share (or unit price) at which the person wishes to buy or sell the shares may be an item of the transaction information. If the stock purchase (or sale) is a limit order, then an indication that the stock purchase is a limit order may be an item of the transaction information. If the stock purchase (or sale) is a market order, then an indication that the purchase is a market order may be an item of the transaction information. The name of the stock account (e.g. Ameritrade, Charles Schwab, etc.) or broker may also be an item of the transaction information.

In at least one embodiment, there are transaction steps A and B, which are executed to successfully complete a transaction. In at least one embodiment, there are transaction steps A, B, and C, which are executed to successfully complete a transaction. FIG. 3A shows a flow chart of transaction step A.

TRANSACTION STEP A. In at least one embodiment, the person looks for one or more logos or visual images that helps person make sure that he or she is communicating to the appropriate users bank, financial institution or other service provider system. In an embodiment, the person learns or creates this image that verifies the service provider system during setup. When a transaction is requested by the person, user selects a collection or sequence of visual images that are easy to remember, and/or presents a biometric print match and/or a password or PIN, that are acquired by user system 101. This is referred to as user authentication. The person (user) securely enters transaction information by selecting or choosing visual images that are difficult for malware to read or recognize.

Step A.1 The person verifies in web browser or visual display that her or she is communicating to the appropriate bank, financial institution or other service provider system. Step A.2 The person enters their user authentication information $\mathcal{A}$ as a collection of visual images, a PIN or password or a biometric print. Step A.3 The person enters a one-time sequence of letters, and/or a one-time sequence of numbers or a one-time sequence of images $\mathcal{U}$ or a combination that is unique for this transaction and difficult for malware to guess. Step A.4 The person selects and enters transaction information $\mathcal{I}$ into user system 101. Step A.5 Transaction information $\mathcal{I}$ is encrypted with key K denoted as E($\mathcal{I}$, K). User authentication information $\mathcal{A}$ is encrypted as E($\mathcal{A}$, K). One-time information information $\mathcal{U}$ is encrypted as E($\mathcal{U}$, K) and are then sent to service provider system.

There are many different methods for transmitting encrypted user authentication E($\mathcal{A}$, K), encrypted unique information E($\mathcal{U}$, K) and encrypted transaction information E($\mathcal{I}$, K) to the administrator (bank) at service provider system 126. In one method, the user may wirelessly transmit the encrypted transaction information via a mobile phone to service provider system 126. In a third method, the user may submit or enter a collection of images and encrypted transaction information to the web browser of user system 101 and use the Internet for transmission to the administrator (bank) at service provider system 126. In many other methods, the user may submit the user authentication and encrypted transaction information by some other electronic means, such as a fax machine or an ATM machine.

In at least one embodiment, the current time $\tau_1$ is determined and provided as transaction information. The current time $\tau_1$ may be rounded to the nearest minute, for example. Optionally, the sender and receiver may compute the difference in time between the clock of the sender and the clock of the receiver prior to sending a message in case the two clocks are not sufficiently synchronized. In other embodiments, the time may be rounded to the nearest 5 minutes, the nearest, 10 minute, or the nearest hour, for example. Here the reference time is GMT time. For example, if the exact time is 19:05 and 45 seconds GMT, then $\tau_1$ is set to is 19:06 GMT. If the time is not correct or is too delayed from the original time, then the transaction may be aborted.

Figure 3B:
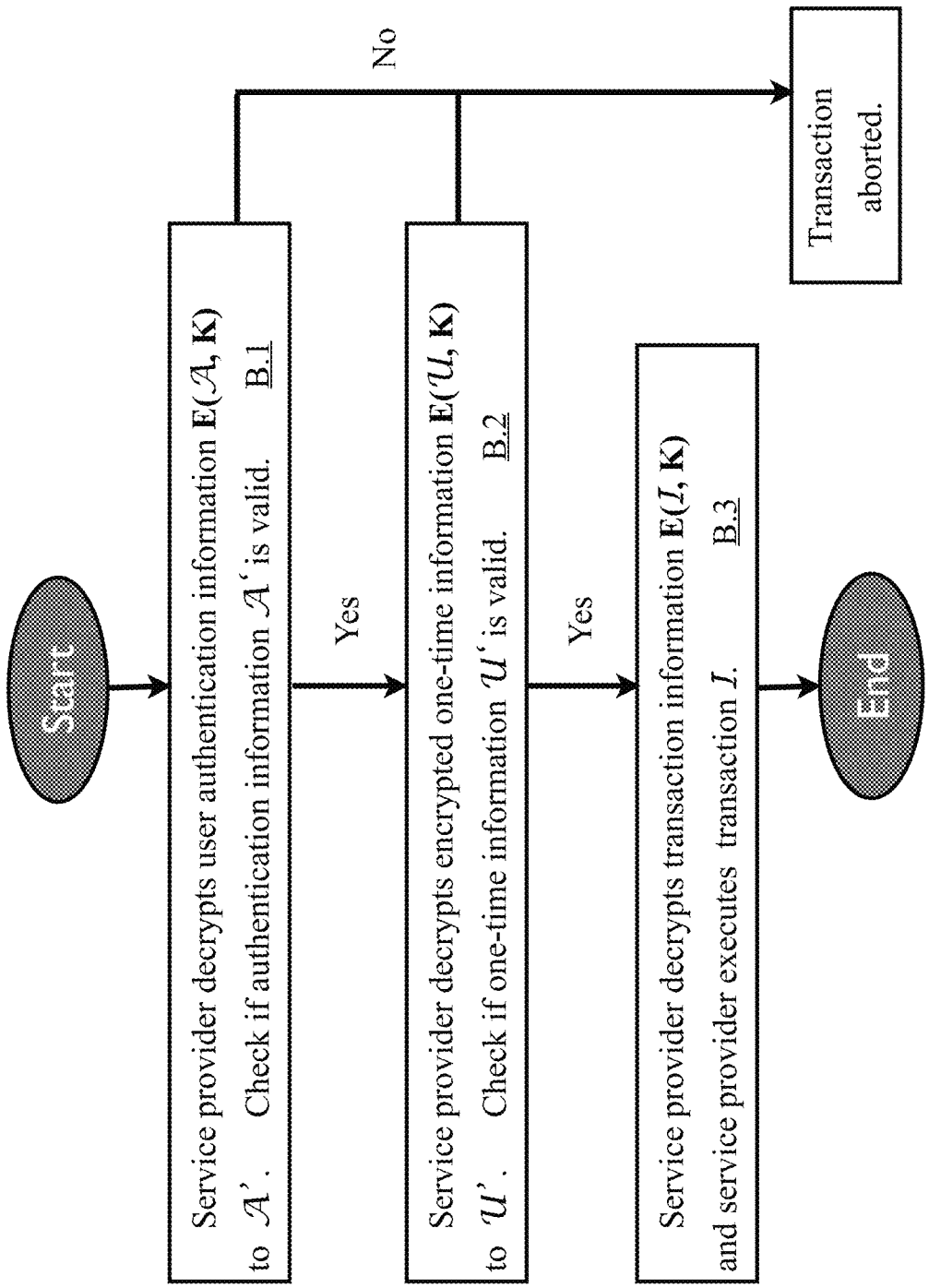
FIG. 3B shows a flow diagram of an embodiment of step B of executing a secure transaction.

TRANSACTION STEP B. The administrator (bank or financial institution) receives at service provider system 126 the encrypted transaction information, encrypted one-time information and encrypted user authentication information. FIG. 3B shows a flow chart of transaction step B.

Step B.1 The service provider system decrypts the user authentication information $\mathcal{A}$ and checks that it is valid. If it is not valid, then the transaction is aborted. If the user authentication information is valid, then service provider system 126 goes to step B.2. Step B.2 The service provider decrypts E($\mathcal{U}$, K) and checks that the user was able to correctly recognize the one-time information $\mathcal{U}$ from the users screen or web browser. If the one-time information $\mathcal{U}$ decrypted by the service provider system is not valid (i.e., $\mathcal{U}$ doesnt match $\mathcal{U}$), then the transaction is aborted. If the one-time information $\mathcal{U}$ decrypted by the service provider system is valid (i.e., $\mathcal{U}$ matches $\mathcal{U}$), then service provider system 126 goes to step B.3.

In at least one embodiment, the one-time information $\mathcal{U}$ is displayed on the users screen in a way that is difficult to recognize or apprehend by malware but recognizable by a person.

Step B.3 The encrypted transaction information E($\mathcal{I}$, K) is decrypted and transaction $\mathcal{I}$ is executed. Alternative Embodiment Transaction Steps C. and D.

TRANSACTION STEP C. The service provider system translates the transaction information to a new collection of visual images $\mathcal{J}$ but that represent the same transaction information as $\mathcal{I}$. The service provider system encrypts this new visual representation of the transaction information $\mathcal{J}$ as E($\mathcal{J}$, K) and sends E($\mathcal{J}$, K) back to the user system. The user system receives E($\mathcal{J}$, K), decrypts it and the user checks that $\mathcal{J}$ matches transaction information $\mathcal{I}$. If $\mathcal{J}$ doesnt match transaction information $\mathcal{I}$, then the user may abort the transaction.

TRANSACTION STEP D. If $\mathcal{J}$ matches the original transaction information $\mathcal{I}$ submitted by the user, then the user sends a message to the service provider to complete the transaction. There are a number of methods to implement transaction step D.

In at least one embodiment, the cryptography key K may be updated, denoted as $\gamma$(K) on both sides. Then the encrypted transaction information E($\mathcal{I}$, $\gamma$(K)) or E($\mathcal{I}$, K) is sent from the administrator (bank) back to the user.

User Interface for Transactions

In at least one embodiment, the user interface may implemented with a web browser in a personal computer or in a mobile phone. User input such as selecting letters, numbers or other input items may be accomplished with fingers on the glass screen of IPhone or Android phone. For a PC, the letters, number or other input items, may be entered with a mouse selecting appropriate letters as shown in FIG. 5 or 6. In at least one embodiment, the display screen may be rendered with a glass screen in a mobile phone such as an Android or IPhone. In other embodiments, the display screen may use an LCD. In at least one embodiment, some or all of the financial institution members of SWIFT may be stored in terms of patterns or images in the memory of the service provider system. In at least one embodiment, the user may use her or his fingers to scroll on the screen and select one of the banks to make a transaction with. In at least one embodiment, the user may use a mouse to scroll on the display of the personal computer.

In at least one embodiment, the user may be an employee of the bank. In at least one embodiment, the device may be used to securely execute wire transfers between two banks. In at least one embodiment, a visual images of letters that are difficult for malware to read may be displayed as a keyboard to be used by a person to enter a password or transaction information as shown in FIG. 5 and FIG. 6. In at least one embodiment, the display may enable the user to verify that the transaction information is correct or has not been tampered with by malware before executing the transaction.

6.12 Advertising with Visual Image and Word Meaning Authentication

In some embodiments, the selection of visual images on the display screen of the user may advertise an institution (e.g., a company), person, product, or service. In an embodiment, an institution is a company. In another embodiment, an institution is a government. In some embodiments, the visual image may be a logo that advertises a company or the company's service or product. As an example of a company, in FIG. 26, the Facebook logo may used as one of the visual images for a user to select while performing an authentication.

In an embodiment, a product may be shoes and the visual image advertises a brand of shoes. In an embodiment, a product may be a car or a truck and the visual image advertises that model or brand of car or truck. In an embodiment, a product may be a type of food or drink and the visual image advertises that type of food or drink.

In an embodiment, a service may be a financial service and the visual image advertises a financial service. In an embodiment, a service may be shipping and the visual images advertises the service of shipping. In an embodiment, a service may be related to healthcare and the visual image advertises a healthcare service. In an embodiment, a product or service or combination of both may be a medicine or medical treatment and the visual image advertises the medicine or medical treatment.

In another embodiment, a message as a part of the image advertises the product or service. The message Drink Coke may be used in a visual image that is selected, where the visual image representing Drink Coke is part of the logo or an image of an aluminum can.

In an embodiment of a two factor authentication system, an SMS text message is: Drink Coke, Socialize with your friends, Ship your gift, Bank at Stagecoach. In some embodiments, these four advertising phrases are sent as ASCII text. Subsequently, the user selects the correct images on the display screen as a method of providing a second factor of authentication. FIG. 27 shows a display screen, containing a visual image that corresponds to Ship your gift. The visual image corresponding to Ship your gift is above the baseball player and shows a ship along with part of the FedEx logo. FIG. 27 along with the message Ship your gift illustrates a system of advertising where only part of the logo is shown on the display screen, during the authentication. In some embodiments, showing only part of the logo may help increase the difficulty of malware circumventing the authentication; this raises the level of artificial intelligence that the malware must exhibit in order to circumvent the authentication. In this example of ship your gift, the meaning of the word ship in the visual image corresponds to a boat. It is well-known by the natural language understanding community that ambiguities in natural language provide greater difficulties for artificial intelligence systems. This system of authentication also provides advertising of the company's product or service at the same time.

Further explaining this system of authentication and advertising, the text message Socialize with your friends would correspond to a user selecting the Facebook logo in FIG. 26. In this embodiment, it is plausible that an artificial intelligence system, attempting to circumvent the user authentication, would have to understand that users like to socialize with their friends on Facebook.

In FIG. 28, the visual image containing a stagecoach corresponds to the text message Bank at Stagecoach. After looking at the display screen in FIG. 28, a valid user authentication will select the image containing the stagecoach. In some embodiments, the authentication system that may receive advertising revenue and/or a advertising service fee.

User Interface

In some embodiments, the user interface may implemented on a display screen of a personal computer or in a smartphone (e.g., FIG. 25) or on a tablet. User input such as selecting letters, numbers, visual images, including logo images or other images related to advertising may be accomplished with the user's fingers pressing the display screen of the user's device. For a personal computer with no touch screen available, letters, numbers, or visual images may be selected with a mouse, as shown in FIG. 12C, FIG. 13B, FIG. 26, FIG. 27 and FIG. 28. In at least one embodiment, the display screen may consist of a glass screen on a smartphone such as an Android or IPhone. In another embodiment, the display screen may be rendered with a virtual reality headset.

Extensions and Alternatives

Each embodiment disclosed herein may be used or otherwise combined with any of the other embodiments disclosed. Any element of any embodiment may be used in any embodiment. At least one embodiment of this specification includes all of the embodiments being used together except for those that are mutually exclusive.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] NIST. FIPS-180-4. Secure Hash Standard, March 2012. http://csrc.nist.gov/publications/fips/fips180-4/fips-180-4.pdf

[2] NIST. FIPS-180-2: Secure Hash Standard, August 2002. http://www.itl.nist.gov/fipspubs/.

[3] Guido Bertoni, Joan Daemen, Michael Peeters, Gilles Van Assche. Keccak Reference 3.0 2011. http://keccak.noekeon.org/ http://en.wikipedia.org/wiki/Keccak

[4] Jean-Philippe Aumasson, Samuel Neves, Zooko Wilcox-O'Hearn, Christian Winnerlein. BLAKE. https://131002.net/blake/ http://en.wikipedia.org/wiki/BLAKE_(hash_function)

[5] Praveen Gauravaram, Lars Knudsen, Krystian Matusiewicz, Florian Mendel, Christian Rechberger, Martin Schlffer, and Sren S. Thomsen. Grstl a SHA-3 candidate. http://www.groestl.info http://www.groestl.info/Groestl.pdf

[6] Hongjun Wu. The Hash Function JH. 2011. http://ehash.iaik.tugraz.at/wiki/JH http://www3.ntu.edu.sg/home/wuhj/research/jh/jh_round3.pdf

[7] Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skein1.3.pdf http://en.wikipedia.org/wiki/Skein_(hash_function)

[8] Whitfield Diffie and Martin Hellman. New directions in cryptography. IEEE Transactions on Information Theory 22, 644-654, 1976.

[9] Mihir Bellare, Ran Canetti and Hugo Krawczyk. Keying Hash Functions for Message Authentication. Advances in Cryptology Crypto 96 Proceedings. LNCS 1109, N. Koblitz ed., Springer, 1996.

[10] Daniel Bernstein. Curve25519: new Diffie-Hellman speed records. Public Key Cryptography. LNCS 3958. New York, Springer. 207-228, 2006.

[11] Joseph H. Silverman and John Tate. Rational Points on Elliptic Curves. Springer-Verlag, 1992.

[12] H. Edwards. A normal form for elliptic curves. Bulletin of the American Math Society. 44: 393-422, April 2007.

[13] Peter Montgomery. Speeding the Pollard and Elliptic Curve Methods of Factorization. Mathematics of Computation 48 (177): 243-264, 1987.

[14] E. R. Berlekamp. Algebraic Coding Theory. New York, McGraw-Hill, 1968.

[15] L. K. Grover. A fast quantum mechanical algorithm for database search. Proceedings of the 28th Annual ACM Symposium on the Theory of Computing. May 1996.

[16] D. Bernstein. Grover vs. McEliece. Post-Quantum Cryptography. LNCS 6061, Springer, 73-80, 2010.

[17] Robert J. McEliece. The Theory of Information and Coding. Reading, Mass., Addison-Wesley, 1977.

[18] Robert J. McEliece. A public-key cryptosystem based on algebraic coding theory, JPL DSN Progress Report 42-44, pages 114-116, 1978.

[19] Sherman Stein and Sandor Szabo. Algebra and Tiling. Homomorphisms in the Service of Geometry. Mathematical Association of America, 1994.

The invention claimed is:

1. A machine-implemented method for establishing a shared secret between two parties, comprising: using a processor system, having at least one processor, a communications system, and a memory system; the first party generating a private key; the first party applying group operations to its private key to compute a public key; the first party transmitting its public key to a second party; the second party generating a private key; the second party applying group operations to its private key to compute a public key; the second party transmitting its public key to a first party; the first party computing a shared secret from the first party's private key and the second party's public key; and the first party deriving visual images from the shared secret; the second party computing a shared secret from the second party's private key and the first party's public key; and the second party deriving visual images from the second party's shared secret; the first party communicating the first party's visual images to the second party; the second party communicating the second party's visual images to the first party; wherein said public keys are transmitted over a first channel and the visual images are communicated by the first and second parties over a second channel that is distinct from the first channel.

2. The machine-implemented method of claim 1 further comprising: wherein first party's visual images are derived from the first party's shared secret, using a one-way function; wherein second party's visual images are derived from the second party's shared secret, using a one-way function.

3. The machine-implemented method of claim 1 further comprising: wherein first party's visual images are derived from the first party's shared secret, using a one-way hash function; wherein second party's visual images are derived from the second party's shared secret, using a one-way hash function.

4. The machine-implemented of claim 1 further comprising: the first party displaying visual images on the screen of a mobile device.

5. The machine-implemented of claim 4 further comprising: wherein said mobile device is a mobile phone.

6. A system for establishing a shared key between two parties, comprising: the first party generating a private key; the first party applying group operations to its private key to compute a public key; the first party transmitting its public key to a second party; the second party generating a private key; the second party applying group operations to its private key to compute a public key; the second party transmitting its public key to a first party; the first party computing a shared secret from the first party's private key and the second party's public key; and the first party deriving visual images from the shared secret; the second party computing a shared secret from the second party's private key and the first party's public key; and the second party deriving visual images from the second party's shared secret; the first party communicating the first party's visual images to the second party; the second party communicating the second party's visual images to the first party; wherein said public keys are transmitted over a first channel and the visual images are communicated by the first and second parties over a second channel that is distinct from the first channel.

7. The system of claim 6 further comprising: wherein first party's visual images are derived from first party's shared secret, using a one-way function; wherein second party's visual images are derived from second party's shared secret, using a one-way function.

8. The system of claim 6 further comprising: wherein first party's visual images are derived from first party's shared secret, using a one-way hash function; wherein second party's visual images are derived from second party's shared secret, using a one-way hash function.

9. The system of claim 6 further comprising: the first party displaying visual images on the screen of a mobile device.

10. The system of claim 9 further comprising: wherein said mobile device is a mobile phone.

11. A method for establishing a shared key between two parties, comprising: the first party generating a private key; the first party applying group operations to its private key to compute a public key; the first party transmitting its public key to a second party; the second party generating a private key; the second party applying group operations to its private key to compute a public key; the second party transmitting its public key to a first party; the first party computing a shared secret from the first party's private key and the second party's public key; and the first party deriving visual images from the shared content; the second party computing a shared secret from the second party's private key and the first party's public key; and the second party deriving visual images from the second party's shared secret; the first party communicating the first party's visual images to the second party; the second party communicating the second party's visual images to the first party; wherein said public keys are transmitted over a first channel and the visual images are communicated by the first and second parties over a second channel that is distinct from the first channel.

12. The method of claim 11 further comprising: wherein the shared secret is used to execute a secure transaction.

13. The method of claim 11 further comprising: wherein first party's visual images are derived from first party's shared secret, using a one-way function; wherein second party's visual images are derived from second party's shared secret, using a one-way function.

14. The method of claim 11 further comprising: wherein first party's visual images are derived from first party's shared secret, using a one-way hash function; wherein second party's visual images are derived from second party's shared secret, using a one-way hash function.

15. The method of claim 11 further comprising: the first party displaying visual images on the screen of a mobile device.

16. The method of claim 15 further comprising: wherein said mobile device is a mobile phone.

* * * * *